United States Patent
Aghajanyan et al.

(10) Patent No.: US 11,651,449 B2
(45) Date of Patent: May 16, 2023

(54) SEMANTIC REPRESENTATIONS USING STRUCTURAL ONTOLOGY FOR ASSISTANT SYSTEMS

(71) Applicant: Meta Platforms, Inc., Menlo Park, CA (US)

(72) Inventors: Armen Aghajanyan, Bellevue, WA (US); Sonal Gupta, Sunnyvale, CA (US); Brian Moran, Redmond, WA (US); Theodore Frank Levin, Seattle, WA (US); Crystal Annette Naomi Su Hua Nakatsu, San Jose, CA (US); Daniel Difranco, Seattle, WA (US); Jonathan David Christensen, Redmond, WA (US); Kirk LaBuda, Seattle, WA (US); Anuj Kumar, Santa Clara, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 149 days.

(21) Appl. No.: 16/998,423

(22) Filed: Aug. 20, 2020

(65) Prior Publication Data
US 2021/0117624 A1 Apr. 22, 2021

Related U.S. Application Data

(60) Provisional application No. 62/923,342, filed on Oct. 18, 2019.

(51) Int. Cl.
*G06F 40/30* (2020.01)
*G06F 9/54* (2006.01)
(Continued)

(52) U.S. Cl.
CPC .............. *G06Q 50/01* (2013.01); *G06F 3/011* (2013.01); *G06F 3/013* (2013.01); *G06F 9/453* (2018.02);
(Continued)

(58) Field of Classification Search
CPC ........ G06F 9/453; G06F 9/485; G06F 9/4881; G06F 9/547; G06F 9/6221;
(Continued)

(56) References Cited

U.S. PATENT DOCUMENTS

| | | |
|---|---|---|
| 3,706,503 A | 12/1972 | Foley |
| 5,567,805 A | 10/1996 | Henderson et al. |

(Continued)

FOREIGN PATENT DOCUMENTS

| | | |
|---|---|---|
| AU | 2017203668 A1 | 1/2018 |
| CA | 2818207 C | 7/2018 |

(Continued)

OTHER PUBLICATIONS

International Search Report and Written Opinion for International Application No. PCT/US2020/056144.

(Continued)

*Primary Examiner* — Eric Yen
(74) *Attorney, Agent, or Firm* — Baker Botts L.L.P.

(57) ABSTRACT

In one embodiment, a method includes receiving a user input comprising a natural-language utterance by an assistant xbot from a client system associated with a user, determining a semantic representation of the user input based on a structural ontology defining a labeling syntax for parsing the natural-language utterance to semantic units comprising actions, objects, and attributes, wherein the semantic representation embeds at least one object within at least one action and declares at least one attribute of the embedded object to be acted upon, sending a request based on the (Continued)

semantic representation to an agent for executing a task corresponding to the user input, receiving results of the executed task mapped to a structure determined by the structural ontology from the agent, and sending from the assistant xbot to the client system instructions for presenting a response based on the results of the executed task.

19 Claims, 22 Drawing Sheets

(51) Int. Cl.

| | | |
|---|---|---|
| *G06F 40/205* | (2020.01) | |
| *G06F 40/242* | (2020.01) | |
| *G06N 3/04* | (2006.01) | |
| *G06N 3/08* | (2006.01) | |
| *G06F 16/9536* | (2019.01) | |
| *G10L 15/18* | (2013.01) | |
| *G10L 15/22* | (2006.01) | |
| *G10L 15/30* | (2013.01) | |
| *G10L 15/32* | (2013.01) | |
| *G06F 40/253* | (2020.01) | |
| *G06N 20/00* | (2019.01) | |
| *G06F 3/01* | (2006.01) | |
| *G06Q 50/00* | (2012.01) | |
| *G06F 16/9032* | (2019.01) | |
| *G06F 9/48* | (2006.01) | |
| *G10L 15/08* | (2006.01) | |
| *H04N 7/14* | (2006.01) | |
| *H04L 67/306* | (2022.01) | |
| *G06V 20/20* | (2022.01) | |
| *G06V 20/30* | (2022.01) | |
| *H04L 51/52* | (2022.01) | |
| *H04L 51/212* | (2022.01) | |
| *H04L 67/75* | (2022.01) | |
| *G06F 9/451* | (2018.01) | |
| *G06F 16/332* | (2019.01) | |
| *G06F 40/35* | (2020.01) | |
| *G10L 15/06* | (2013.01) | |
| *G10L 15/16* | (2006.01) | |
| *G06F 18/2321* | (2023.01) | |
| *G06N 3/045* | (2023.01) | |
| *G06N 3/047* | (2023.01) | |
| *G06V 10/764* | (2022.01) | |
| *G06V 10/82* | (2022.01) | |
| *G06V 10/20* | (2022.01) | |
| *G06F 40/56* | (2020.01) | |
| *H04L 51/18* | (2022.01) | |
| *G06F 3/16* | (2006.01) | |
| *G06V 20/40* | (2022.01) | |
| *G06V 40/16* | (2022.01) | |

(52) U.S. Cl.
CPC ............ *G06F 9/485* (2013.01); *G06F 9/4881* (2013.01); *G06F 9/547* (2013.01); *G06F 16/3329* (2019.01); *G06F 16/90332* (2019.01); *G06F 16/9536* (2019.01); *G06F 18/2321* (2023.01); *G06F 40/205* (2020.01); *G06F 40/242* (2020.01); *G06F 40/253* (2020.01); *G06F 40/30* (2020.01); *G06F 40/35* (2020.01); *G06F 40/56* (2020.01); *G06N 3/045* (2023.01); *G06N 3/047* (2023.01); *G06N 3/08* (2013.01); *G06N 20/00* (2019.01); *G06V 10/255* (2022.01); *G06V 10/764* (2022.01); *G06V 10/82* (2022.01); *G06V 20/20* (2022.01); *G06V 20/30* (2022.01); *G10L 15/063* (2013.01); *G10L 15/08* (2013.01); *G10L 15/16* (2013.01); *G10L 15/1815* (2013.01); *G10L 15/1822* (2013.01); *G10L 15/22* (2013.01); *G10L 15/30* (2013.01); *G10L 15/32* (2013.01); *H04L 51/18* (2022.05); *H04L 51/212* (2022.05); *H04L 51/52* (2022.05); *H04L 67/306* (2013.01); *H04L 67/75* (2022.05); *H04N 7/147* (2013.01); *G06F 3/017* (2013.01); *G06F 3/167* (2013.01); *G06V 20/41* (2022.01); *G06V 40/174* (2022.01); *G06V 2201/10* (2022.01); *G10L 2015/088* (2013.01); *G10L 2015/223* (2013.01); *G10L 2015/227* (2013.01)

(58) Field of Classification Search
CPC ............ G06F 16/3329; G06F 16/9536; G06F 16/90332; G06F 40/205; G06F 40/242; G06F 40/253; G06F 40/30; G06F 40/35; G06N 3/0454; G06N 3/0472; G06N 3/08; G06N 20/00; H04L 51/02; H04L 51/212; H04L 51/52; G06Q 50/01; G10L 15/063; G10L 15/08; G10L 15/16; G10L 15/1815; G10L 15/1822; G10L 15/22; G10L 15/30; G10L 15/32

See application file for complete search history.

(56) References Cited

U.S. PATENT DOCUMENTS

| | | | |
|---|---|---|---|
| 5,809,492 | A * | 9/1998 | Murray ................ G06N 5/022 706/45 |
| 6,462,660 | B1 | 10/2002 | Cannon et al. |
| 6,567,805 | B1 | 5/2003 | Johnson et al. |
| 6,760,412 | B1 | 7/2004 | Loucks |
| 7,124,123 | B1 | 10/2006 | Roskind |
| 7,158,678 | B2 | 1/2007 | Nagel |
| 7,228,275 | B1 | 6/2007 | Endo et al. |
| 7,397,912 | B2 | 7/2008 | Aasman |
| 8,027,451 | B2 | 9/2011 | Arendsen |
| 8,548,808 | B2 | 10/2013 | Nakano et al. |
| 8,560,564 | B1 | 10/2013 | Hoelzle |
| 8,677,377 | B2 | 3/2014 | Cheyer |
| 8,706,503 | B2 | 4/2014 | Cheyer et al. |
| 8,862,460 | B2 | 10/2014 | Cai et al. |
| 8,935,192 | B1 | 1/2015 | Ventilla |
| 8,983,383 | B1 | 3/2015 | Haskin |
| 9,060,100 | B2 | 6/2015 | Boortz |
| 9,070,366 | B1 | 6/2015 | Mathias et al. |
| 9,154,739 | B1 | 10/2015 | Nicolaou |
| 9,270,941 | B1 | 2/2016 | Lavelle |
| 9,299,059 | B1 | 3/2016 | Marra |
| 9,304,736 | B1 | 4/2016 | Whiteley |
| 9,338,242 | B1 | 5/2016 | Suchland |
| 9,338,493 | B2 | 5/2016 | Van Os |
| 9,390,724 | B2 | 7/2016 | List |
| 9,418,658 | B1 | 8/2016 | David |
| 9,460,406 | B1 | 10/2016 | Hopper |
| 9,472,206 | B2 | 10/2016 | Ady |
| 9,479,931 | B2 | 10/2016 | Ortiz |
| 9,576,574 | B2 | 2/2017 | van Os |
| 9,607,102 | B2 | 3/2017 | Lavallee et al. |
| 9,659,577 | B1 | 5/2017 | Langhammer |
| 9,720,955 | B1 | 8/2017 | Cao |
| 9,747,895 | B1 | 8/2017 | Jansche |
| 9,792,281 | B2 | 10/2017 | Sarikaya |
| 9,819,823 | B2 | 11/2017 | Hara |
| 9,858,925 | B2 | 1/2018 | Gruber |
| 9,865,260 | B1 | 1/2018 | Vuskovic |
| 9,875,233 | B1 | 1/2018 | Tomkins |
| 9,875,741 | B2 | 1/2018 | Gelfenbeyn |
| 9,881,077 | B1 | 1/2018 | Alfonseca |
| 9,886,953 | B2 | 2/2018 | Lemay |
| 9,971,340 | B1 | 5/2018 | Labrosse et al. |
| 9,972,318 | B1 | 5/2018 | Kelly et al. |

(56) References Cited

U.S. PATENT DOCUMENTS

| | | |
|---|---|---|
| 9,990,591 B2 | 6/2018 | Gelfenbeyn |
| 10,042,032 B2 | 8/2018 | Scott |
| 10,089,072 B2 | 10/2018 | Piersol et al. |
| 10,127,220 B2 | 11/2018 | Bellegarda |
| 10,134,395 B2 | 11/2018 | Typrin |
| 10,140,668 B2 | 11/2018 | Gopinath et al. |
| 10,199,051 B2 | 2/2019 | Binder |
| 10,241,752 B2 | 3/2019 | Lemay |
| 10,268,912 B2 | 4/2019 | Adamek et al. |
| 10,276,170 B2 | 4/2019 | Gruber |
| 10,303,771 B1 | 5/2019 | Jezewski |
| 10,354,653 B1 | 7/2019 | Mjayvergia et al. |
| 10,418,032 B1 | 9/2019 | Mohajer et al. |
| 10,462,422 B1 | 10/2019 | Harrison |
| 10,511,808 B2 | 10/2019 | Harrison |
| 10,559,019 B1 | 2/2020 | Beauvais |
| 10,719,786 B1 | 7/2020 | Treseler |
| 10,748,529 B1 | 8/2020 | Milden |
| 10,762,113 B2 | 9/2020 | Jia et al. |
| 10,782,986 B2 | 9/2020 | Martin |
| 10,785,365 B2 | 9/2020 | Rodriguez et al. |
| 10,791,163 B2 | 9/2020 | Kim et al. |
| 10,805,409 B1 | 10/2020 | Ledet |
| 10,817,713 B2 | 10/2020 | Bui et al. |
| 10,841,249 B2 | 11/2020 | Lim |
| 10,880,384 B1 | 12/2020 | Li et al. |
| 10,963,493 B1 | 3/2021 | Hu et al. |
| 10,978,056 B1 | 4/2021 | Challa et al. |
| 10,997,963 B1 | 5/2021 | Baligar et al. |
| 11,017,764 B1 | 5/2021 | Das et al. |
| 11,037,222 B1 | 6/2021 | Natesh et al. |
| 11,151,992 B2 | 10/2021 | Cui et al. |
| 11,295,745 B1 | 4/2022 | Roy et al. |
| 2003/0160871 A1 | 8/2003 | Pelletier et al. |
| 2003/0225697 A1 | 12/2003 | DeTreville |
| 2004/0044516 A1* | 3/2004 | Kennewick ......... G10L 15/1822 704/E15.04 |
| 2005/0086382 A1 | 4/2005 | Ramaswamy et al. |
| 2005/0273493 A1 | 12/2005 | Buford et al. |
| 2006/0069678 A1 | 3/2006 | Chou et al. |
| 2006/0156252 A1 | 7/2006 | Sheshagiri et al. |
| 2006/0203620 A1 | 9/2006 | Bedingfield, Sr. |
| 2006/0212757 A1 | 9/2006 | Ross et al. |
| 2007/0050191 A1 | 3/2007 | Weider et al. |
| 2007/0100625 A1* | 5/2007 | Silvera .................. G10L 15/22 704/E15.04 |
| 2007/0230282 A1 | 10/2007 | May et al. |
| 2008/0027917 A1* | 1/2008 | Mukherjee ............. G06N 5/022 707/E17.02 |
| 2008/0120616 A1 | 5/2008 | James et al. |
| 2008/0154828 A1 | 6/2008 | Antebi et al. |
| 2008/0240379 A1 | 10/2008 | Maislos |
| 2008/0240406 A1 | 10/2008 | Akula et al. |
| 2008/0300884 A1 | 12/2008 | Smith |
| 2009/0119234 A1 | 5/2009 | Pinckney et al. |
| 2009/0119587 A1* | 5/2009 | Allen .................. G09B 5/00 715/705 |
| 2009/0150156 A1 | 6/2009 | Kennewick et al. |
| 2009/0273659 A1 | 11/2009 | Lee et al. |
| 2009/0282033 A1 | 11/2009 | Alshawi |
| 2009/0307159 A1 | 12/2009 | Pinckney et al. |
| 2010/0205541 A1 | 8/2010 | Rapaport et al. |
| 2010/0217604 A1 | 8/2010 | Baldwin et al. |
| 2010/0228693 A1 | 9/2010 | Dawson et al. |
| 2010/0295676 A1 | 11/2010 | Khachaturov et al. |
| 2011/0246383 A1 | 10/2011 | Gibson |
| 2011/0295594 A1 | 12/2011 | Cai et al. |
| 2011/0302117 A1 | 12/2011 | Pinckney et al. |
| 2011/0307478 A1 | 12/2011 | Pinckney et al. |
| 2012/0035932 A1 | 2/2012 | Jitkoff et al. |
| 2012/0083285 A1 | 4/2012 | Shatsky et al. |
| 2012/0084086 A1 | 4/2012 | Gilbert et al. |
| 2012/0245944 A1 | 9/2012 | Gruber |
| 2012/0246191 A1 | 9/2012 | Xiong |
| 2012/0253825 A1 | 10/2012 | Di Fabbrizio et al. |
| 2012/0265528 A1 | 10/2012 | Gruber |
| 2012/0309363 A1 | 12/2012 | Gruber et al. |
| 2012/0311126 A1 | 12/2012 | Jadallah |
| 2012/0316986 A1 | 12/2012 | Levy et al. |
| 2013/0035930 A1 | 2/2013 | Ferrucci |
| 2013/0124449 A1 | 5/2013 | Pinckney et al. |
| 2013/0198652 A1 | 8/2013 | Dunn et al. |
| 2013/0215116 A1 | 8/2013 | Siddique et al. |
| 2013/0218766 A1 | 8/2013 | Mueller |
| 2013/0268839 A1 | 10/2013 | Lefebvre |
| 2013/0275138 A1 | 10/2013 | Gruber |
| 2013/0275164 A1 | 10/2013 | Gruber |
| 2013/0276022 A1 | 10/2013 | Tidwell |
| 2013/0278631 A1 | 10/2013 | Border et al. |
| 2014/0058679 A1 | 2/2014 | Varoglu et al. |
| 2014/0074483 A1 | 3/2014 | van Os |
| 2014/0090049 A1 | 3/2014 | Friedlander et al. |
| 2014/0104372 A1 | 4/2014 | Calman et al. |
| 2014/0136612 A1 | 5/2014 | Redfern et al. |
| 2014/0164506 A1 | 6/2014 | Tesch |
| 2014/0236678 A1 | 8/2014 | Akerman et al. |
| 2014/0244270 A1 | 8/2014 | Han et al. |
| 2014/0244686 A1 | 8/2014 | Fran et al. |
| 2014/0244712 A1 | 8/2014 | Walters |
| 2014/0253319 A1 | 9/2014 | Chang |
| 2014/0267396 A1 | 9/2014 | Doolittle |
| 2014/0270480 A1 | 9/2014 | Boardman et al. |
| 2014/0280017 A1 | 9/2014 | Indarapu |
| 2014/0297284 A1 | 10/2014 | Gruber |
| 2014/0309990 A1 | 10/2014 | Gandrabur et al. |
| 2014/0372126 A1 | 12/2014 | Ady |
| 2015/0081674 A1 | 3/2015 | Ali |
| 2015/0116519 A1 | 4/2015 | Jarske et al. |
| 2015/0142420 A1 | 5/2015 | Sarikaya |
| 2015/0142704 A1 | 5/2015 | London |
| 2015/0169284 A1 | 6/2015 | Quast |
| 2015/0169744 A1 | 6/2015 | Walkingshaw |
| 2015/0179168 A1 | 6/2015 | Hakkani-Tur |
| 2015/0186156 A1 | 7/2015 | Brown |
| 2015/0207765 A1 | 7/2015 | Brantingham |
| 2015/0227972 A1 | 8/2015 | Fang |
| 2015/0340033 A1 | 11/2015 | Di Fabbrizio et al. |
| 2015/0347375 A1 | 12/2015 | Tremblay |
| 2015/0348551 A1 | 12/2015 | Gruber et al. |
| 2016/0019290 A1 | 1/2016 | Ratnaparkhi |
| 2016/0037311 A1 | 2/2016 | Cho |
| 2016/0042735 A1 | 2/2016 | Vibbert et al. |
| 2016/0050391 A1 | 2/2016 | Schultz et al. |
| 2016/0063118 A1 | 3/2016 | Campbell |
| 2016/0070696 A1 | 3/2016 | Lavallee et al. |
| 2016/0098992 A1 | 4/2016 | Renard et al. |
| 2016/0127641 A1 | 5/2016 | Gove |
| 2016/0155442 A1 | 6/2016 | Kannan et al. |
| 2016/0182727 A1 | 6/2016 | Baran et al. |
| 2016/0187654 A1 | 6/2016 | Border et al. |
| 2016/0196491 A1 | 7/2016 | Chandrasekaran |
| 2016/0203002 A1 | 7/2016 | Kannan et al. |
| 2016/0225370 A1 | 8/2016 | Kannan |
| 2016/0247110 A1 | 8/2016 | Sinha |
| 2016/0255082 A1 | 9/2016 | Rathod |
| 2016/0255170 A1 | 9/2016 | Gargi et al. |
| 2016/0259775 A1 | 9/2016 | Gelfenbeyn et al. |
| 2016/0306505 A1 | 10/2016 | Vigneras |
| 2016/0308799 A1 | 10/2016 | Schubert |
| 2016/0320951 A1 | 11/2016 | Ernst et al. |
| 2016/0328096 A1 | 11/2016 | Tran |
| 2016/0342902 A1 | 11/2016 | Pinckney et al. |
| 2016/0344818 A1 | 11/2016 | Bhayani |
| 2016/0345132 A1 | 11/2016 | Creighton et al. |
| 2016/0350101 A1 | 12/2016 | Gelfenbeyn et al. |
| 2016/0360039 A1 | 12/2016 | Sanghavi |
| 2016/0378849 A1 | 12/2016 | Myslinski |
| 2016/0378861 A1 | 12/2016 | Eledath |
| 2017/0017519 A1 | 1/2017 | Khan et al. |
| 2017/0026318 A1 | 1/2017 | Daniel |
| 2017/0038829 A1 | 2/2017 | Lanier et al. |
| 2017/0039476 A1 | 2/2017 | Eyring et al. |
| 2017/0068423 A1 | 3/2017 | Napolitano et al. |
| 2017/0068550 A1 | 3/2017 | Zeitlin |

(56) References Cited

U.S. PATENT DOCUMENTS

| | | |
|---|---|---|
| 2017/0078510 A1 | 3/2017 | Hara |
| 2017/0084067 A1 | 3/2017 | Son et al. |
| 2017/0091168 A1 | 3/2017 | Bellegarda |
| 2017/0091612 A1 | 3/2017 | Gruber et al. |
| 2017/0092264 A1 | 3/2017 | Hakkani-Tur |
| 2017/0116426 A1 | 4/2017 | Pattabhiraman et al. |
| 2017/0132019 A1 | 5/2017 | Karashchuk |
| 2017/0148307 A1 | 5/2017 | Yeom et al. |
| 2017/0169506 A1 | 6/2017 | Wishne et al. |
| 2017/0185857 A1 | 6/2017 | Adamek et al. |
| 2017/0193390 A1 | 7/2017 | Weston |
| 2017/0243465 A1 | 8/2017 | Bourne, Jr. et al. |
| 2017/0244801 A1 | 8/2017 | Brisebois |
| 2017/0249710 A1 | 8/2017 | Guillama et al. |
| 2017/0270929 A1 | 9/2017 | Aleksic et al. |
| 2017/0300831 A1 | 10/2017 | Gelfenbeyn et al. |
| 2017/0353469 A1 | 12/2017 | Selekman |
| 2017/0357637 A1 | 12/2017 | Nell et al. |
| 2017/0358141 A1 | 12/2017 | Stafford et al. |
| 2017/0358302 A1 | 12/2017 | Orr et al. |
| 2017/0358304 A1 | 12/2017 | Castillo Sanchez |
| 2017/0358305 A1 | 12/2017 | Kudurshian et al. |
| 2017/0359707 A1 | 12/2017 | Diaconu |
| 2018/0006990 A1 | 1/2018 | Munemann |
| 2018/0012601 A1 | 1/2018 | Kumar et al. |
| 2018/0013699 A1 | 1/2018 | Sapoznik |
| 2018/0018562 A1 | 1/2018 | Jung |
| 2018/0018971 A1 | 1/2018 | Park et al. |
| 2018/0018987 A1 | 1/2018 | Zass |
| 2018/0040020 A1 | 2/2018 | Kurian |
| 2018/0054523 A1 | 2/2018 | Zhang |
| 2018/0095636 A1 | 4/2018 | Valdivia et al. |
| 2018/0096071 A1 | 4/2018 | Green |
| 2018/0096072 A1 | 4/2018 | He |
| 2018/0096302 A1 | 4/2018 | Tseretopoulos et al. |
| 2018/0107917 A1 | 4/2018 | Hewavitharana |
| 2018/0121508 A1 | 5/2018 | Halstvedt |
| 2018/0124438 A1 | 5/2018 | Barnett |
| 2018/0181997 A1 | 6/2018 | Sanjeevaiah Krishnaiah et al. |
| 2018/0188695 A1 | 7/2018 | Kumar et al. |
| 2018/0189352 A1 | 7/2018 | Ghafourifar |
| 2018/0189629 A1 | 7/2018 | Yatziv |
| 2018/0191732 A1 | 7/2018 | Erciyes et al. |
| 2018/0210874 A1 | 7/2018 | Fuxman |
| 2018/0213284 A1 | 7/2018 | Shekhar et al. |
| 2018/0218739 A1 | 8/2018 | Park et al. |
| 2018/0233128 A1 | 8/2018 | Chen et al. |
| 2018/0233132 A1 | 8/2018 | Herold et al. |
| 2018/0233139 A1 | 8/2018 | Finkelstein et al. |
| 2018/0247221 A1 | 8/2018 | Park et al. |
| 2018/0260189 A1 | 9/2018 | Li |
| 2018/0286507 A1 | 10/2018 | Gass et al. |
| 2018/0293484 A1 | 10/2018 | Wang |
| 2018/0307303 A1 | 10/2018 | Powderly et al. |
| 2018/0314689 A1 | 11/2018 | Wang et al. |
| 2018/0329998 A1 | 11/2018 | Thomson |
| 2018/0330723 A1 | 11/2018 | Acero et al. |
| 2018/0330725 A1 | 11/2018 | Varadharajan et al. |
| 2018/0336188 A1 | 11/2018 | Tran et al. |
| 2018/0336414 A1 | 11/2018 | Badr et al. |
| 2019/0007546 A1 | 1/2019 | Anderson |
| 2019/0012198 A1 | 1/2019 | Ni et al. |
| 2019/0012714 A1 | 1/2019 | Bright |
| 2019/0036923 A1 | 1/2019 | Xuan et al. |
| 2019/0074006 A1 | 3/2019 | Kumar et al. |
| 2019/0080168 A1 | 3/2019 | Nowak-Przygodzki et al. |
| 2019/0080698 A1 | 3/2019 | Miller |
| 2019/0087455 A1 | 3/2019 | He et al. |
| 2019/0087491 A1 | 3/2019 | Bax |
| 2019/0095846 A1 | 3/2019 | Gupta et al. |
| 2019/0103103 A1 | 4/2019 | Ni et al. |
| 2019/0108639 A1 | 4/2019 | Tchapmi et al. |
| 2019/0139150 A1 | 5/2019 | Brownhill |
| 2019/0147173 A1 | 5/2019 | Mai |
| 2019/0147348 A1 | 5/2019 | Ng et al. |
| 2019/0156204 A1 | 5/2019 | Bresch et al. |
| 2019/0164547 A1 | 5/2019 | Yoo et al. |
| 2019/0180743 A1 | 6/2019 | Yoshida et al. |
| 2019/0188328 A1 | 6/2019 | Oyenan et al. |
| 2019/0206400 A1 | 7/2019 | Cui et al. |
| 2019/0208124 A1 | 7/2019 | Newman et al. |
| 2019/0213490 A1 | 7/2019 | White |
| 2019/0213999 A1 | 7/2019 | Grupen et al. |
| 2019/0219415 A1 | 7/2019 | Wang |
| 2019/0220668 A1 | 7/2019 | Siskind et al. |
| 2019/0228494 A1 | 7/2019 | Stasi et al. |
| 2019/0228780 A1 | 7/2019 | Athias |
| 2019/0236628 A1 | 8/2019 | Sudhindra et al. |
| 2019/0237068 A1 | 8/2019 | Canim et al. |
| 2019/0248012 A1 | 8/2019 | Nelson |
| 2019/0311036 A1 | 10/2019 | Shanmugam |
| 2019/0311714 A1 | 10/2019 | Barbello et al. |
| 2019/0318729 A1 | 10/2019 | Chao et al. |
| 2019/0324527 A1 | 10/2019 | Presant |
| 2019/0324553 A1 | 10/2019 | Liu |
| 2019/0324779 A1 | 10/2019 | Martin |
| 2019/0324780 A1 | 10/2019 | Zhu |
| 2019/0325042 A1 | 10/2019 | Yu |
| 2019/0325080 A1 | 10/2019 | Natarajan |
| 2019/0325081 A1 | 10/2019 | Liu |
| 2019/0325084 A1 | 10/2019 | Peng |
| 2019/0325873 A1 | 10/2019 | Mathias et al. |
| 2019/0327330 A1 | 10/2019 | Natarajan |
| 2019/0327331 A1 | 10/2019 | Natarajan |
| 2019/0334571 A1 | 10/2019 | Khawand et al. |
| 2019/0340200 A1 | 11/2019 | Coimbra et al. |
| 2019/0340510 A1 | 11/2019 | Li et al. |
| 2019/0348033 A1 | 11/2019 | Chen |
| 2019/0361408 A1 | 11/2019 | Tokuchi |
| 2019/0391834 A1 | 12/2019 | Mullen et al. |
| 2020/0012886 A1 | 1/2020 | Walters et al. |
| 2020/0012930 A1 | 1/2020 | Kumar |
| 2020/0042240 A1 | 2/2020 | Therene et al. |
| 2020/0051338 A1 | 2/2020 | Zia et al. |
| 2020/0097814 A1 | 3/2020 | Devesa |
| 2020/0117336 A1 | 4/2020 | Mani et al. |
| 2020/0117758 A1 | 4/2020 | Lu et al. |
| 2020/0160042 A1 | 5/2020 | Bui et al. |
| 2020/0184956 A1 | 6/2020 | Agarwal et al. |
| 2020/0202845 A1 | 6/2020 | Jacobson et al. |
| 2020/0202846 A1 | 6/2020 | Bapna et al. |
| 2020/0218780 A1 | 7/2020 | Mei et al. |
| 2020/0228469 A1 | 7/2020 | Mullins et al. |
| 2020/0334567 A1 | 10/2020 | Bhattacharjee et al. |
| 2020/0342039 A1 | 10/2020 | Bakir et al. |
| 2020/0349919 A1 | 11/2020 | Wanas et al. |
| 2020/0372111 A1 | 11/2020 | Ho et al. |
| 2020/0379726 A1 | 12/2020 | Blatz et al. |
| 2020/0388282 A1 | 12/2020 | Secker-Walker et al. |
| 2020/0410012 A1 | 12/2020 | Moon et al. |
| 2021/0011684 A1 | 1/2021 | Trim et al. |
| 2021/0035239 A1 | 2/2021 | Srivastava et al. |
| 2021/0043209 A1 | 2/2021 | Kim et al. |
| 2021/0048987 A1* | 2/2021 | Kedida ............... G06F 8/65 |
| 2021/0056968 A1 | 2/2021 | Shreeshreemal et al. |
| 2021/0064828 A1 | 3/2021 | Johnson Premkumar |
| 2021/0064829 A1* | 3/2021 | Lavallée ............ G06F 40/30 |
| 2021/0118442 A1 | 4/2021 | Poddar et al. |
| 2021/0264913 A1 | 8/2021 | Schramm et al. |
| 2021/0295166 A1 | 9/2021 | Rouhani et al. |
| 2022/0279051 A1 | 9/2022 | Khemka et al. |

FOREIGN PATENT DOCUMENTS

| | | |
|---|---|---|
| EP | 2530870 A1 | 12/2012 |
| EP | 3122001 A1 | 1/2017 |
| EP | 3444814 A1 | 2/2019 |
| EP | 3929771 A1 | 12/2021 |
| WO | WO 2012/116241 | 8/2012 |
| WO | 2015179510 A1 | 11/2015 |
| WO | WO 2015183401 A1 | 12/2015 |
| WO | 2016195739 A1 | 12/2016 |
| WO | 2017044163 A1 | 3/2017 |

(56) References Cited

FOREIGN PATENT DOCUMENTS

| WO | 2017053208 A1 | 3/2017 |
|---|---|---|
| WO | 2017116488 A1 | 7/2017 |
| WO | 2019078576 A1 | 4/2019 |

OTHER PUBLICATIONS

Parthasarathi P., et al., "Extending Neural Generative Conversational Model using External Knowledge Sources," Computational and Language, Sep. 14, 2018, 6 Pages.

Pavel M., et al., "Behavioral Informatics and Computational Modeling in Support of Proactive Health Management and Care," IEEE Transactions on Biomedical Engineering, IEEE Service Center, Piscataway, NJ, USA, Dec. 1, 2015, vol. 62 (12), 32 Pages, XP011590079.

Pennington J., et al., "GLOVE: Global Vectors for Word Representation," Proceedings of the 2014 Conference on Empirical Methods in Natural Language Processing (EMNLP), Oct. 24-29, 2014, 12 Pages.

Planells J., et al., "A Multi-domain Dialog System to Integrate Heterogeneous Spoken Dialog Systems," Interspeech [Online], Aug. 25, 2013, 5 Pages, XP055650758, Retrieved from the Internet: URL: https://www.isca-speech.org/archive/archive_papers/interspeech_2013/i13_1891.pdf.

Poliak A., et al., "Efficient, Compositional, Order-Sensitive n-gram Embeddings," Proceedings of the 15th Conference of the European Chapter of the Association for Computational Linguistics, Apr. 3-7, 2017, vol. 2, pp. 503-508.

Rajpurkar P., et al., "Know What You Don't Know: Unanswerable Questions for SQuAD," arXiv preprint arXiv: 1806.03822, Jun. 11, 2018, 9 Pages.

Rajpurkar P., et al., "SQuAD: 100,000+ Questions for Machine Comprehension of Text," arXiv preprint arXiv: 1606.05250, Oct. 11, 2016, 10 Pages.

Reddy S., et al., "COQA: A Conversational Question Answering Challenge," Transactions of the Association for Computational Linguistics, May 29, 2019, vol. 7, pp. 249-266.

Salem Y., et al., "History-Guided Conversational Recommendation," Proceedings of the 23rd International Conference on World Wide Web, ACM, Apr. 7-11, 2014, 6 Pages.

Sarikaya R., "The Technology Behind Personal Digital Assistants: An Overview of the System Architecture and Key Components," IEEE Signal Processing Magazine, Jan. 1, 2017, vol. 34 (1), pp. 67-81, XP011639190.

Scherer K.R., et al., "Vocal Cues in Emotion Encoding and Decoding," Motivation and emotion, Jun. 1, 1991, vol. 15 (2), 27 Pages.

Seo M., et al., "Bidirectional Attention Flow for Machine Comprehension," arXiv preprint arXiv: 1611.01603, Jun. 21, 2018, 13 Pages.

Shen J., et al., "Natural TTS Synthesis by Conditioning Wavenet on Mel Spectrogram Predictions," 2018 IEEE International Conference on Acoustics Speech and Signal Processing, Apr. 15, 2018, 5 Pages.

Shiee N., et al., "Take Your Best Selfie Automatically, with Photobooth on Pixel 3," Google AI Blog [Online], Apr. 1, 2019 [Retrieved on Nov. 24, 2020], pp. 1-4, XP055753559, Retrieved from the Internet: URL: https://ai.googleblog.com/2019/04/take-your-best-selfie-automatically.html.

Skerry-Ryan R.J., et al., "Towards End-to-End Prosody Transfer for Expressive Speech Synthesis with Tacotron," ICML 2018, Mar. 24, 2018, 11 Pages.

Sukhbaatar S., et al., "End-to-End Memory Networks," Advances in Neural Information Processing Systems, Nov. 24, 2015, 9 Pages.

Sun Y., et al., "Conversational Recommender System," The 41st International ACM SIGIR Conference on Research & Development in Information Retrieval, ACM, Jul. 8-12, 2018, 10 Pages.

Sutskever I., et al., "Sequence to Sequence Learning with Neural Networks," Advances in Neural Information Processing Systems, Sep. 10, 2014, 9 Pages.

Tachibana M., et al., "HMM-based Speech Synthesis with Various Speaking Styles using Model Interpolation," Speech Prosody, 2004, 4 Pages.

Tits N., et al., "Visualization and Interpretation of Latent Spaces for Controlling Expressive Speech Synthesis Through Audio Analysis," Interspeech 2019, Mar. 27, 2019, 5 Pages.

Tran K., et al., "Recurrent Memory Networks for Language Modeling," arXiv preprint arXiv: 1601.01272, Apr. 22, 2016, 11 Pages.

Trigeorgis G., et al., "Adieu Features? End-to-End Speech Emotion Recognition Using a Deep Convolutional Recurrent Network," 2016 IEEE International Conference on Acoustics, Speech and Signal Processing (ICASSP), Mar. 20, 2016, 5 Pages.

Turniski F., et al., "Analysis of 3G and 4G Download Throughput in Pedestrian Zones," Proceedings Elmar-2013, Sep. 12, 2016, pp. 9-12, XP032993723.

Vaswani A., et al., "Attention Is All You Need," Advances in Neural Information Processing Systems, 2017, pp. 5998-6008.

Vries H.D., et al., "Talk The Walk: Navigating New York City Through Grounded Dialogue," arXiv prepnnt arXiv: 1807.03367, Dec. 23, 2018, 23 Pages.

Wang P., et al., "FVQA: Fact-Based Visual Question Answering," IEEE Transactions on Pattern Analysis and Machine Intelligence, Aug. 8, 2017, pp. 2413-2427.

Wang Y., et al., "Dialogue Intent Classification with Character-CNN-BGRU Networks," Multimedia Tools and Applications, Jun. 11, 2019, vol. 79 (8), pp. 4553-4572, XP037048798.

Wang Y., et al., "Style Tokens: Unsupervised Style Modeling, Control and Transfer in End-to-End Speech Synthesis," ICML 2018, Mar. 23, 2018, 11 Pages.

Wang Y., et al., "Uncovering Latent Style Factors for Expressive Speech Synthesis," arXiv pre print arXiv: 1711.00520, Nov. 1, 2017, 5 Pages.

Wang Z., et al., "Knowledge Graph Embedding by Translating on Hyperplanes," 28th AAAI Conference on Artificial Intelligence, Jun. 21, 2014, 8 Pages.

Wei W., et al., "Airdialogue: An Environment for Goal-Oriented Dialogue Research," Proceedings of the 2018 Conference on Empirical Methods in Natural Language Processing, Nov. 4, 2018, 11 Pages.

Welbl J., et al., "Constructing Datasets for Multi-Hop Reading Comprehension Across Documents," Transactions of the Association for Computational Linguistics, Jun. 11, 2018, vol. 6, pp. 287-302.

Neston J., et al., "Memory Networks," arXiv preprint arXiv: 1410.3916, Nov. 29, 2015, 15 Pages.

"What is Conversational AI?," Glia Blog [Online], Sep. 13, 2017 [Retrieved on Jun. 14, 2019], 3 Pages, Retrieved from Internet: URL: https://blog.salemove.com/what-is-conversational-ai/.

Wikipedia, "Dialog Manager," Dec. 16, 2006-Mar. 13, 2018 [Retrieved on Jun. 14, 2019], 8 Pages, Retrieved from Internet: https://en.wikipedia.org/wiki/Dialog_manager.

Wikipedia, "Natural-Language Understanding," Nov. 11, 2018-Apr. 3, 2019 [Retrieved on Jun. 14, 2019], 5 Pages, Retrieved from Internet: URL: https://en.wikipedia.org/wiki/Natural-language_understanding.

Wikipedia, "Speech Synthesis," Jan. 24, 2004-Jun. 5, 2019 [Retrieved on Jun. 14, 2019], 19 Pages, Retrieved from Internet: URL: https://en.wikipedia.org/wiki/Speech_synthesis.

Wikipedia, "Question Answering," Feb. 15, 2018 [Retrieved on Jun. 14, 2019], 6 Pages, Retrieved from Internet: URL: https://en.wikipedia.org/wiki/Question_answering.

Williams J.D., et al., "Hybrid Code Networks: Practical and Efficient End-to-End Dialog Control with Supervised and Reinforcement Learning," arXiv preprint arXiv: 1702.03274, Apr. 24, 2017, 13 Pages.

Wu Q., et al., "Image Captioning and Visual Question Answering Based on Attributes and External Knowledge," IEEE Transactions on Pattern Analysis and Machine Intelligence, Dec. 16, 2016, vol. 40 (6), 14 Pages.

Xu K., et al., "Question Answering on Freebase via Relation Extraction and Textual Evidence," Proceedings of the 54th Annual Meeting of the Association for Computational Linguistics, Jun. 9, 2016, 11 Pages.

(56) References Cited

OTHER PUBLICATIONS

Xu P., et al., "Convolutional Neural Network Based Triangular CRF for Joint Intent Detection and Slot Filling," 2013 IEEE Workshop on Automatic Speech Recognition and Understanding, Dec. 8, 2013, pp. 78-83, XP032544418.
Yamagishi J., et al., "Modeling of Various Speaking Styles and Emotions for HMM-based Speech Synthesis," 8th European Conference on Speech Communication and Technology, 2003, 4 Pages.
Yamagishi J., et al., "Speaking Style Adaptation using Context Clustering Decision Tree for HMM-based Speech Synthesis," 2004 IEEE International Conference on Acoustics, Speech, and Signal Processing, May 17, 2004, vol. 1, 4 Pages.
Yang Z., et al., "Hierarchical Attention Networks for Document Classification," Proceedings of the 2016 Conference of the North American Chapter of the Association for Computational Linguistics, Jun. 12-17, 2016, 10 Pages.
Yang Z., et al., "HOTPOTQA: A Dataset for Diverse, Explainable Multi-Hop Question Answering," Proceedings of the 2018 Conference on Empirical Methods in Natural Language Processing, Sep. 25, 2018, 12 Pages.
Yeung K.F., et al., "A Proactive Personalised Mobile Recommendation System Using Analytic Hierarchy Process and Bayesian Network," Journal of Internet Services and Applications, Jul. 20, 2012, vol. 3 (2), pp. 195-214, XP055754649.
Yin W., et al., "Simple Question Answering by Attentive Convolutional Neural Network," arXiv preprint arXiv: 1606.03391, Oct. 11, 2016, 11 Pages.
Yoon S., et al., "Multimodal Speech Emotion Recognition Using Audio and Text," 2018 IEEE Spoken Language Technology Workshop (SET), Dec. 18, 2018, 7 Pages.
Young T., et al., "Augmenting End-to-End Dialogue Systems with Commonsense Knowledge," The Thirty-Second AAAI Conference on Artificial Intelligence, Apr. 26, 2018, 8 Pages.
Agrawal A., et al., "VQA: Visual Question Answering," International Journal of Computer Vision, Oct. 2016, pp. 1-25.
Anonymous, "Make it Famous ( Experiential photography platform)," Jun. 1, 2019 [Retrieved on Nov. 23, 2020], pp. 1-9, XP055753168, Retrieved from the Internet: URL: https://www.miracam.com/wp-content/themes/mira/assets/pdf/Mira_SpecSheet_201906.pdf.
Bahdanau D., et al., "Neural Machine Translation by Jointly Learning to Align and Translate," Conference paper at International Conference on Learning Representations, arXiv preprint arXiv: 1409.0473v7, 2015, 15 pages.
Bailey K., "Conversational AI and the Road Ahead," TechCrunch [Online], Feb. 15, 2018 [Retrieved on Jun. 14, 2019], 13 Pages, Retrieved from Internet: URL: https://techcrunch.com/2017/02/25/conversational-ai-and-the-road-ahead/.
Banse R., et al., "Acoustic Profiles in Vocal Emotion Expression," Journal of Personality and Social Psychology, Mar. 1996, vol. 70 (3), pp. 614-636.
Bast H., et al., "Easy Access to the Freebase Dataset," Proceedings of the 23rd International Conference on Worid Wide Web, ACM, Apr. 7-11, 2014, 4 Pages.
Bauer L., et al., "Commonsense for Generative Multi-Hop Question Answering Tasks," 2018 Empirical Methods in Natural Language Processing, Jun. 1, 2019, 22 Pages.
Betermieux S., et al., "Finalizing Dialog Models at Runtime," Big Data Analytics in the Social and Ubiquitous Context, Jul. 16, 2007, 15 Pages, XP047417162.
Billsus D., et al., "Improving Proactive Information Systems," 2005 International Conference on Intelligent User Interfaces, IUI 05, Jan. 9-12, 2005, pp. 159-166, XP058319582.
Bonnington C., "Google Clips Smart Camera isn't Smart Enough, But its Aims are Still Worth Considering," Slate [Online], Feb. 27, 2018 [Retrieved on Nov. 23, 2020], pp. 1-3, XP055753206, Retrieved from the Internet: URL: https://slate.com/technology/2018/02/google-clips-smart-camera-isnt-smart-enough-but-its-aims-are-still-worth-considering.html.
Bordes A., et al., "Learning End-to-End Goal-Oriented Dialog," Facebook AI, New York, USA, Mar. 30, 2017, 15 Pages.
Bordes A., et al., "Translating Embeddings for Modeling Multi-Relational Data," Advances in Neural Information Processing Systems, Dec. 5, 2013, 9 Pages.
Bordes A., "Large-Scale Simple Question Answering with Memory Networks," arXiv preprint arXiv: 1506.02075, Jun. 5, 2015, 10 Pages.
Bui D., et al., "Federated User Representation Learning," Machine Leaning, Sep. 27, 2019, 10 Pages.
Busso C., et al., "IEMOCAP: Interactive Emotional Dyadic Motion Capture Database," Language Resources and Evaluation, Dec. 1, 2008, vol. 42 (4), 30 Pages.
Calrke P., et al., "Think You have Solved Question Answering? Try ARC, the AI2 Reasoning Challenge," Allen Instituite for Artificial Intelligence, Seattle, WA, USA, Mar. 14, 2018, 10 Pages.
Carlson A., et al., "Toward an Architecture for Never-Ending Language Learning," Twenty-Fourth AAAI Conference an Artificial intelligence, Jul. 5, 2010, 8 Pages.
Challa A., et al., "Generate, Filter, and Rank: Grammaticality Classification for Production-Ready NLG Systems," Facebook Conversational AI, Apr. 9, 2019, 10 Pages.
Chen C.Y., et al., "Gunrock: Building A Human-Like Social Bot By Leveraging Large Scale Real User Data," 2nd Proceedings of Alexa Price, 2018, 19 Pages.
Chen Y., et al., "Jointly Modeling Inter-Slot Relations by Random Walk on Knowledge Graphs for Unsupervised Spoken Language Understanding," Proceedings of the 2015 Conference of the North American Chapter of the Association for Computational Linguistics, Human Language Technologies, May 31-Jun. 5, 2015, 11 Pages.
Choi E., et al., "QuAC: Question Answering in Context," Allen Instituite for Artificial Intelligence, Aug. 28, 2018, 11 Pages.
Conneau A., et al., "Supervised Learning of Universal Sentence Representations from Natural Language Inference Data," Conference: Proceedings of the 2017 Conference on Empirical Methods in Natural Language Processing, Jul. 8, 2018, 12 Pages.
Constantinides P.C., et al., "A Schema Based Approach to Dialog Control," 5th International Conference on Spoken Language Processing, Oct. 1, 1998, 4 Pages, XP007000460.
Co-pending U.S. Appl. No. 14/593,723, inventors Colin; Patrick Treseler et al., filed Jan. 9, 2015.
Co-pending U.S. Appl. No. 15/808,638, inventors Ryan; Brownhill et al., filed Nov. 9, 2017.
Co-pending U.S. Appl. No. 15/949,011, inventors Jason; Francis Harrison et al., filed Apr. 9, 2018.
Co-Pending U.S. Appl. No. 15/966,455, inventor Scott; Martin, filed Apr. 30, 2018.
Co-Pending U.S. Appl. No. 15/967,239, inventors Vivek; Natarajan et al., filed Apr. 30, 2018.
Co-Pending U.S. Appl. No. 15/967,290, inventors Fuchun; Peng et al., filed Apr. 30, 2018.
Co-Pending U.S. Appl. No. 15/967,342, inventors Vivek; Natarajan et al., filed Apr. 30, 2018.
Co-Pending U.S. Appl. No. 16/011,062, inventors Jinsong; Yu et al., filed Jun. 18, 2018.
Co-Pending U.S. Appl. No. 16/053,600, inventors Vivek; Natarajan et al., filed Aug. 2, 2018.
Co-Pending U.S. Appl. No. 16/118,169, inventors Baiyang; Liu et al., filed Aug. 30, 2018.
Co-Pending U.S. Appl. No. 16/150,069, inventors Jiedan; Zhu et al., filed Oct. 2, 2018.
Co-Pending U.S. Appl. No. 16/153,574, filed Oct. 5, 2018, 94 pages.
Co-Pending U.S. Appl. No. 16/153,574, inventors Jason; Harrison et al., filed Oct. 5, 2018.
Co-Pending U.S. Appl. No. 16/388,130, inventors Xiaohu; Liu et al., filed Apr. 18, 2019.
Co-pending U.S. Appl. No. 16/389,708, inventors William; Crosby Presant et al., filed Apr. 19, 2019.
Co-pending U.S. Appl. No. 16/998,423, filed Aug. 20, 2020, 124 pages.
Co-pending U.S. Appl. No. 17/006,260, filed Aug. 28, 2020, 103 pages.

(56) References Cited

OTHER PUBLICATIONS

Co-pending U.S. Appl. No. 17/006,339, filed Aug. 28, 2020, 132 pages.
Co-pending U.S. Appl. No. 17/006,377, filed Aug. 28, 2020, 132 pages.
Co-pending U.S. Appl. No. 17/136,636, filed Dec. 29, 2020, 119 pages.
Daha F.Z., et al., "Deep Neural Architecture with Character Embedding for Semantic Frame Detection," 2019 IEEE 13th International Conference on Semantic Computing (ICSC), Jan. 30, 2019, pp. 302-307, XP033529242.
Dalton J., et al., "Vote Goat: Conversational Movie Recommendation," The 41st International ACM SIGIR Conference on Research & Development in Information Retrieval, ACM, Jul. 2018, 5 Pages.
Dauphin Y.N., et al., "Language Modeling with Gated Convolutional Networks," Cornell University Library, NY 14853, Dec. 23, 2016, 9 Pages, XP080742751.
Dettmers T., et al., "Convolutional 2D Knowledge Graph Embeddings," Thirty-Second AAAI Conference on Artificial Intelligence, Apr. 25, 2018, 8 Pages.
Dubey M., et al., "EARL: Joint Entity and Relation Linking for Question Answering Over Knowledge Graphs," International Semantic Web Conference, Springer, Cham, Jun. 25, 2018, 16 Pages.
Dubin R., et al., "Adaptation Logic for HTTP Dynamic Adaptive Streaming using Geo-Predictive Crowdsourcing," Springer, Feb. 5, 2016, 11 Pages.
Duchi J., et al., "Adaptive Subgradient Methods for Online Learning and Stochastic Optimization," Journal of Machine Learning Research, Jul. 2011, vol. 12, pp. 2121-2159.
Duong L., et al., "An Adaptable Task-Oriented Dialog System for Stand-alone Embedded Devices," Proceedings of the 57th Annual Meeting of the Association for Computational Linguistics, System Demonstrations, Jul. 28, 2019, pp. 49-57, XP055767185.
Dyer C., et al., "Recurrent Neural Network Grammars," Proceedings of NAACL-HLT, San Diego, California, Jun. 12-17, 2016, pp. 199-209.
Elgan M., "How Lifelogging Will Become Easy and Automatic," Computerworld [Online], Nov. 19, 2016 [Retrieved on Nov. 23, 2020], pp. 1-7, XP055753230, Retrieved from the Internet: URL: https://www.computerworld.com/article/3143115/how-lifelogging-will-become-easy-and-automatic.html.
Fiscus J.G., et al., "A Post-processing System to Yield Reduced Word Error Rates: Recognizer Output Voting Error Reduction (ROVER)," Automatic Speech Recognition and Understanding, Dec. 14-17, 1997, pp. 347-354, XP010267529.
Ganin Y., et al., "Domain-Adversarial Training of Neural Networks," Journal of Machine Learning Research, Jan. 2016, vol. 17, pp. 2096-2030.
Gao Y., "Demo for Interactive Text-to-Speech via Semi-Supervised Style Transfer Learning," Interspeech [Online], 2019 [Retrieved on Oct. 21, 2019], 3 Pages, Retrieved from Internet: URL: https://yolanda-gao.github.io/Interactive-Style-TTS/.
Ghazvininejad M., et al., "A Knowledge-Grounded Neural Conversation Model," Thirty-Second AAAI Conference on Artificial Intelligence, Apr. 27, 2018, 8 Pages.
Glass J., "A Brief Introduction to Automatic Speech Recognition," Nov. 13, 2007, 22 Pages, Retrieved from Internet: http://www.cs.columbia.edu/~mcollins/6864/slides/asr.pdf.
Goetz J., et al., "Active Federated Learning," Machine Learning, Sep. 27, 2019, 5 Pages.
Google Allo Makes Conversations Eeasier, Productive, and more Expressive, May 19, 2016 [Retrieved on Jul. 11, 2019], 13 Pages, Retrieved from Internet: URL: https://www.trickyways.com/2016/05/google-allo-makes-conversations-eeasier-productive-expressive/.
Han K., et al., "Speech Emotion Recognition using Deep Neural Network and Extreme Learning Machine," Fifteenth Annual Conference of the International Speech Communication Association, 2014, 5 Pages.
He H., et al., "Learning Symmentric Collaborative Dialogue Agents with Dynamic Knowledge Graph Embeddings," Proceedings of the 55th Annual Meeting of the Association for Computational Linguistics, Apr. 24, 2017, 18 Pages.
Henderson M., et al., "The Second Dialog State Tracking Challenge," Proceedings of the 15th Annual Meeting of the Special Interest Group on Discourse and Dialogue (SJGDL4L), Jun. 18-20, 2014, 10 Pages.
Henter G.E., et al., "Principles for Learning Controllable TTS from Annotated and Latent Variation," Interspeech, Aug. 20-24, 2017, 5 Pages.
Hodari Z., et al., "Learning Interpretable Control Dimensions for Speech Synthesis by Using External Data," Interspeech, Sep. 2-6, 2018, 5 Pages.
Hsiao W., et al., "Fashion++: Minimal Edits for Outfit Improvement," Computer Vision and Pattern Recognition, Apr. 19, 2019, 17 Pages.
Huang S., "Word2Vec and FastText Word Embedding with Gensim," Towards Data Science [Online], Feb. 4, 2018 [Retrieved on Jun. 14, 2019], 11 Pages, Retrieved from Internet: URL: https://towardsdatascience.com/word-embedding-with-word2vec-and-fasttext-a209c1d3e12c.
Hubara I., et al., "Quantized Neural Networks: Training Neural Networks with Low Precision Weights and Activations," Journal of Machine Learning Research [Online], Sep. 22, 2016 [Retrieved on Jan. 20, 2021], vol. 18, 30 Pages, XP055611103, Retrieved from the Internet: URL: https://arxiv.org/pdf/1609.07061.pdf.
Hudson D.A., et al., "GQA: A New Dataset for Real-world Visual Reasoning and Compositional Question Answering," Proceedings of the IEEE Conference on Computer Vision and Pattern Recognition, May 10, 2019, 18 Pages.
International Search Report and Written Opinion for International Application No. PCT/US2020/052866, dated Dec. 9, 2020, 11 Pages.
International Search Report and Written Opinion for International Application No. PCT/US2020/052955, dated Nov. 27, 2020, 12 Pages.
International Search Report and Written Opinion for International Application No. PCT/US2020/052966, dated Dec. 14, 2020, 12 Pages.
International Search Report and Written Opinion for International Application No. PCT/US2020/052969, dated Dec. 9, 2020, 11 Pages.
International Search Report and Written Opinion for International Application No. PCT/US2020/054604, dated Jan. 29, 2021, 17 Pages.
International Search Report and Written Opinion for International Application No. PCT/US2020/056188, dated Dec. 9, 2020, 12 Pages.
Jiang L., et al., "MEMEXQA: Visual Memex Question Answering," arXiv preprint arXiv: 1708.01336, Aug. 4, 2017, 10 Pages.
Jung H., et al., "Learning What to Remember: Long-term Episodic Memory Networks for Learning from Streaming Data," arXiv preprint arXiv: 1812.04227, Dec. 11, 2018, 10 Pages.
Kartsaklis D., et al., "Mapping Text to Knowledge Graph Entities using Multi-Sense LSTMs," Department of Theoretical and Applied Linguistics, Aug. 23, 2018, 12 Pages.
Kim Y., et al., "Character-Aware Neural Language Models," Proceedings of the Thirtieth AAAI Conference on Artificial Intelligence [Online], Oct. 16, 2015 [Retrieved on Apr. 12, 2018], 9 Pages, XP055466626, Retrieved from the Internet: URL: https://arxiv.org/pdf/1508.06615.pdf.
King S., "The Blizzard Challenge 2017," In Proceedings Blizzard Challenge, 2017, pp. 1-17.
Laddha A., et al., "Understanding Chat Messages for Sticker Recommendation in Messaging Apps," Cornell University Library, NY 14853, Feb. 7, 2019, 8 Pages, XP081537983.
Lao N., et al., "Random Walk Inference and Learning in A Large Scale Knowledge Base," Proceedings of the Conference on Empirical Methods in Natural Language Processing Association for Computational Linguistics, Jul. 27, 2011, 11 Pages.

(56) References Cited

OTHER PUBLICATIONS

Lee C.C., et al., "Emotion Recognition using a Hierarchical Binary Decision Tree Approach," Speech Communication, Nov. 1, 2011, vol. 53, pp. 1162-1171.
Li J., et al., "A Persona-based Neural Conversation Model," arXiv preprint arXiv: 1603.06155, Jun. 8, 2016, 10 Pages.
Li Y., et al., "Adaptive Batch Normalization for Practical Domain Adaptation," Pattern Recognition, Aug. 2018, vol. 80, pp. 109-117.
Locatello F., et al., "Challenging Common Assumptions in the Unsupervised Learning of Disentangled Representations," ICLR 2019, Nov. 29, 2018, 37 Pages.
Long Y., et al., "A Knowledge Enhanced Generative Conversational Service Agent," DSTC6 Workshop, Dec. 2017, 6 Pages.
Mamou J., et al., "System Combination and Score Normalization for Spoken Term Detection," IEEE International Conference on Accoustics and Speech and Signal Processing, Proceedings 1999, May 26, 2013, pp. 8272-8276, XP032508928.
Martin S., et al., "MuDoCo: Corpus for Multidomain Coreference Resolution and Referring Expression Generation," In Proceedings of the 12th Conference on Language Resources and Evaluation Conference, May 16, 2020, pp. 104-111.
McCross T., "Dialog Management," Feb. 15, 2018 [Retrieved on Jun. 14, 2019], 12 Pages, Retrieved from Internet: https://tutorials.botsfloor.com/dialog-management-799c20a39aad.
Miller A.H., et al., "PARLAI: A Dialog Research Software Platform," Facebook AI Research, May 18, 2017, 7 Pages.
Moon S., et al., "Completely Heterogeneous Transfer Learning with Attention—What And What Not To Transfer," Proceedings of the Twenty-Sixth International Joint Conference on Artificial Intelligence, IJCAI, Aug. 19, 2017, 7 Pages.
Moon S., et al., "Situated and Interactive Multimodal Conversations," Facebook AI Research, Jun. 2, 2020, pp. 1-16.
Mower E., et al., "A Framework for Automatic Human Emotion Classification using Emotion Profiles," IEEE Transactions on Audio, Speech and Language Processing, 2011, vol. 19.5, pp. 1057-1070.
Nickel M., et al., "Holographic Embeddings of Knowledge Graphs," Proceedings of Thirtieth AAAI Conference on Artificial Intelligence, Mar. 2, 2016, 7 Pages.
"Social Context Reminder", An IP.com Prior Art Database Technical Disclosure [Online], Aug. 4, 2017 [Retrieved on Oct. 27, 2020], 3 Pages, Retrieved from Internet: URL: https://priorart.ip.com/IPCOM/000250582.
Oord A.V.D., et al., "WaveNet: A Generative Model for Raw Audio," arXiv preprint, arXiv: 1609.03499, 2016, pp. 1-15.
Ostendorf M., et al., "Continuous-Space Language Processing: Beyond Word Embeddings," Springer International Publishing, Sep. 21, 2016, 13 Pages, XP047356965.
Ostendorf M., et al., "Human Language Technology: Opportunities and Challenges," IEEE International Conference on Acoustics Speech and Signal Processing, Mar. 23, 2005, 5 Pages.
"Overview of Language Technology," Feb. 15, 2018, 1 Page, Retrieved from Internet: URL: https://www.dfki.de/lt/lt-generaL.php,.
U.S. Appl. No. 15/953,957, filed Apr. 16, 2018, Kemal El Moujahid.
U.S. Appl. No. 15/967,193, filed Apr. 30, 2018, Davide Testuggine.
U.S. Appl. No. 15/967,279, filed Apr. 30, 2018, Fuchun Peng.
U.S. Appl. No. 16/025,317, filed Jul. 2, 2018, Sonal Gupta.
U.S. Appl. No. 16/036,827, filed Jul. 16, 2018, Emmanouil Koukoumidis.
U.S. Appl. No. 16/038,120, filed Jul. 17, 2018, Jason Schissel.
U.S. Appl. No. 16/048,049, filed Jul. 27, 2018, Markku Salkola.
U.S. Appl. No. 16/048,072, filed Jul. 27, 2018, Markku Salkola.
U.S. Appl. No. 16/048,101, filed Jul. 27, 2018, Markku Salkola.
U.S. Appl. No. 16/057,414, filed Aug. 7, 2018, Jeremy Gillmor Kahn.
U.S. Appl. No. 16/103,775, filed Aug. 14, 2018, Zheng Zhou.
U.S. Appl. No. 16/107,601, filed Aug. 21, 2018, Rajesh Krishna Shenoy.
U.S. Appl. No. 16/107,847, filed Aug. 21, 2018, Rajesh Krishna Shenoy.
U.S. Appl. No. 16/121,393, filed Sep. 4, 2018, Zheng Zhou.
U.S. Appl. No. 16/127,173, filed Sep. 10, 2018, Zheng Zhou.
U.S. Appl. No. 16/129,638, filed Sep. 12, 2018, Vivek Natarajan.
U.S. Appl. No. 16/135,752, filed Sep. 19, 2018, Xiaohu Liu.
U.S. Appl. No. 16/150,184, filed Oct. 2, 2018, Francislav P. Penov.
U.S. Appl. No. 16/151,040, filed Oct. 3, 2018, Brian Nelson.
U.S. Appl. No. 16/168,536, filed Oct. 23, 2018, Benoit F. Dumoulin.
U.S. Appl. No. 16/176,081, filed Oct. 31, 2018, Anusha Balakrishnan.
U.S. Appl. No. 16/176,312, filed Oct. 31, 2018, Emmanouil Koukoumidis.
U.S. Appl. No. 16/182,542, filed Nov. 6, 2018, Michael Robert Hanson.
U.S. Appl. No. 16/183,650, filed Nov. 7, 2018, Xiaohu Liu.
U.S. Appl. No. 16/192,538, filed Nov. 15, 2018, Emmanouil Koukoumidis.
U.S. Appl. No. 16/222,923, filed Dec. 17, 2018, Jason Schissel.
U.S. Appl. No. 16/222,957, filed Dec. 17, 2018, Emmanouil Koukoumidis.
U.S. Appl. No. 16/229,828, filed Dec. 21, 2018, Xiaohu Liu.
U.S. Appl. No. 16/247,439, filed Jan. 14, 2019, Xiaohu Liu.
U.S. Appl. No. 16/264,173, filed Jan. 31, 2019, Ashwini Challa.
U.S. Appl. No. 16/376,832, filed Apr. 5, 2019, Honglei Liu.
U.S. Appl. No. 16/389,769, filed Apr. 19, 2019, Honglei Liu.
U.S. Appl. No. 16/389,634, filed Apr. 19, 2019, Paul Anthony Crook.
U.S. Appl. No. 16/389,738, filed Apr. 19, 2019, Fuchun Peng.
U.S. Appl. No. 16/389,728, filed Apr. 19, 2019, William Crosby Presant.
U.S. Appl. No. 16/434,010, filed Jun. 6, 2019, Sergiu Dogaru.
U.S. Appl. No. 16/552,559, filed Aug. 27, 2019, Seungwhan Moon.
U.S. Appl. No. 16/557,055, filed Aug. 30, 2019, Seungwhan Moon.
U.S. Appl. No. 16/659,070, filed Oct. 21, 2019, Lisa Xiaoyi Huang.
U.S. Appl. No. 16/659,203, filed Oct. 21, 2019, Lisa Xiaoyi Huang.
U.S. Appl. No. 16/659,363, filed Oct. 21, 2019, Lisa Xiaoyi Huang.
U.S. Appl. No. 16/659,419, filed Oct. 21, 2019, Lisa Xiaoyi Huang.
U.S. Appl. No. 16/703,700, filed Dec. 4, 2019, Ahmed Aly.
U.S. Appl. No. 16/733,044, filed Jan. 2, 2020, Francislav P. Penov.
U.S. Appl. No. 16/741,630, filed Jan. 13, 2020, Paul Anthony Crook.
U.S. Appl. No. 16/741,642, filed Jan. 13, 2020, Fuchun Peng.
U.S. Appl. No. 16/742,769, filed Jan. 14, 2020, Xiaohu Liu.
U.S. Appl. No. 16/742,668, filed Jan. 14, 2020, Xiaohu Liu.
U.S. Appl. No. 16/790,497, filed Feb. 13, 2020, Yang Gao.
U.S. Appl. No. 16/815,960, filed Mar. 11, 2020, Malik.
U.S. Appl. No. 16/815,990, filed Mar. 11, 2020, Malik.
U.S. Appl. No. 16/842,366, filed Apr. 7, 2020, Kamisetty.
U.S. Appl. No. 16/847,155, filed Apr. 13, 2020, Xiaohu Liu.
U.S. Appl. No. 16/914,966, filed Jun. 29, 2020, Noam Yakob Behar.
U.S. Appl. No. 16/917,664, filed Jun. 30, 2020, Xiaohu Liu.
U.S. Appl. No. 16/921,665, filed Jul. 6, 2020, Honglei Liu.
U.S. Appl. No. 17/006,377, filed Aug. 28, 2020, Shivani Poddar.
U.S. Appl. No. 17/006,339, filed Aug. 28, 2020, Shivani Poddar.
U.S. Appl. No. 17/006,260, filed Aug. 28, 2020, William Crosby Presant.
U.S. Appl. No. 17/009,542, filed Sep. 1, 2020, Satwik Kottur.
U.S. Appl. No. 17/035,253, filed Sep. 28, 2020, Piyush Khemka.
U.S. Appl. No. 17/120,013, filed Dec. 11, 2020, Fadi Botros.
U.S. Appl. No. 17/136,636, filed Dec. 29, 2020, Michael Greenberg.
U.S. Appl. No. 17/139,363, filed Dec. 31, 2020, Daniel Manhon Cheng.
U.S. Appl. No. 17/186,459, filed Feb. 26, 2021, Bing Liu.
U.S. Appl. No. 62/660,876, filed Apr. 20, 2018, Anuj Kumar.
U.S. Appl. No. 62/675,090, filed May 22, 2018, Michael Robert Hanson.
U.S. Appl. No. 62/747,628, filed Oct. 18, 2018, Honglei Liu.
U.S. Appl. No. 62/749,608, filed Oct. 23, 2018, Ashwini Challa.
U.S. Appl. No. 62/750,746, filed Oct. 25, 2018, Honglei Liu.
U.S. Appl. No. 62/923,342, filed Oct. 18, 2019, Michael Robert Hanson.
Tepper, Naama, Anat Hashavit, Maya Barnea, Inbal Ronen, and Lior Leiba. "Collabot: Personalized Group Chat Summarization." In Proceedings of the Eleventh ACM International Conference on Web Search and Data Mining, pp. 771-774, Feb. 5, 2018.

(56) References Cited

OTHER PUBLICATIONS

Honglei Liu, et al.: Explore-Exploit: A Framework for Interactive and Online Learning, arXiv:1812.00116, Dec. 1, 2018.

Chat Extensions, https://developers.facebook.com/docs/messenger-platform/guides/chat-extensions, Apr. 18, 2017.

Kottur, Satwik, et al. "Visual coreference resolution visual dialog using neural module networks." Proceedings of the European Conference on Computer Vision (ECCV), Sep. 8-14, 2018.

Kumar, Ankit, et al, "Ask me anything: Dynamic memory networks for natural language processing." International conference on machine learning, Jan. 6, 2016.

Moon, Seungwhan, Suyoun Kim, and Haohan Wang. "Multimodal transfer deep learning with applications in audio-visual recognition." arXiv preprint arXiv:1412.3121, Dec. 9, 2014.

Moon, Seungwhan, Leonardo Neves, and Vitor Carvalho. "Multimodal named entity recognition for short social media posts." arXiv preprint arXiv:1802.07862, Feb. 22, 2018.

Moon, Seungwhan, Leonardo Neves, and Vitor Carvalho. "Zeroshot Multimodal Named Entity Disambiguation for Noisy Social Media Posts." Proceedings of the 56th Annual Meeting of the Association for Computational Linguistics (vol. 1: Long Papers), Jul. 15-20, 2018.

Shah, Pararth, et al. "Bootstrapping a neural conversational agent with dialogue self-play, crowdsourcing and on-line reinforcement learning." Proceedings of the 2018 Conference of the North American Chapter of the Association for Computational Linguistics: Human Language Technologies, vol. 3 (Industry Papers), Jun. 1-6, 2018.

Dinan, Emily, et al. "Advances in Conversational AI" https://ai.facebook.com/blog/advances-in-conversation-ai/?__xts__%5b0%5d=6S.ARDgZpslcbW8Y4dGWBFlBBfrsZkeNMXeTFXLveffyaOCRJ0iNA80NQfAJ9Y6urka2DI6EQcbA0JoTxUuSGUFT-BKfYAHB6lLnX-UMQR5tBiRXkYbJ43fS6THchGawfWiM4ESBHe_Qk7V7IUt97zwgqpCzg6vrR0EQTvuELallEkfW1sb7BGN16RGomEiQCRC38TiqG3U-3Vk0Mns4L-esrTNWyC3RoyMpYGOFkTwMwb2q8yHbkVod9ZwDKi6XC01CIhVlwa_BAz3z1NQR-FV4z-lkOf7M-xGmuXDbTjDgf7nhCeQmiY4Afa-Dcf6OVbG2dKgFXztbN3Jqin0iVPBw_nVkQ&__tn__=-UK-R, Aug. 2, 2019.

Ott, Myle, et al. "New advances in natural language processing to better connect people" https://ai.facebook.com/blog/new-advances-in-natural-language-processing-to-better-connect-people/?__xts__&50b%5d=68.ARBpsX-0s8sV0sN3kxbWpoyzVrkSOpnfR5CANgCyVPB6BtolxwZPobEfG1XdGEOnfVPVTA3-LJPx6L1COhs5_Kqixd4ZXljEssji04CQGloA0SmwZeEDo2tSV4hCmYGlTKMotQzPWb6Qa9iS_e5_13t_m4jANArPOC6M9tzzXxfmixtWiYv-Zkvc2dj-9MFVyXrv2vxijyqLOat3oKUvmwPQ5Gzny2yjqjE6JT8uuXmXvBJgxSJqrHZYvhoaP6sEWsMt6LQBtC_DzR7nIlbgSBAIdbh2EYVHRLJzdp7flnuepGacg7ZmKHJ4P235Qyi6fy06TFynBX7x8AErGZAqI5dbkg&__tn__=-UK-R, Aug. 14, 2019.

Zhang S., et al., "Personalizing Dialogue Agents: I Have a Dog, Do You Have Pets Too?," Facebook AI Research, Sep. 25, 2018, 16 Pages.

Zhu M.H., et al., "To Prune, or Not to Prune: Exploring the Efficacy of Pruning for Model Compression," Cornell University Library, NY 14853, Oct. 5, 2017, 11 Pages, XP081283371.

PR Newswire, "FaceCake Releases First Online, Mobile and In-Store Augmented Reality Shopping Platform for Jewelry at NRF 2018: Dangle Earring App Lets Shoppers Find, Try and Buy Their Statement Style," ProQuest, Jan. 18, 2018, 3 pages.

\* cited by examiner

TASK: CREATE_CALL ─╱─1702
ID: 2846454172087558

Description ─╱─1704
*You must be a contributor to update the description*

Trigger ─╱─1706
Action: [CREATE]    Object: [CALL]

Ignore Attributes [✓]    Expected Attribute: [         ]

Ignore Methods [✓]    Expected Method: [         ]

[✓] Use advanced replies template

Alias ─╱─1708
*Editing alias*

Agent Goal ─╱─1710
goal:call:call_friend

Policy Note ─╱─1712
[ ACTUALLY_THERE_IS_ONE                                    ]

Input Arguments ─╱─1714

| Entity Type | Arg. Name | Req | Missing Prompt | Disambiguation | Unresolved |
|---|---|---|---|---|---|
| fb/aloha_ability | onApp | ☐ | | add prompt | add prompt |
| fb/date_time | startTime | ☐ | | add prompt | add prompt |
| ⋮ | | | | | |
| fb/number | numberCalled | ☐ | | add prompt | add prompt |
| fb/person | hasParticipant | ☑ | Call who? | Which one? | I couldn't find a ma.. |

*FIG. 17A*

TASK: UPDATE_METHOD_CALL ∕⁻1716
ID: 2686662158107584
Description ∕⁻1704
*You must be a contributor to update the description*

☑ Use advanced replies template

Trigger ∕⁻1706

Action: [UPDATE]    Object: [CALL]

Ignore Attributes ☐    Expected Attribute: [callType]

Ignore Methods ☑    Expected Method: [    ]

Alias ∕⁻1708
*Editing alias*

Agent Goal ∕⁻1710
goal:call:update_method_call

Policy Note ∕⁻1712

[ ACTUALLY_THERE_IS_ONE                                      ]

Input Arguments ∕⁻1714

| Attribute | Method | Req | Missing Prompt | Disambiguation | Unresolved | Agent ER |
|---|---|---|---|---|---|---|
| fb/call:update_method_call | set | ☐ | | add prompt | add prompt | |

*FIG. 17B*

SEMANTIC REPRESENTATIONS USING STRUCTURAL ONTOLOGY FOR ASSISTANT SYSTEMS

PRIORITY

This application claims the benefit under 35 U.S.C. § 119(e) of U.S. Provisional Patent Application No. 62/923,342, filed 18 Oct. 2019, which is incorporated herein by reference.

TECHNICAL FIELD

This disclosure generally relates to databases and file management within network environments, and in particular relates to hardware and software for smart assistant systems.

BACKGROUND

An assistant system can provide information or services on behalf of a user based on a combination of user input, location awareness, and the ability to access information from a variety of online sources (such as weather conditions, traffic congestion, news, stock prices, user schedules, retail prices, etc.). The user input may include text (e.g., online chat), especially in an instant messaging application or other applications, voice, images, motion, or a combination of them. The assistant system may perform concierge-type services (e.g., making dinner reservations, purchasing event tickets, making travel arrangements) or provide information based on the user input. The assistant system may also perform management or data-handling tasks based on online information and events without user initiation or interaction. Examples of those tasks that may be performed by an assistant system may include schedule management (e.g., sending an alert to a dinner date that a user is running late due to traffic conditions, update schedules for both parties, and change the restaurant reservation time). The assistant system may be enabled by the combination of computing devices, application programming interfaces (APIs), and the proliferation of applications on user devices.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. profile/news feed posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, the assistant system may assist a user to obtain information or services. The assistant system may enable the user to interact with it with multi-modal user input (such as voice, text, image, video, motion) in stateful and multi-turn conversations to get assistance. As an example and not by way of limitation, the assistant system may support both audio (verbal) input and nonverbal input, such as vision, location, gesture, motion, or hybrid/multi-modal input. The assistant system may create and store a user profile comprising both personal and contextual information associated with the user. In particular embodiments, the assistant system may analyze the user input using natural-language understanding. The analysis may be based on the user profile of the user for more personalized and context-aware understanding. The assistant system may resolve entities associated with the user input based on the analysis. In particular embodiments, the assistant system may interact with different agents to obtain information or services that are associated with the resolved entities. The assistant system may generate a response for the user regarding the information or services by using natural-language generation. Through the interaction with the user, the assistant system may use dialog-management techniques to manage and advance the conversation flow with the user. In particular embodiments, the assistant system may further assist the user to effectively and efficiently digest the obtained information by summarizing the information. The assistant system may also assist the user to be more engaging with an online social network by providing tools that help the user interact with the online social network (e.g., creating posts, comments, messages). The assistant system may additionally assist the user to manage different tasks such as keeping track of events. In particular embodiments, the assistant system may proactively execute, without a user input, tasks that are relevant to user interests and preferences based on the user profile, at a time relevant for the user. In particular embodiments, the assistant system may check privacy settings to ensure that accessing a user's profile or other user information and executing different tasks are permitted subject to the user's privacy settings.

In particular embodiments, the assistant system may assist the user via a hybrid architecture built upon both client-side processes and server-side processes. The client-side processes and the server-side processes may be two parallel workflows for processing a user input and providing assistance to the user. In particular embodiments, the client-side processes may be performed locally on a client system associated with a user. By contrast, the server-side processes may be performed remotely on one or more computing systems. In particular embodiments, an arbitrator on the client system may coordinate receiving user input (e.g., an audio signal), determine whether to use a client-side process, a server-side process, or both, to respond to the user input, and analyze the processing results from each process. The arbitrator may instruct agents on the client-side or server-side to execute tasks associated with the user input based on the aforementioned analyses. The execution results may be further rendered as output to the client system. By leveraging both client-side and server-side processes, the assistant system can effectively assist a user with optimal usage of computing resources while at the same time protecting user privacy and enhancing security.

In particular embodiments, the assistant system may use a structural semantic representation framework, namely "next generation ontology" (NGO), for structuring instructions for the various modules of the assistant system, including instructions for interfacing with first-party and third-party agents. NGO may comprise an ontology with several different types of semantic units, e.g., actions, objects, and attributes. NGO may support a labeling system that is derivable from the ontology, allowing user requests to be represented as sub-graphs of the ontology. NGO may allow the assistant system to have a unification of the semantic representations used by the natural-language understanding processes (i.e., input processing) and that used by the natural-language generation processes (i.e., output processing). All modules in the stack of the assistant system may use the same type of semantic representation based on NGO instead of their own semantics, thereby reducing the mapping between them and increasing the consistency. Objects may be carried throughout the stack of the assistant system, in which the assistant system may use the dialog manager to change actions between input and output based on a mapping layer. Furthermore, because all parts of the ontology are defined, the assistant system may determine whether any semantic parsing of a user request is valid before trying to execute a corresponding task. Although this disclosure describes particular ontology in a particular manner, this disclosure contemplates any suitable ontology in any suitable manner.

In particular embodiments, the assistant system may receive, by an assistant xbot from a client system associated with a user, a user input comprising a natural-language utterance. The assistant system may then determine a semantic representation of the user input based on a structural ontology. In particular embodiments, the structural ontology may define a labeling syntax for parsing the natural-language utterance to semantic units comprising a plurality of actions, objects, and attributes. The semantic representation may embed at least one object within at least one action and declares at least one attribute of the embedded object to be acted upon. In particular embodiments, the assistant system may send, to an agent, a request for executing a task corresponding to the user input. The request may be based on the semantic representation. In particular embodiments, the assistant system may receive, from the agent, results of the executed task, wherein the results are mapped to a structure determined by the structural ontology. The assistant system may further send, from the assistant xbot to the client system, instructions for presenting a response to the user input, wherein the response is based on the results of the executed task.

Certain technical challenges exist for improving consistency of semantic representations. One technical challenge may include providing third-party users flexibility for designing their own semantic units while keeping the structural ontology intact. The solution presented by the embodiments disclosed herein to address this challenge may be defining core sub-graphs and generic sub-graphs as the core sub-graphs and generic sub-graphs are functionally separated and the fundamental structure of the ontology are maintained by the core sub-graphs which are only viewable to the third-party users. Another technical challenge may include representing a complex instance of attribute restriction. The solution presented by the embodiments disclosed herein to address this challenge may be type-shifting as it may nest an object inside of an attribute and declare which of that object's attributes values the embedding attribute, thereby representing the complex instance with a clearer structure with improved interpretability. Another technical challenge may include enabling developers to conveniently use the structural ontology without extensive knowledge about the ontology. The solution presented by the embodiments disclosed herein to address this challenge may be an NGO tool which may enable the developers to customize the usage of the structural ontology with different functions using an advanced user interface, within which the system may also automatically fill in contents to facilitate the usage of such tool.

Certain embodiments disclosed herein may provide one or more technical advantages. A technical advantage of the embodiments may include reduced duplication of effort as NGO may allow for automatic generation of a semantic space through re-usability, remove domain distinctions, and support type hierarchies, which may create re-useable labeling elements and reduce duplication of effort. Another technical advantage of the embodiments may include consistent ontology and type checking because every object, action, or attribute has a type, which enables NGO to have formal and consistent contract for semantic parses throughout all the assistant stack. Another technical advantage of the embodiments may include hierarchy aware back-off as NGO may encode automatic and systematic back-offs for ambiguous or incorrectly tagged utterances and avoid hard coded rules for back-offs that may increase as domains increase. Another technical advantage of the embodiments may include shared semantic space as NGO may directly connect the concepts and their lexicalizations to annotations without a need for a mapping between the two. Certain embodiments disclosed herein may provide none, some, or all of the above technical advantages. One or more other technical advantages may be readily apparent to one skilled in the art in view of the figures, descriptions, and claims of the present disclosure.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 17A illustrates an example UI of the NGO tool with a "create" trigger action.

FIG. 17B illustrates an example UI of the NGO tool with a "update" trigger action.

DESCRIPTION OF EXAMPLE EMBODIMENTS

System Overview

Figure 1:
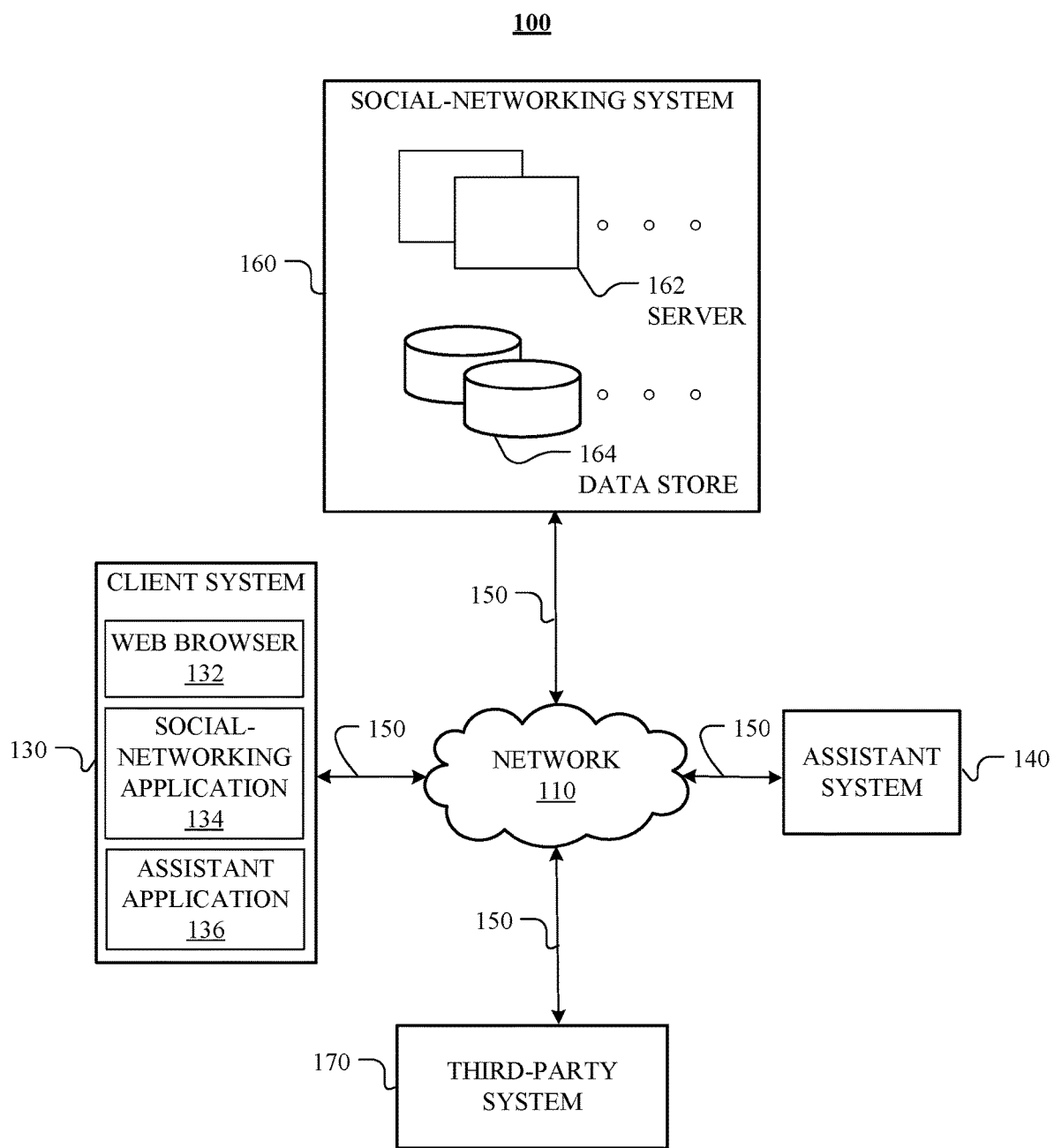
FIG. 1 illustrates an example network environment associated with an assistant system.

FIG. 1 illustrates an example network environment 100 associated with an assistant system. Network environment 100 includes a client system 130, an assistant system 140, a social-networking system 160, and a third-party system 170 connected to each other by a network 110. Although FIG. 1 illustrates a particular arrangement of a client system 130, an assistant system 140, a social-networking system 160, a third-party system 170, and a network 110, this disclosure contemplates any suitable arrangement of a client system 130, an assistant system 140, a social-networking system 160, a third-party system 170, and a network 110. As an example and not by way of limitation, two or more of a client system 130, a social-networking system 160, an assistant system 140, and a third-party system 170 may be connected to each other directly, bypassing a network 110. As another example, two or more of a client system 130, an assistant system 140, a social-networking system 160, and a third-party system 170 may be physically or logically co-located with each other in whole or in part. Moreover, although FIG. 1 illustrates a particular number of client systems 130, assistant systems 140, social-networking systems 160, third-party systems 170, and networks 110, this disclosure contemplates any suitable number of client systems 130, assistant systems 140, social-networking systems 160, third-party systems 170, and networks 110. As an example and not by way of limitation, network environment 100 may include multiple client systems 130, assistant systems 140, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, an assistant system 140, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, smart speaker, virtual reality (VR) headset, augment reality (AR) smart glasses, other suitable electronic device, or any suitable combination thereof. In particular embodiments, the client system 130 may be a smart assistant device. More information on smart assistant devices may be found in U.S. patent application Ser. No. 15/949,011, filed 9 Apr. 2018, U.S. patent application Ser. No. 16/153,574, filed 5 Oct. 2018, U.S. Design patent application Ser. No. 29/631910, filed 3 Jan. 2018, U.S. Design patent application Ser. No. 29/631747, filed 2 Jan. 2018, U.S. Design patent application Ser. No. 29/631913, filed 3 Jan. 2018, and U.S. Design patent application Ser. No. 29/631914, filed 3 Jan. 2018, each of which is incorporated by reference. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, and may have one or more add-ons, plug-ins, or other extensions. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts, combinations of markup language and scripts, and the like. Herein, reference to a web interface encompasses one or more corresponding source files (which a browser may use to render the web interface) and vice versa, where appropriate.

In particular embodiments, a client system 130 may include a social-networking application 134 installed on the client system 130. A user at a client system 130 may use the social-networking application 134 to access on online social network. The user at the client system 130 may use the social-networking application 134 to communicate with the user's social connections (e.g., friends, followers, followed accounts, contacts, etc.). The user at the client system 130 may also use the social-networking application 134 to interact with a plurality of content objects (e.g., posts, news articles, ephemeral content, etc.) on the online social network. As an example and not by way of limitation, the user may browse trending topics and breaking news using the social-networking application 134.

In particular embodiments, a client system 130 may include an assistant application 136. A user at a client system 130 may use the assistant application 136 to interact with the assistant system 140. In particular embodiments, the assistant application 136 may comprise a stand-alone application. In particular embodiments, the assistant application 136 may be integrated into the social-networking application 134 or another suitable application (e.g., a messaging application). In particular embodiments, the assistant application 136 may be also integrated into the client system 130, an assistant hardware device, or any other suitable hardware devices. In particular embodiments, the assistant application 136 may be accessed via the web browser 132. In particular embodiments, the user may provide input via different modalities. As an example and not by way of limitation, the modalities may include audio, text, image, video, motion, orientation, etc. The assistant application 136 may communicate the user input to the assistant system 140. Based on the user input, the assistant system 140 may generate responses. The assistant system 140 may send the generated responses to the assistant application 136. The assistant application 136 may then present the responses to the user at the client system 130. The presented responses may be based on different modalities such as audio, text, image, and video. As an example and not by way of limitation, the user may verbally ask the assistant application 136 about the traffic information (i.e., via an audio modality) by speaking into a microphone of the client system 130. The assistant application 136 may then communicate the request to the assistant system 140. The assistant system 140 may accordingly generate a response and send it back to the assistant application 136. The assistant application 136 may further present the response to the user in text and/or images on a display of the client system 130.

In particular embodiments, an assistant system 140 may assist users to retrieve information from different sources. The assistant system 140 may also assist user to request services from different service providers. In particular embodiments, the assist system 140 may receive a user request for information or services via the assistant application 136 in the client system 130. The assist system 140 may use natural-language understanding to analyze the user request based on user's profile and other relevant information. The result of the analysis may comprise different entities associated with an online social network. The assistant system 140 may then retrieve information or request services associated with these entities. In particular embodiments, the assistant system 140 may interact with the social-networking system 160 and/or third-party system 170 when retrieving information or requesting services for the user. In particular embodiments, the assistant system 140 may generate a personalized communication content for the user using natural-language generating techniques. The personalized communication content may comprise, for example, the retrieved information or the status of the requested services. In particular embodiments, the assistant system 140 may enable the user to interact with it regarding the information or services in a stateful and multi-turn conversation by using dialog-management techniques. The functionality of the assistant system 140 is described in more detail in the discussion of FIG. 2 below.

In particular embodiments, the social-networking system 160 may be a network-addressable computing system that can host an online social network. The social-networking system 160 may generate, store, receive, and send social-networking data, such as, for example, user profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, an assistant system 140, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects. In particular embodiments, a third-party content provider may use one or more third-party agents to provide content objects and/or services. A third-party agent may be an implementation that is hosted and executing on the third-party system 170.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow, for example, an assistant system 140 or a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Assistant Systems

Figure 2:
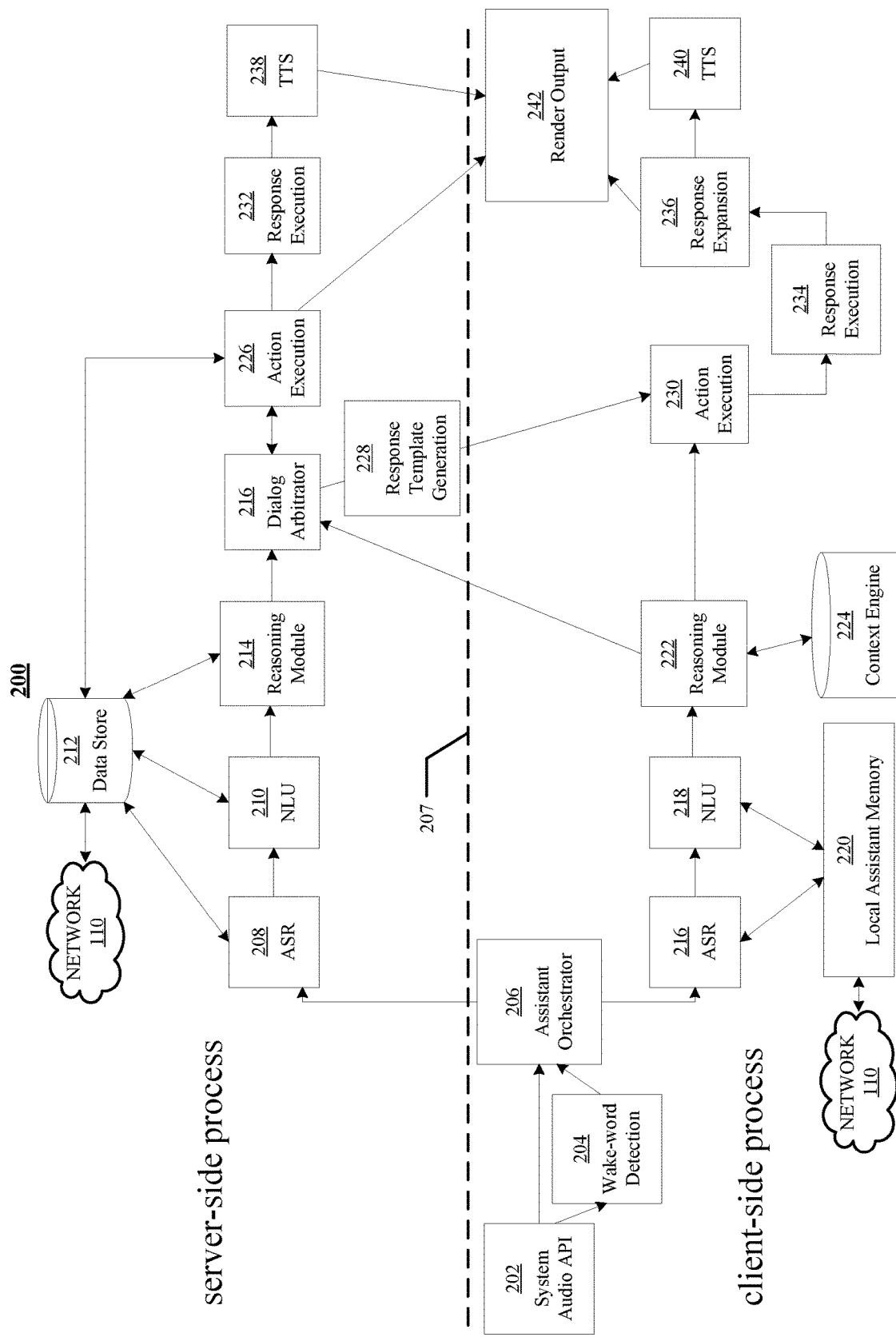
FIG. 2 illustrates an example architecture of the assistant system.

FIG. 2 illustrates an example architecture of an assistant system 140. In particular embodiments, the assistant system 140 may assist a user to obtain information or services. The assistant system 140 may enable the user to interact with it with multi-modal user input (such as voice, text, image, video, motion) in stateful and multi-turn conversations to get assistance. As an example and not by way of limitation, the assistant system 140 may support both audio input (verbal) and nonverbal input, such as vision, location, gesture, motion, or hybrid/multi-modal input. The assistant system 140 may create and store a user profile comprising both personal and contextual information associated with the user. In particular embodiments, the assistant system 140 may analyze the user input using natural-language understanding. The analysis may be based on the user profile of the user for more personalized and context-aware understanding. The assistant system 140 may resolve entities associated with the user input based on the analysis. In particular embodiments, the assistant system 140 may interact with different agents to obtain information or services that are associated with the resolved entities. The assistant system 140 may generate a response for the user regarding the information or services by using natural-language generation. Through the interaction with the user, the assistant system 140 may use dialog management techniques to manage and forward the conversation flow with the user. In particular embodiments, the assistant system 140 may further assist the user to effectively and efficiently digest the obtained information by summarizing the information. The assistant system 140 may also assist the user to be more engaging with an online social network by providing tools that help the user interact with the online social network (e.g., creating posts, comments, messages). The assistant system 140 may additionally assist the user to manage different tasks such as keeping track of events. In particular embodiments, the assistant system 140 may proactively execute, without a user input, pre-authorized tasks that are relevant to user interests and preferences based on the user profile, at a time relevant for the user. In particular embodiments, the assistant system 140 may check privacy settings to ensure that accessing a user's profile or other user information and executing different tasks are permitted subject to the user's privacy settings. More information on assisting users subject to privacy settings may be found in U.S. patent application Ser. No. 16/182,542, filed 6 Nov. 2018, which is incorporated by reference.

In particular embodiments, the assistant system 140 may assist the user via a hybrid architecture built upon both client-side processes and server-side processes. The client-side processes and the server-side processes may be two parallel workflows for processing a user input and providing assistances to the user. In particular embodiments, the client-side processes may be performed locally on a client system 130 associated with a user. By contrast, the server-side processes may be performed remotely on one or more computing systems. In particular embodiments, an assistant orchestrator on the client system 130 may coordinate receiving user input (e.g., audio signal) and determine whether to use client-side processes, server-side processes, or both, to respond to the user input. A dialog arbitrator may analyze the processing results from each process. The dialog arbitrator may instruct agents on the client-side or server-side to execute tasks associated with the user input based on the aforementioned analyses. The execution results may be further rendered as output to the client system 130. By leveraging both client-side and server-side processes, the assistant system 140 can effectively assist a user with optimal usage of computing resources while at the same time protecting user privacy and enhancing security.

In particular embodiments, the assistant system 140 may receive a user input from a client system 130 associated with the user. In particular embodiments, the user input may be a user-generated input that is sent to the assistant system 140 in a single turn. The user input may be verbal, nonverbal, or a combination thereof. As an example and not by way of limitation, the nonverbal user input may be based on the user's voice, vision, location, activity, gesture, motion, or a combination thereof. If the user input is based on the user's voice (e.g., the user may speak to the client system 130), such user input may be first processed by a system audio API 202 (application programming interface). The system audio API 202 may conduct echo cancellation, noise removal, beam forming, and self-user voice activation, speaker identification, voice activity detection (VAD), and any other acoustic techniques to generate audio data that is readily processable by the assistant system 140. In particular embodiments, the system audio API 202 may perform wake-word detection 204 from the user input. As an example and not by way of limitation, a wake-word may be "hey assistant". If such wake-word is detected, the assistant system 140 may be activated accordingly. In alternative embodiments, the user may activate the assistant system 140 via a visual signal without a wake-word. The visual signal may be received at a low-power sensor (e.g., a camera) that can detect various visual signals. As an example and not by way of limitation, the visual signal may be a barcode, a QR code or a universal product code (UPC) detected by the client system 130. As another example and not by way of limitation, the visual signal may be the user's gaze at an object. As yet another example and not by way of limitation, the visual signal may be a user gesture, e.g., the user pointing at an object.

In particular embodiments, the audio data from the system audio API 202 may be sent to an assistant orchestrator 206. The assistant orchestrator 206 may be executing on the client system 130. In particular embodiments, the assistant orchestrator 206 may determine whether to respond to the user input by using client-side processes, server-side processes, or both. As indicated in FIG. 2, the client-side processes are illustrated below the dashed line 207 whereas the server-side processes are illustrated above the dashed line 207. The assistant orchestrator 206 may also determine to respond to the user input by using both the client-side processes and the server-side processes simultaneously. Although FIG. 2 illustrates the assistant orchestrator 206 as being a client-side process, the assistant orchestrator 206 may be a server-side process or may be a hybrid process split between client- and server-side processes.

In particular embodiments, the server-side processes may be as follows after audio data is generated from the system audio API 202. The assistant orchestrator 206 may send the audio data to a remote computing system that hosts different modules of the assistant system 140 to respond to the user input. In particular embodiments, the audio data may be received at a remote automatic speech recognition (ASR) module 208. The ASR module 208 may allow a user to dictate and have speech transcribed as written text, have a document synthesized as an audio stream, or issue commands that are recognized as such by the system. The ASR module 208 may use statistical models to determine the most likely sequences of words that correspond to a given portion of speech received by the assistant system 140 as audio input. The models may include one or more of hidden Markov models, neural networks, deep learning models, or any combination thereof. The received audio input may be encoded into digital data at a particular sampling rate (e.g., 16, 44.1, or 96 kHz) and with a particular number of bits representing each sample (e.g., 8, 16, of 24 bits).

In particular embodiments, the ASR module 208 may comprise different components. The ASR module 208 may comprise one or more of a grapheme-to-phoneme (G2P) model, a pronunciation learning model, a personalized acoustic model, a personalized language model (PLM), or an end-pointing model. In particular embodiments, the G2P model may be used to determine a user's grapheme-to-phoneme style, e.g., what it may sound like when a particular user speaks a particular word. The personalized acoustic model may be a model of the relationship between audio signals and the sounds of phonetic units in the language. Therefore, such personalized acoustic model may identify how a user's voice sounds. The personalized acoustical model may be generated using training data such as training speech received as audio input and the corresponding phonetic units that correspond to the speech. The personalized acoustical model may be trained or refined using the voice of a particular user to recognize that user's speech. In particular embodiments, the personalized language model may then determine the most likely phrase that corresponds to the identified phonetic units for a particular audio input. The personalized language model may be a model of the probabilities that various word sequences may occur in the language. The sounds of the phonetic units in the audio input may be matched with word sequences using the personalized language model, and greater weights may be assigned to the word sequences that are more likely to be phrases in the language. The word sequence having the highest weight may be then selected as the text that corresponds to the audio input. In particular embodiments, the personalized language model may be also used to predict what words a user is most likely to say given a context. In particular embodiments, the end-pointing model may detect when the end of an utterance is reached.

In particular embodiments, the output of the ASR module 208 may be sent to a remote natural-language understanding (NLU) module 210. The NLU module 210 may perform named entity resolution (NER). The NLU module 210 may additionally consider contextual information when analyzing the user input. In particular embodiments, an intent and/or a slot may be an output of the NLU module 210. An intent may be an element in a pre-defined taxonomy of semantic intentions, which may indicate a purpose of a user interacting with the assistant system 140. The NLU module 210 may classify a user input into a member of the pre-defined taxonomy, e.g., for the input "Play Beethoven's 5th," the NLU module 210 may classify the input as having the intent [IN:play_music]. In particular embodiments, a domain may denote a social context of interaction, e.g., education, or a namespace for a set of intents, e.g., music. A slot may be a named sub-string corresponding to a character string within the user input, representing a basic semantic entity. For example, a slot for "pizza" may be [ SL:dish]. In particular embodiments, a set of valid or expected named slots may be conditioned on the classified intent. As an example and not by way of limitation, for the intent [IN: play_music], a valid slot may be [SL:song_name]. In particular embodiments, the NLU module 210 may additionally extract information from one or more of a social graph, a knowledge graph, or a concept graph, and retrieve a user's profile from one or more remote data stores 212. The NLU module 210 may further process information from these different sources by determining what information to aggregate, annotating n-grams of the user input, ranking the n-grams with confidence scores based on the aggregated information, and formulating the ranked n-grams into features that can be used by the NLU module 210 for understanding the user input.

In particular embodiments, the NLU module 210 may identify one or more of a domain, an intent, or a slot from the user input in a personalized and context-aware manner. As an example and not by way of limitation, a user input may comprise "show me how to get to the coffee shop". The NLU module 210 may identify the particular coffee shop that the user wants to go based on the user's personal information and the associated contextual information. In particular embodiments, the NLU module 210 may comprise a lexicon of a particular language and a parser and grammar rules to partition sentences into an internal representation. The NLU module 210 may also comprise one or more programs that perform naive semantics or stochastic semantic analysis to the use of pragmatics to understand a user input. In particular embodiments, the parser may be based on a deep learning architecture comprising multiple long-short term memory (LSTM) networks. As an example and not by way of limitation, the parser may be based on a recurrent neural network grammar (RNNG) model, which is a type of recurrent and recursive LSTM algorithm. More information on natural-language understanding may be found in U.S. patent application Ser. No. 16/011,062, filed 18 Jun. 2018, U.S. patent application Ser. No. 16/025,317, filed 2 Jul. 2018, and U.S. patent application Ser. No. 16/038,120, filed 17 Jul. 2018, each of which is incorporated by reference.

In particular embodiments, the output of the NLU module 210 may be sent to a remote reasoning module 214. The reasoning module 214 may comprise a dialog manager and an entity resolution component. In particular embodiments, the dialog manager may have complex dialog logic and product-related business logic. The dialog manager may manage the dialog state and flow of the conversation between the user and the assistant system 140. The dialog manager may additionally store previous conversations between the user and the assistant system 140. In particular embodiments, the dialog manager may communicate with the entity resolution component to resolve entities associated with the one or more slots, which supports the dialog manager to advance the flow of the conversation between the user and the assistant system 140. In particular embodiments, the entity resolution component may access one or more of the social graph, the knowledge graph, or the concept graph when resolving the entities. Entities may include, for example, unique users or concepts, each of which may have a unique identifier (ID). As an example and not by way of limitation, the knowledge graph may comprise a plurality of entities. Each entity may comprise a single record associated with one or more attribute values. The particular record may be associated with a unique entity identifier. Each record may have diverse values for an attribute of the entity. Each attribute value may be associated with a confidence probability. A confidence probability for an attribute value represents a probability that the value is accurate for the given attribute. Each attribute value may be also associated with a semantic weight. A semantic weight for an attribute value may represent how the value semantically appropriate for the given attribute considering all the available information. For example, the knowledge graph may comprise an entity of a book "Alice's Adventures", which includes information that has been extracted from multiple content sources (e.g., an online social network, online encyclopedias, book review sources, media databases, and entertainment content sources), and then deduped, resolved, and fused to generate the single unique record for the knowledge graph. The entity may be associated with a "fantasy" attribute value which indicates the genre of the book "Alice's Adventures". More information on the knowledge graph may be found in U.S. patent application Ser. No. 16/048,049, filed 27 Jul. 2018, and U.S. patent application Ser. No. 16/048,101, filed 27 Jul. 2018, each of which is incorporated by reference.

In particular embodiments, the entity resolution component may check the privacy constraints to guarantee that the resolving of the entities does not violate privacy policies. As an example and not by way of limitation, an entity to be resolved may be another user who specifies in his/her privacy settings that his/her identity should not be searchable on the online social network, and thus the entity resolution component may not return that user's identifier in response to a request. Based on the information obtained from the social graph, the knowledge graph, the concept graph, and the user profile, and subject to applicable privacy policies, the entity resolution component may therefore resolve the entities associated with the user input in a personalized, context-aware, and privacy-aware manner. In particular embodiments, each of the resolved entities may be associated with one or more identifiers hosted by the social-networking system 160. As an example and not by way of limitation, an identifier may comprise a unique user identifier (ID) corresponding to a particular user (e.g., a unique username or user ID number). In particular embodiments, each of the resolved entities may be also associated with a confidence score. More information on resolving entities may be found in U.S. patent application Ser. No. 16/048,049, filed 27 Jul. 2018, and U.S. patent application Ser. No. 16/048,072, filed 27 Jul. 2018, each of which is incorporated by reference.

In particular embodiments, the dialog manager may conduct dialog optimization and assistant state tracking. Dialog optimization is the problem of using data to understand what the most likely branching in a dialog should be. As an example and not by way of limitation, with dialog optimization the assistant system 140 may not need to confirm who a user wants to call because the assistant system 140 has high confidence that a person inferred based on dialog optimization would be very likely whom the user wants to call. In particular embodiments, the dialog manager may use reinforcement learning for dialog optimization. Assistant state tracking aims to keep track of a state that changes over time as a user interacts with the world and the assistant system 140 interacts with the user. As an example and not by way of limitation, assistant state tracking may track what a user is talking about, whom the user is with, where the user is, what tasks are currently in progress, and where the user's gaze is at, etc., subject to applicable privacy policies. In particular embodiments, the dialog manager may use a set of operators to track the dialog state. The operators may comprise the necessary data and logic to update the dialog state. Each operator may act as delta of the dialog state after processing an incoming request. In particular embodiments, the dialog manager may further comprise a dialog state tracker and an action selector. In alternative embodiments, the dialog state tracker may replace the entity resolution component and resolve the references/mentions and keep track of the state.

In particular embodiments, the reasoning module 214 may further conduct false trigger mitigation. The goal of false trigger mitigation is to detect false triggers (e.g., wake-word) of assistance requests and to avoid generating false records when a user actually does not intend to invoke the assistant system 140. As an example and not by way of limitation, the reasoning module 214 may achieve false trigger mitigation based on a nonsense detector. If the nonsense detector determines that a wake-word makes no sense at this point in the interaction with the user, the reasoning module 214 may determine that inferring the user intended to invoke the assistant system 140 may be incorrect. In particular embodiments, the output of the reasoning module 214 may be sent a remote dialog arbitrator 216.

In particular embodiments, each of the ASR module 208, NLU module 210, and reasoning module 214 may access the remote data store 212, which comprises user episodic memories to determine how to assist a user more effectively. More information on episodic memories may be found in U.S. patent application Ser. No. 16/552,559, filed 27 Aug. 2019, which is incorporated by reference. The data store 212 may additionally store the user profile of the user. The user profile of the user may comprise user profile data including demographic information, social information, and contextual information associated with the user. The user profile data may also include user interests and preferences on a plurality of topics, aggregated through conversations on news feed, search logs, messaging platforms, etc. The usage of a user profile may be subject to privacy constraints to ensure that a user's information can be used only for his/her benefit, and not shared with anyone else. More information on user profiles may be found in U.S. patent application Ser. No. 15/967,239, filed 30 Apr. 2018, which is incorporated by reference.

In particular embodiments, parallel to the aforementioned server-side process involving the ASR module 208, NLU module 210, and reasoning module 214, the client-side process may be as follows. In particular embodiments, the output of the assistant orchestrator 206 may be sent to a local ASR module 216 on the client system 130. The ASR module 216 may comprise a personalized language model (PLM), a G2P model, and an end-pointing model. Because of the limited computing power of the client system 130, the assistant system 140 may optimize the personalized language model at run time during the client-side process. As an example and not by way of limitation, the assistant system 140 may pre-compute a plurality of personalized language models for a plurality of possible subjects a user may talk about. When a user requests assistance, the assistant system 140 may then swap these pre-computed language models quickly so that the personalized language model may be optimized locally by the assistant system 140 at run time based on user activities. As a result, the assistant system 140 may have a technical advantage of saving computational resources while efficiently determining what the user may be talking about. In particular embodiments, the assistant system 140 may also re-learn user pronunciations quickly at run time.

In particular embodiments, the output of the ASR module 216 may be sent to a local NLU module 218. In particular embodiments, the NLU module 218 herein may be more compact compared to the remote NLU module 210 supported on the server-side. When the ASR module 216 and NLU module 218 process the user input, they may access a local assistant memory 220. The local assistant memory 220 may be different from the user memories stored on the data store 212 for the purpose of protecting user privacy. In particular embodiments, the local assistant memory 220 may be syncing with the user memories stored on the data store 212 via the network 110. As an example and not by way of limitation, the local assistant memory 220 may sync a calendar on a user's client system 130 with a server-side calendar associate with the user. In particular embodiments, any secured data in the local assistant memory 220 may be only accessible to the modules of the assistant system 140 that are locally executing on the client system 130.

In particular embodiments, the output of the NLU module 218 may be sent to a local reasoning module 222. The reasoning module 222 may comprise a dialog manager and an entity resolution component. Due to the limited computing power, the reasoning module 222 may conduct on-device learning that is based on learning algorithms particularly tailored for client systems 130. As an example and not by way of limitation, federated learning may be used by the reasoning module 222. Federated learning is a specific category of distributed machine learning approaches which trains machine learning models using decentralized data residing on end devices such as mobile phones. In particular embodiments, the reasoning module 222 may use a particular federated learning model, namely federated user representation learning, to extend existing neural-network personalization techniques to federated learning. Federated user representation learning can personalize models in federated learning by learning task-specific user representations (i.e., embeddings) or by personalizing model weights. Federated user representation learning is a simple, scalable, privacy-preserving, and resource-efficient. Federated user representation learning may divide model parameters into federated and private parameters. Private parameters, such as private user embeddings, may be trained locally on a client system 130 instead of being transferred to or averaged on a remote server. Federated parameters, by contrast, may be trained remotely on the server. In particular embodiments, the reasoning module 222 may use another particular federated learning model, namely active federated learning to transmit a global model trained on the remote server to client systems 130 and calculate gradients locally on these client systems 130. Active federated learning may enable the reasoning module to minimize the transmission costs associated with downloading models and uploading gradients. For active federated learning, in each round client systems are selected not uniformly at random, but with a probability conditioned on the current model and the data on the client systems to maximize efficiency. In particular embodiments, the reasoning module 222 may use another particular federated learning model, namely federated Adam. Conventional federated learning model may use stochastic gradient descent (SGD) optimizers. By contrast, the federated Adam model may use moment-based optimizers. Instead of using the averaged model directly as what conventional work does, federated Adam model may use the averaged model to compute approximate gradients. These gradients may be then fed into the federated Adam model, which may de-noise stochastic gradients and use a per-parameter adaptive learning rate. Gradients produced by federated learning may be even noisier than stochastic gradient descent (because data may be not independent and identically distributed), so federated Adam model may help even more deal with the noise. The federated Adam model may use the gradients to take smarter steps towards minimizing the objective function. The experiments show that conventional federated learning on a benchmark has 1.6% drop in ROC (Receiver Operating Characteristics) curve whereas federated Adam model has only 0.4% drop. In addition, federated Adam model has no increase in communication or on-device computation. In particular embodiments, the reasoning module 222 may also perform false trigger mitigation. This false trigger mitigation may help detect false activation requests, e.g., wake-word, on the client system 130 when the user's speech input comprises data that is subject to privacy constraints. As an example and not by way of limitation, when a user is in a voice call, the user's conversation is private and the false trigger detection based on such conversation can only occur locally on the user's client system 130.

In particular embodiments, the assistant system 140 may comprise a local context engine 224. The context engine 224 may process all the other available signals to provide more informative cues to the reasoning module 222. As an example and not by way of limitation, the context engine 224 may have information related to people, sensory data from client system 130 sensors (e.g., microphone, camera) that are further analyzed by computer vision technologies, geometry constructions, activity data, inertial data (e.g., collected by a VR headset), location, etc. In particular embodiments, the computer vision technologies may comprise human skeleton reconstruction, face detection, facial recognition, hand tracking, eye tracking, etc. In particular embodiments, geometry constructions may comprise constructing objects surrounding a user using data collected by a client system 130. As an example and not by way of limitation, the user may be wearing AR glasses and geometry construction may aim to determine where the floor is, where the wall is, where the user's hands are, etc. In particular embodiments, inertial data may be data associated with linear and angular motions. As an example and not by way of limitation, inertial data may be captured by AR glasses which measures how a user's body parts move.

In particular embodiments, the output of the local reasoning module 222 may be sent to the dialog arbitrator 216. The dialog arbitrator 216 may function differently in three scenarios. In the first scenario, the assistant orchestrator 206 determines to use server-side process, for which the dialog arbitrator 216 may transmit the output of the reasoning module 214 to a remote action execution module 226. In the second scenario, the assistant orchestrator 206 determines to use both server-side processes and client-side processes, for which the dialog arbitrator 216 may aggregate output from both reasoning modules (i.e., remote reasoning module 214 and local reasoning module 222) of both processes and analyze them. As an example and not by way of limitation, the dialog arbitrator 216 may perform ranking and select the best reasoning result for responding to the user input. In particular embodiments, the dialog arbitrator 216 may further determine whether to use agents on the server-side or on the client-side to execute relevant tasks based on the analysis. In the third scenario, the assistant orchestrator 206 determines to use client-side processes and the dialog arbitrator 216 needs to evaluate the output of the local reasoning module 222 to determine if the client-side processes can complete the task of handling the user input. In alternative embodiments, the output of the reasoning module 222 may be not sent to the dialog arbitrator 216 if the assistant orchestrator 206 determines to use client-side processes and that client-side processes are fully capable of processing the user input.

In particular embodiments, for the first and second scenarios mentioned above, the dialog arbitrator 216 may determine that the agents on the server-side are necessary to execute tasks responsive to the user input. Accordingly, the dialog arbitrator 216 may send necessary information regarding the user input to the action execution module 226. The action execution module 226 may call one or more agents to execute the tasks. In alternative embodiments, the action selector of the dialog manager may determine actions to execute and instruct the action execution module 226 accordingly. In particular embodiments, an agent may be an implementation that serves as a broker across a plurality of content providers for one domain. A content provider may be an entity responsible for carrying out an action associated with an intent or completing a task associated with the intent. In particular embodiments, the agents may comprise first-party agents and third-party agents. In particular embodiments, first-party agents may comprise internal agents that are accessible and controllable by the assistant system 140 (e.g. agents associated with services provided by the online social network, such as messaging services or photo-share services). In particular embodiments, third-party agents may comprise external agents that the assistant system 140 has no control over (e.g., third-party online music application agents, ticket sales agents). The first-party agents may be associated with first-party providers that provide content objects and/or services hosted by the social-networking system 160. The third-party agents may be associated with third-party providers that provide content objects and/or services hosted by the third-party system 170. In particular embodiments, each of the first-party agents or third-party agents may be designated for a particular domain. As an example and not by way of limitation, the domain may comprise weather, transportation, music, etc. In particular embodiments, the assistant system 140 may use a plurality of agents collaboratively to respond to a user input. As an example and not by way of limitation, the user input may comprise "direct me to my next meeting." The assistant system 140 may use a calendar agent to retrieve the location of the next meeting. The assistant system 140 may then use a navigation agent to direct the user to the next meeting.

In particular embodiments, for the second and third scenarios mentioned above, the dialog arbitrator 216 may determine that the agents on the client-side are capable of executing tasks responsive to the user input but additional information is needed (e.g., response templates) or that the tasks can be only handled by the agents on the server-side. If the dialog arbitrator 216 determines that the tasks can be only handled by the agents on the server-side, the dialog arbitrator 216 may send necessary information regarding the user input to the action execution module 226. If the dialog arbitrator 216 determines that the agents on the client-side are capable of executing tasks but response templates are needed, the dialog arbitrator 216 may send necessary information regarding the user input to a remote response template generation module 228. The output of the response template generation module 228 may be further sent to a local action execution module 230 executing on the client system 130. In particular embodiments, if the assistant orchestrator 206 determines to use client-side processes and that client-side processes are fully capable of processing the user input, the output of the reasoning module 222 may be directly sent to the action execution module 230.

In particular embodiments, the action execution module 230 may call local agents to execute tasks. A local agent on the client system 130 may be able to execute simpler tasks compared to an agent on the server-side. As an example and not by way of limitation, multiple device-specific implementations (e.g., real-time calls for a client system 130 or a messaging application on the client system 130) may be handled internally by a single agent. Alternatively, these device-specific implementations may be handled by multiple agents associated with multiple domains. In particular embodiments, the action execution module 230 may additionally perform a set of general executable dialog actions. The set of executable dialog actions may interact with agents, users and the assistant system 140 itself. These dialog actions may comprise dialog actions for slot request, confirmation, disambiguation, agent execution, etc. The dialog actions may be independent of the underlying implementation of the action selector or dialog policy. Both tree-based policy and model-based policy may generate the same basic dialog actions, with a callback function hiding any action selector specific implementation details.

In particular embodiments, the output from the remote action execution module 226 on the server-side may be sent to a remote response execution module 232. In particular embodiments, the action execution module 226 may communicate back to the dialog arbitrator 216 for more information. The response execution module 232 may be based on a remote conversational understanding (CU) composer. In particular embodiments, the output from the action execution module 226 may be formulated as a <k, c, u, d> tuple, in which k indicates a knowledge source, c indicates a communicative goal, u indicates a user model, and d indicates a discourse model. In particular embodiments, the CU composer may comprise a natural-language generation (NLG) module and a user interface (UI) payload generator. The natural-language generator may generate a communication content based on the output of the action execution module 226 using different language models and/or language templates. In particular embodiments, the generation of the communication content may be application specific and also personalized for each user. The CU composer may also determine a modality of the generated communication content using the UI payload generator. In particular embodiments, the NLG module may comprise a content determination component, a sentence planner, and a surface realization component. The content determination component may determine the communication content based on the knowledge source, communicative goal, and the user's expectations. As an example and not by way of limitation, the determining may be based on a description logic. The description logic may comprise, for example, three fundamental notions which are individuals (representing objects in the domain), concepts (describing sets of individuals), and roles (representing binary relations between individuals or concepts). The description logic may be characterized by a set of constructors that allow the natural-language generator to build complex concepts/roles from atomic ones. In particular embodiments, the content determination component may perform the following tasks to determine the communication content. The first task may comprise a translation task, in which the input to the natural-language generator may be translated to concepts. The second task may comprise a selection task, in which relevant concepts may be selected among those resulted from the translation task based on the user model. The third task may comprise a verification task, in which the coherence of the selected concepts may be verified. The fourth task may comprise an instantiation task, in which the verified concepts may be instantiated as an executable file that can be processed by the natural-language generator. The sentence planner may determine the organization of the communication content to make it human understandable. The surface realization component may determine specific words to use, the sequence of the sentences, and the style of the communication content. The UI payload generator may determine a preferred modality of the communication content to be presented to the user. In particular embodiments, the CU composer may check privacy constraints associated with the user to make sure the generation of the communication content follows the privacy policies. More information on natural-language generation may be found in U.S. patent application Ser. No. 15/967,279, filed 30 Apr. 2018, and U.S. patent application Ser. No. 15/966,455, filed 30 Apr. 2018, each of which is incorporated by reference.

In particular embodiments, the output from the local action execution module 230 on the client system 130 may be sent to a local response execution module 234. The response execution module 234 may be based on a local conversational understanding (CU) composer. The CU composer may comprise a natural-language generation (NLG) module. As the computing power of a client system 130 may be limited, the NLG module may be simple for the consideration of computational efficiency. Because the NLG module may be simple, the output of the response execution module 234 may be sent to a local response expansion module 236. The response expansion module 236 may further expand the result of the response execution module 234 to make a response more natural and contain richer semantic information.

In particular embodiments, if the user input is based on audio signals, the output of the response execution module 232 on the server-side may be sent to a remote text-to-speech (TTS) module 238. Similarly, the output of the response expansion module 236 on the client-side may be sent to a local TTS module 240. Both TTS modules may convert a response to audio signals. In particular embodiments, the output from the response execution module 232, the response expansion module 236, or the TTS modules on both sides, may be finally sent to a local render output module 242. The render output module 242 may generate a response that is suitable for the client system 130. As an example and not by way of limitation, the output of the response execution module 232 or the response expansion module 236 may comprise one or more of natural-language strings, speech, actions with parameters, or rendered images or videos that can be displayed in a VR headset or AR smart glasses. As a result, the render output module 242 may determine what tasks to perform based on the output of CU composer to render the response appropriately for displaying on the VR headset or AR smart glasses. For example, the response may be visual-based modality (e.g., an image or a video clip) that can be displayed via the VR headset or AR smart glasses. As another example, the response may be audio signals that can be played by the user via VR headset or AR smart glasses. As yet another example, the response may be augmented-reality data that can be rendered VR headset or AR smart glasses for enhancing user experience.

In particular embodiments, the assistant system 140 may have a variety of capabilities including audio cognition, visual cognition, signals intelligence, reasoning, and memories. In particular embodiments, the capability of audio recognition may enable the assistant system 140 to understand a user's input associated with various domains in different languages, understand a conversation and be able to summarize it, perform on-device audio cognition for complex commands, identify a user by voice, extract topics from a conversation and auto-tag sections of the conversation, enable audio interaction without a wake-word, filter and amplify user voice from ambient noise and conversations, understand which client system 130 (if multiple client systems 130 are in vicinity) a user is talking to.

In particular embodiments, the capability of visual cognition may enable the assistant system 140 to perform face detection and tracking, recognize a user, recognize most people of interest in major metropolitan areas at varying angles, recognize majority of interesting objects in the world through a combination of existing machine-learning models and one-shot learning, recognize an interesting moment and auto-capture it, achieve semantic understanding over multiple visual frames across different episodes of time, provide platform support for additional capabilities in people, places, objects recognition, recognize full set of settings and micro-locations including personalized locations, recognize complex activities, recognize complex gestures to control a client system 130, handle images/videos from egocentric cameras (e.g., with motion, capture angles, resolution, etc.), accomplish similar level of accuracy and speed regarding images with lower resolution, conduct one-shot registration and recognition of people, places, and objects, and perform visual recognition on a client system 130.

In particular embodiments, the assistant system 140 may leverage computer vision techniques to achieve visual cognition. Besides computer vision techniques, the assistant system 140 may explore options that can supplement these techniques to scale up the recognition of objects. In particular embodiments, the assistant system 140 may use supplemental signals such as optical character recognition (OCR) of an object's labels, GPS signals for places recognition, signals from a user's client system 130 to identify the user. In particular embodiments, the assistant system 140 may perform general scene recognition (home, work, public space, etc.) to set context for the user and reduce the computer-vision search space to identify top likely objects or people. In particular embodiments, the assistant system 140 may guide users to train the assistant system 140. For example, crowdsourcing may be used to get users to tag and help the assistant system 140 recognize more objects over time. As another example, users can register their personal objects as part of initial setup when using the assistant system 140. The assistant system 140 may further allow users to provide positive/negative signals for objects they interact with to train and improve personalized models for them.

In particular embodiments, the capability of signals intelligence may enable the assistant system 140 to determine user location, understand date/time, determine family locations, understand users' calendars and future desired locations, integrate richer sound understanding to identify setting/context through sound alone, build signals intelligence models at run time which may be personalized to a user's individual routines.

In particular embodiments, the capability of reasoning may enable the assistant system 140 to have the ability to pick up any previous conversation threads at any point in the future, synthesize all signals to understand micro and personalized context, learn interaction patterns and preferences from users' historical behavior and accurately suggest interactions that they may value, generate highly predictive proactive suggestions based on micro-context understanding, understand what content a user may want to see at what time of a day, understand the changes in a scene and how that may impact the user's desired content.

In particular embodiments, the capabilities of memories may enable the assistant system 140 to remember which social connections a user previously called or interacted with, write into memory and query memory at will (i.e., open dictation and auto tags), extract richer preferences based on prior interactions and long-term learning, remember a user's life history, extract rich information from egocentric streams of data and auto catalog, and write to memory in structured form to form rich short, episodic and long-term memories.

Figure 3:
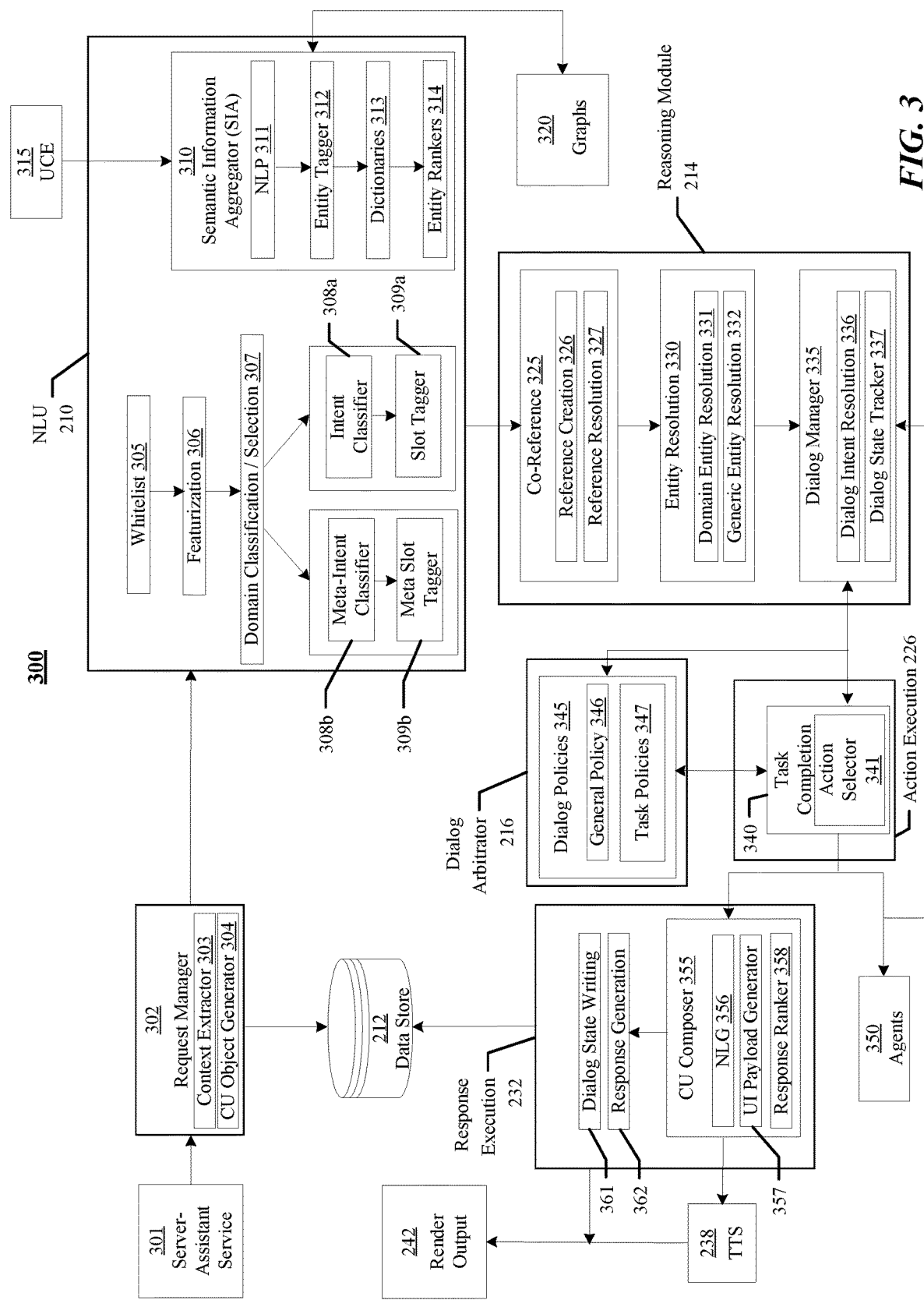
FIG. 3 illustrates an example diagram flow of server-side processes of the assistant system.

FIG. 3 illustrates an example diagram flow of server-side processes of the assistant system 140. In particular embodiments, a server-assistant service module 301 may access a request manager 302 upon receiving a user request. In alternative embodiments, the user request may be first processed by the remote ASR module 208 if the user request is based on audio signals. In particular embodiments, the request manager 302 may comprise a context extractor 303 and a conversational understanding object generator (CU object generator) 304. The context extractor 303 may extract contextual information associated with the user request. The context extractor 303 may also update contextual information based on the assistant application 136 executing on the client system 130. As an example and not by way of limitation, the update of contextual information may comprise content items are displayed on the client system 130. As another example and not by way of limitation, the update of contextual information may comprise whether an alarm is set on the client system 130. As another example and not by way of limitation, the update of contextual information may comprise whether a song is playing on the client system 130. The CU object generator 304 may generate particular content objects relevant to the user request. The content objects may comprise dialog-session data and features associated with the user request, which may be shared with all the modules of the assistant system 140. In particular embodiments, the request manager 302 may store the contextual information and the generated content objects in data store 212 which is a particular data store implemented in the assistant system 140.

In particular embodiments, the request manger 302 may send the generated content objects to the remote NLU module 210. The NLU module 210 may perform a plurality of steps to process the content objects. At step 305, the NLU module 210 may generate a whitelist for the content objects. In particular embodiments, the whitelist may comprise interpretation data matching the user request. At step 306, the NLU module 210 may perform a featurization based on the whitelist. At step 307, the NLU module 210 may perform domain classification/selection on user request based on the features resulted from the featurization to classify the user request into predefined domains. The domain classification/selection results may be further processed based on two related procedures. At step 308a, the NLU module 210 may process the domain classification/selection result using an intent classifier. The intent classifier may determine the user's intent associated with the user request. In particular embodiments, there may be one intent classifier for each domain to determine the most possible intents in a given domain. As an example and not by way of limitation, the intent classifier may be based on a machine-learning model that may take the domain classification/selection result as input and calculate a probability of the input being associated with a particular predefined intent. At step 308b, the NLU module 210 may process the domain classification/selection result using a meta-intent classifier. The meta-intent classifier may determine categories that describe the user's intent. In particular embodiments, intents that are common to multiple domains may be processed by the meta-intent classifier. As an example and not by way of limitation, the meta-intent classifier may be based on a machine-learning model that may take the domain classification/selection result as input and calculate a probability of the input being associated with a particular predefined meta-intent. At step 309a, the NLU module 210 may use a slot tagger to annotate one or more slots associated with the user request. In particular embodiments, the slot tagger may annotate the one or more slots for the n-grams of the user request. At step 309b, the NLU module 210 may use a meta slot tagger to annotate one or more slots for the classification result from the meta-intent classifier. In particular embodiments, the meta slot tagger may tag generic slots such as references to items (e.g., the first), the type of slot, the value of the slot, etc. As an example and not by way of limitation, a user request may comprise "change 500 dollars in my account to Japanese yen." The intent classifier may take the user request as input and formulate it into a vector. The intent classifier may then calculate probabilities of the user request being associated with different predefined intents based on a vector comparison between the vector representing the user request and the vectors representing different predefined intents. In a similar manner, the slot tagger may take the user request as input and formulate each word into a vector. The intent classifier may then calculate probabilities of each word being associated with different predefined slots based on a vector comparison between the vector representing the word and the vectors representing different predefined slots. The intent of the user may be classified as "changing money". The slots of the user request may comprise "500", "dollars", "account", and "Japanese yen". The meta-intent of the user may be classified as "financial service". The meta slot may comprise "finance".

In particular embodiments, the NLU module 210 may comprise a semantic information aggregator 310. The semantic information aggregator 310 may help the NLU module 210 improve the domain classification/selection of the content objects by providing semantic information. In particular embodiments, the semantic information aggregator 310 may aggregate semantic information in the following way. The semantic information aggregator 310 may first retrieve information from a user context engine 315. In particular embodiments, the user context engine 315 may comprise offline aggregators and an online inference service. The offline aggregators may process a plurality of data associated with the user that are collected from a prior time window. As an example and not by way of limitation, the data may include news feed posts/comments, interactions with news feed posts/comments, search history, etc., that are collected during a predetermined timeframe (e.g., from a prior 90-day window). The processing result may be stored in the user context engine 315 as part of the user profile. The online inference service may analyze the conversational data associated with the user that are received by the assistant system 140 at a current time. The analysis result may be stored in the user context engine 315 also as part of the user profile. In particular embodiments, both the offline aggregators and online inference service may extract personalization features from the plurality of data. The extracted personalization features may be used by other modules of the assistant system 140 to better understand user input. In particular embodiments, the semantic information aggregator 310 may then process the retrieved information, i.e., a user profile, from the user context engine 315 in the following steps. At step 311, the semantic information aggregator 310 may process the retrieved information from the user context engine 315 based on natural-language processing (NLP). In particular embodiments, the semantic information aggregator 310 may tokenize text by text normalization, extract syntax features from text, and extract semantic features from text based on NLP. The semantic information aggregator 310 may additionally extract features from contextual information, which is accessed from dialog history between a user and the assistant system 140. The semantic information aggregator 310 may further conduct global word embedding, domain-specific embedding, and/or dynamic embedding based on the contextual information. At step 312, the processing result may be annotated with entities by an entity tagger. Based on the annotations, the semantic information aggregator 310 may generate dictionaries for the retrieved information at step 313. In particular embodiments, the dictionaries may comprise global dictionary features which can be updated dynamically offline. At step 314, the semantic information aggregator 310 may rank the entities tagged by the entity tagger. In particular embodiments, the semantic information aggregator 310 may communicate with different graphs 320 including one or more of the social graph, the knowledge graph, or the concept graph to extract ontology data that is relevant to the retrieved information from the user context engine 315. In particular embodiments, the semantic information aggregator 310 may aggregate the user profile, the ranked entities, and the information from the graphs 320. The semantic information aggregator 310 may then provide the aggregated information to the NLU module 210 to facilitate the domain classification/selection.

In particular embodiments, the output of the NLU module 210 may be sent to the remote reasoning module 214. The reasoning module 214 may comprise a co-reference component 325, an entity resolution component 330, and a dialog manager 335. The output of the NLU module 210 may be first received at the co-reference component 325 to interpret references of the content objects associated with the user request. In particular embodiments, the co-reference component 325 may be used to identify an item to which the user request refers. The co-reference component 325 may comprise reference creation 326 and reference resolution 327. In particular embodiments, the reference creation 326 may create references for entities determined by the NLU module 210. The reference resolution 327 may resolve these references accurately. As an example and not by way of limitation, a user request may comprise "find me the nearest grocery store and direct me there". The co-reference component 325 may interpret "there" as "the nearest grocery store". In particular embodiments, the co-reference component 325 may access the user context engine 315 and the dialog manager 335 when necessary to interpret references with improved accuracy.

In particular embodiments, the identified domains, intents, meta-intents, slots, and meta slots, along with the resolved references may be sent to the entity resolution component 330 to resolve relevant entities. The entity resolution component 330 may execute generic and domain-specific entity resolution. In particular embodiments, the entity resolution component 330 may comprise domain entity resolution 331 and generic entity resolution 332. The domain entity resolution 331 may resolve the entities by categorizing the slots and meta slots into different domains. In particular embodiments, entities may be resolved based on the ontology data extracted from the graphs 320. The ontology data may comprise the structural relationship between different slots/meta-slots and domains. The ontology may also comprise information of how the slots/meta-slots may be grouped, related within a hierarchy where the higher level comprises the domain, and subdivided according to similarities and differences. The generic entity resolution 332 may resolve the entities by categorizing the slots and meta slots into different generic topics. In particular embodiments, the resolving may be also based on the ontology data extracted from the graphs 320. The ontology data may comprise the structural relationship between different slots/meta-slots and generic topics. The ontology may also comprise information of how the slots/meta-slots may be grouped, related within a hierarchy where the higher level comprises the topic, and subdivided according to similarities and differences. As an example and not by way of limitation, in response to the input of an inquiry of the advantages of a particular brand of electric car, the generic entity resolution 332 may resolve the referenced brand of electric car as vehicle and the domain entity resolution 331 may resolve the referenced brand of electric car as electric car.

In particular embodiments, the output of the entity resolution component 330 may be sent to the dialog manager 335 to advance the flow of the conversation with the user. The dialog manager 335 may be an asynchronous state machine that repeatedly updates the state and selects actions based on the new state. The dialog manager 335 may comprise dialog intent resolution 336 and dialog state tracker 337. In particular embodiments, the dialog manager 335 may execute the selected actions and then call the dialog state tracker 337 again until the action selected requires a user response, or there are no more actions to execute. Each action selected may depend on the execution result from previous actions. In particular embodiments, the dialog intent resolution 336 may resolve the user intent associated with the current dialog session based on dialog history between the user and the assistant system 140. The dialog intent resolution 336 may map intents determined by the NLU module 210 to different dialog intents. The dialog intent resolution 336 may further rank dialog intents based on signals from the NLU module 210, the entity resolution component 330, and dialog history between the user and the assistant system 140. In particular embodiments, instead of directly altering the dialog state, the dialog state tracker 337 may be a side-effect free component and generate n-best candidates of dialog state update operators that propose updates to the dialog state. The dialog state tracker 337 may comprise intent resolvers containing logic to handle different types of NLU intent based on the dialog state and generate the operators. In particular embodiments, the logic may be organized by intent handler, such as a disambiguation intent handler to handle the intents when the assistant system 140 asks for disambiguation, a confirmation intent handler that comprises the logic to handle confirmations, etc. Intent resolvers may combine the turn intent together with the dialog state to generate the contextual updates for a conversation with the user. A slot resolution component may then recursively resolve the slots in the update operators with resolution providers including the knowledge graph and domain agents. In particular embodiments, the dialog state tracker 337 may update/rank the dialog state of the current dialog session. As an example and not by way of limitation, the dialog state tracker 337 may update the dialog state as "completed" if the dialog session is over. As another example and not by way of limitation, the dialog state tracker 337 may rank the dialog state based on a priority associated with it.

In particular embodiments, the reasoning module 214 may communicate with the remote action execution module 226 and the dialog arbitrator 216, respectively. In particular embodiments, the dialog manager 335 of the reasoning module 214 may communicate with a task completion component 340 of the action execution module 226 about the dialog intent and associated content objects. In particular embodiments, the task completion module 340 may rank different dialog hypotheses for different dialog intents. The task completion module 340 may comprise an action selector 341. In alternative embodiments, the action selector 341 may be comprised in the dialog manager 335. In particular embodiments, the dialog manager 335 may additionally check against dialog policies 345 comprised in the dialog arbitrator 216 regarding the dialog state. In particular embodiments, a dialog policy 345 may comprise a data structure that describes an execution plan of an action by an agent 350. The dialog policy 345 may comprise a general policy 346 and task policies 347. In particular embodiments, the general policy 346 may be used for actions that are not specific to individual tasks. The general policy 346 may comprise handling low confidence intents, internal errors, unacceptable user response with retries, skipping or inserting confirmation based on ASR or NLU confidence scores, etc. The general policy 346 may also comprise the logic of ranking dialog state update candidates from the dialog state tracker 337 output and pick the one to update (such as picking the top ranked task intent). In particular embodiments, the assistant system 140 may have a particular interface for the general policy 346, which allows for consolidating scattered cross-domain policy/business-rules, especial those found in the dialog state tracker 337, into a function of the action selector 341. The interface for the general policy 346 may also allow for authoring of self-contained sub-policy units that may be tied to specific situations or clients, e.g., policy functions that may be easily switched on or off based on clients, situation, etc. The interface for the general policy 346 may also allow for providing a layering of policies with back-off, i.e. multiple policy units, with highly specialized policy units that deal with specific situations being backed up by more general policies 346 that apply in wider circumstances. In this context the general policy 346 may alternatively comprise intent or task specific policy. In particular embodiments, a task policy 347 may comprise the logic for action selector 341 based on the task and current state. In particular embodiments, the types of task policies 347 may include one or more of the following types: (1) manually crafted tree-based dialog plans; (2) coded policy that directly implements the interface for generating actions; (3) configurator-specified slot-filling tasks; or (4) machine-learning model based policy learned from data. In particular embodiments, the assistant system 140 may bootstrap new domains with rule-based logic and later refine the task policies 347 with machine-learning models. In particular embodiments, a dialog policy 345 may a tree-based policy, which is a pre-constructed dialog plan. Based on the current dialog state, a dialog policy 345 may choose a node to execute and generate the corresponding actions. As an example and not by way of limitation, the tree-based policy may comprise topic grouping nodes and dialog action (leaf) nodes.

In particular embodiments, the action selector 341 may take candidate operators of dialog state and consult the dialog policy 345 to decide what action should be executed. The assistant system 140 may use a hierarchical dialog policy with general policy 346 handling the cross-domain business logic and task policies 347 handles the task/domain specific logic. In particular embodiments, the general policy 346 may pick one operator from the candidate operators to update the dialog state, followed by the selection of a user facing action by a task policy 347. Once a task is active in the dialog state, the corresponding task policy 347 may be consulted to select right actions. In particular embodiments, both the dialog state tracker 337 and the action selector 341 may not change the dialog state until the selected action is executed. This may allow the assistant system 140 to execute the dialog state tracker 337 and the action selector 341 for processing speculative ASR results and to do n-best ranking with dry runs. In particular embodiments, the action selector 341 may take the dialog state update operators as part of the input to select the dialog action. The execution of the dialog action may generate a set of expectation to instruct the dialog state tracker 337 to handler future turns. In particular embodiments, an expectation may be used to provide context to the dialog state tracker 337 when handling the user input from next turn. As an example and not by way of limitation, slot request dialog action may have the expectation of proving a value for the requested slot.

In particular embodiments, the dialog manager 335 may support multi-turn compositional resolution of slot mentions. For a compositional parse from the NLU 210, the resolver may recursively resolve the nested slots. The dialog manager 335 may additionally support disambiguation for the nested slots. As an example and not by way of limitation, the user request may be "remind me to call Alex". The resolver may need to know which Alex to call before creating an actionable reminder to-do entity. The resolver may halt the resolution and set the resolution state when further user clarification is necessary for a particular slot. The general policy 346 may examine the resolution state and create corresponding dialog action for user clarification. In dialog state tracker 337, based on the user request and the last dialog action, the dialog manager may update the nested slot. This capability may allow the assistant system 140 to interact with the user not only to collect missing slot values but also to reduce ambiguity of more complex/ambiguous utterances to complete the task. In particular embodiments, the dialog manager may further support requesting missing slots in a nested intent and multi-intent user requests (e.g., "take this photo and send it to Dad"). In particular embodiments, the dialog manager 335 may support machine-learning models for more robust dialog experience. As an example and not by way of limitation, the dialog state tracker 337 may use neural network based models (or any other suitable machine-learning models) to model belief over task hypotheses. As another example and not by way of limitation, for action selector 341, highest priority policy units may comprise white-list/black-list overrides, which may have to occur by design; middle priority units may comprise machine-learning models designed for action selection; and lower priority units may comprise rule-based fallbacks when the machine-learning models elect not to handle a situation. In particular embodiments, machine-learning model based general policy unit may help the assistant system 140 reduce redundant disambiguation or confirmation steps, thereby reducing the number of turns to execute the user request.

In particular embodiments, the action execution module 226 may call different agents 350 for task execution. An agent 350 may select among registered content providers to complete the action. The data structure may be constructed by the dialog manager 335 based on an intent and one or more slots associated with the intent. A dialog policy 345 may further comprise multiple goals related to each other through logical operators. In particular embodiments, a goal may be an outcome of a portion of the dialog policy and it may be constructed by the dialog manager 335. A goal may be represented by an identifier (e.g., string) with one or more named arguments, which parameterize the goal. As an example and not by way of limitation, a goal with its associated goal argument may be represented as {confirm artist, args: {artist: "Madonna"}}. In particular embodiments, a dialog policy may be based on a tree-structured representation, in which goals are mapped to leaves of the tree. In particular embodiments, the dialog manager 335 may execute a dialog policy 345 to determine the next action to carry out. The dialog policies 345 may comprise generic policy 346 and domain specific policies 347, both of which may guide how to select the next system action based on the dialog state. In particular embodiments, the task completion component 340 of the action execution module 226 may communicate with dialog policies 345 comprised in the dialog arbitrator 216 to obtain the guidance of the next system action. In particular embodiments, the action selection component 341 may therefore select an action based on the dialog intent, the associated content objects, and the guidance from dialog policies 345.

In particular embodiments, the output of the action execution module 226 may be sent to the remote response execution module 232. Specifically, the output of the task completion component 340 of the action execution module 226 may be sent to the CU composer 355 of the response execution module 226. In alternative embodiments, the selected action may require one or more agents 350 to be involved. As a result, the task completion module 340 may inform the agents 350 about the selected action. Meanwhile, the dialog manager 335 may receive an instruction to update the dialog state. As an example and not by way of limitation, the update may comprise awaiting agents' 350 response. In particular embodiments, the CU composer 355 may generate a communication content for the user using a natural-language generation (NLG) module 356 based on the output of the task completion module 340. In particular embodiments, the NLG module 356 may use different language models and/or language templates to generate natural language outputs. The generation of natural language outputs may be application specific. The generation of natural language outputs may be also personalized for each user. The CU composer 355 may also determine a modality of the generated communication content using the UI payload generator 357. Since the generated communication content may be considered as a response to the user request, the CU composer 355 may additionally rank the generated communication content using a response ranker 358. As an example and not by way of limitation, the ranking may indicate the priority of the response.

In particular embodiments, the response execution module 232 may perform different tasks based on the output of the CU composer 355. These tasks may include writing (i.e., storing/updating) the dialog state 361 retrieved from data store 212 and generating responses 362. In particular embodiments, the output of CU composer 355 may comprise one or more of natural-language strings, speech, actions with parameters, or rendered images or videos that can be displayed in a VR headset or AR smart glass. As a result, the response execution module 232 may determine what tasks to perform based on the output of CU composer 355. In particular embodiments, the generated response and the communication content may be sent to the local render output module 242 by the response execution module 232. In alternative embodiments, the output of the CU composer 355 may be additionally sent to the remote TTS module 238 if the determined modality of the communication content is audio. The speech generated by the TTS module 238 and the response generated by the response execution module 232 may be then sent to the render output module 242.

Figure 4:
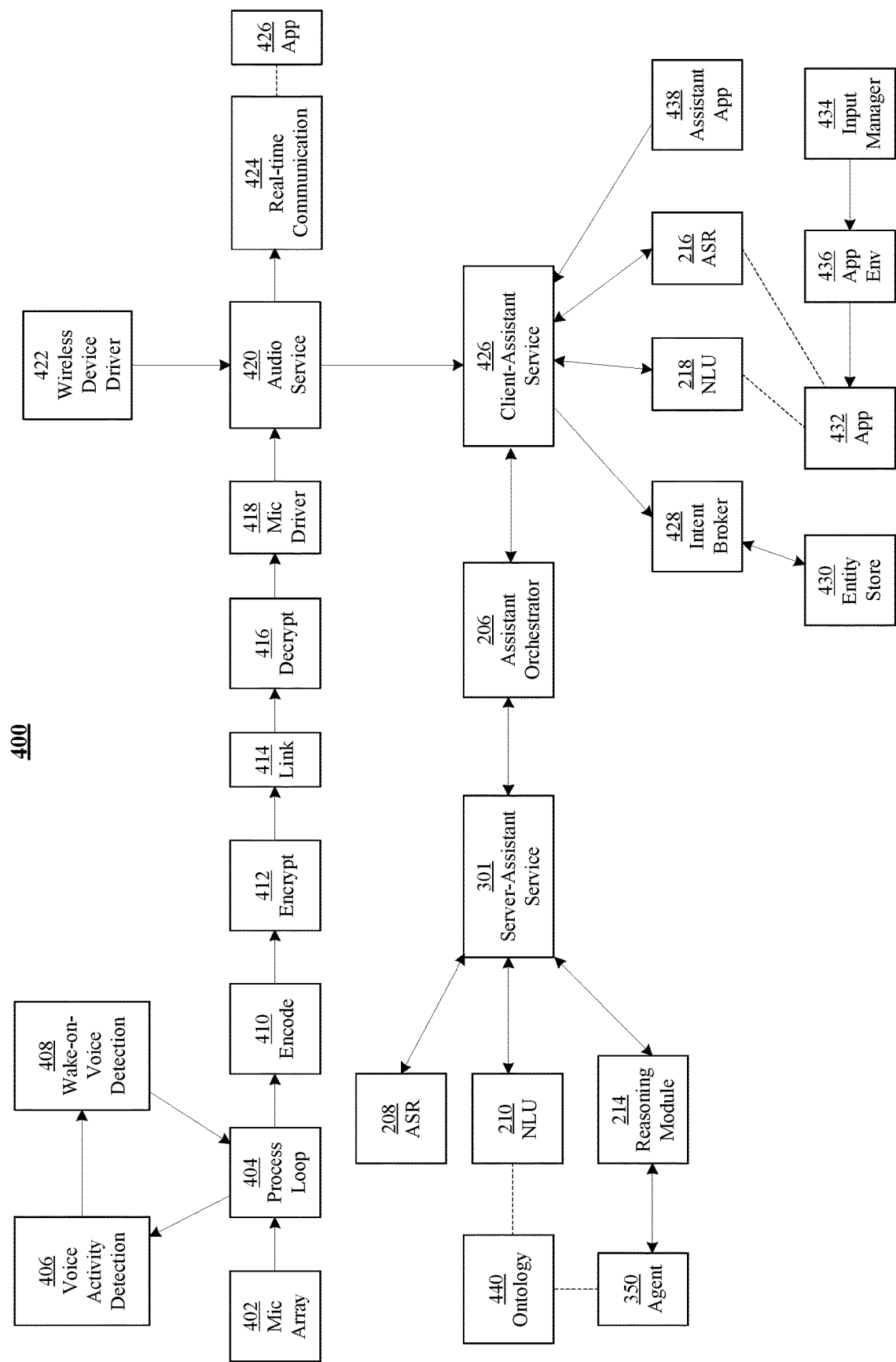
FIG. 4 illustrates an example diagram flow of processing a user input by the assistant system.

FIG. 4 illustrates an example diagram flow of processing a user input by the assistant system 140. As an example and not by way of limitation, the user input may be based on audio signals. In particular embodiments, a mic array 402 of the client system 130 may receive the audio signals (e.g., speech). The audio signals may be transmitted to a process loop 404 in a format of audio frames. In particular embodiments, the process loop 404 may send the audio frames for voice activity detection (VAD) 406 and wake-on-voice (WoV) detection 408. The detection results may be returned to the process loop 404. If the WoV detection 408 indicates the user wants to invoke the assistant system 140, the audio frames together with the VAD 406 result may be sent to an encode unit 410 to generate encoded audio data. After encoding, the encoded audio data may be sent to an encrypt unit 412 for privacy and security purpose, followed by a link unit 414 and decrypt unit 416. After decryption, the audio data may be sent to a mic driver 418, which may further transmit the audio data to an audio service module 420. In alternative embodiments, the user input may be received at a wireless device (e.g., Bluetooth device) paired with the client system 130. Correspondingly, the audio data may be sent from a wireless-device driver 422 (e.g., Bluetooth driver) to the audio service module 420. In particular embodiments, the audio service module 420 may determine that the user input can be fulfilled by an application executing on the client system 130. Accordingly, the audio service module 420 may send the user input to a real-time communication (RTC) module 424. The RTC module 424 may deliver audio packets to a video or audio communication system (e.g., VOIP or video call). The RTC module 424 may call a relevant application (App) 426 to execute tasks related to the user input.

In particular embodiments, the audio service module 420 may determine that the user is requesting assistance that needs the assistant system 140 to respond. Accordingly, the audio service module 420 may inform the client-assistant service module 426. In particular embodiments, the client-assistant service module 426 may communicate with the assistant orchestrator 206. The assistant orchestrator 206 may determine whether to use client-side processes or server-side processes to respond to the user input. In particular embodiments, the assistant orchestrator 206 may determine to use client-side processes and inform the client-assistant service module 426 about such decision. As a result, the client-assistant service module 426 may call relevant modules to respond to the user input.

In particular embodiments, the client-assistant service module 426 may use the local ASR module 216 to analyze the user input. The ASR module 216 may comprise a grapheme-to-phoneme (G2P) model, a pronunciation learning model, a personalized language model (PLM), an end-pointing model, and a personalized acoustic model. In particular embodiments, the client-assistant service module 426 may further use the local NLU module 218 to understand the user input. The NLU module 218 may comprise a named entity resolution (NER) component and a contextual session-based NLU component. In particular embodiments, the client-assistant service module 426 may use an intent broker 428 to analyze the user's intent. To be accurate about the user's intent, the intent broker 428 may access an entity store 430 comprising entities associated with the user and the world. In alternative embodiments, the user input may be submitted via an application 432 executing on the client system 130. In this case, an input manager 434 may receive the user input and analyze it by an application environment (App Env) module 436. The analysis result may be sent to the application 432 which may further send the analysis result to the ASR module 216 and NLU module 218. In alternative embodiments, the user input may be directly submitted to the client-assistant service module 426 via an assistant application 438 executing on the client system 130. Then the client-assistant service module 426 may perform similar procedures based on modules as aforementioned, i.e., the ASR module 216, the NLU module 218, and the intent broker 428.

In particular embodiments, the assistant orchestrator 206 may determine to user server-side process. Accordingly, the assistant orchestrator 206 may send the user input to one or more computing systems that host different modules of the assistant system 140. In particular embodiments, a server-assistant service module 301 may receive the user input from the assistant orchestrator 206. The server-assistant service module 301 may instruct the remote ASR module 208 to analyze the audio data of the user input. The ASR module 208 may comprise a grapheme-to-phoneme (G2P) model, a pronunciation learning model, a personalized language model (PLM), an end-pointing model, and a personalized acoustic model. In particular embodiments, the server-assistant service module 301 may further instruct the remote NLU module 210 to understand the user input. In particular embodiments, the server-assistant service module 301 may call the remote reasoning model 214 to process the output from the ASR module 208 and the NLU module 210. In particular embodiments, the reasoning model 214 may perform entity resolution and dialog optimization. In particular embodiments, the output of the reasoning model 314 may be sent to the agent 350 for executing one or more relevant tasks.

In particular embodiments, the agent 350 may access an ontology module 440 to accurately understand the result from entity resolution and dialog optimization so that it can execute relevant tasks accurately. The ontology module 440 may provide ontology data associated with a plurality of predefined domains, intents, and slots. The ontology data may also comprise the structural relationship between different slots and domains. The ontology data may further comprise information of how the slots may be grouped, related within a hierarchy where the higher level comprises the domain, and subdivided according to similarities and differences. The ontology data may also comprise information of how the slots may be grouped, related within a hierarchy where the higher level comprises the topic, and subdivided according to similarities and differences. Once the tasks are executed, the agent 350 may return the execution results together with a task completion indication to the reasoning module 214.

The embodiments disclosed herein may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Semantic Representations Using Structural Ontology

In particular embodiments, the assistant system 140 may use a structural semantic representation framework, namely "next generation ontology" (NGO), for structuring instructions for the various modules of the assistant system 140, including instructions for interfacing with first-party and third-party agents. NGO may comprise an ontology with several different types of semantic units, e.g., actions, objects, and attributes. NGO may support a labeling system that is derivable from the ontology, allowing user requests to be represented as sub-graphs of the ontology. NGO may allow the assistant system 140 to have a unification of the semantic representations used by the natural-language understanding processes (i.e., input processing) and that used by the natural-language generation processes (i.e., output processing). All modules in the stack of the assistant system 140 may use the same type of semantic representation based on NGO instead of their own semantics, thereby reducing the mapping between them and increasing the consistency. Objects may be carried throughout the stack of the assistant system 140, in which the assistant system 140 may use the dialog manager to change actions between input and output based on a mapping layer. Furthermore, because all parts of the ontology are defined, the assistant system 140 may determine whether any semantic parsing of a user request is valid before trying to execute a corresponding task. Although this disclosure describes particular ontology in a particular manner, this disclosure contemplates any suitable ontology in any suitable manner.

In particular embodiments, the assistant system 140 may receive, by an assistant xbot from a client system 130 associated with a user, a user input comprising a natural-language utterance. The assistant system 140 may then determine a semantic representation of the user input based on a structural ontology. In particular embodiments, the structural ontology may define a labeling syntax for parsing the natural-language utterance to semantic units comprising a plurality of actions, objects, and attributes. The semantic representation may embed at least one object within at least one action and declares at least one attribute of the embedded object to be acted upon. In particular embodiments, the assistant system 140 may send, to an agent, a request for executing a task corresponding to the user input. The request may be based on the semantic representation. In particular embodiments, the assistant system 140 may receive, from the agent, results of the executed task, wherein the results are mapped to a structure determined by the structural ontology. The assistant system 140 may further send, from the assistant xbot to the client system 130, instructions for presenting a response to the user input, wherein the response is based on the results of the executed task.

In particular embodiments, the assistant system 140 may need a semantic representation to encode a task a user wants to accomplish. A semantic representation may be a formal language that describes the semantics of natural language. Majority of traditional semantic representations used in task oriented semantic parsing may revolve around flat intent/slot paradigm. The flat intent/slot (IN/SL) paradigm may distill a natural language utterance into a single intent with a set of slots. Related intents may be collected into a domain. The term flat may refer to the parses in which slots values are necessarily terminal. The representational capabilities of flat intent/slot representations may be limited.

Labels (specific intents and slots) in the IN/SL paradigm may be ungrounded, i.e., they may be arbitrary and have no formal relationships or hierarchy as there exists no ontology providing structure for the labels and the semantic concepts they represent. Such ungrounded label sets may lack formalizations to orient them in a coherent world view as expressed by an ontology. Furthermore, intents/slots may not provide a rich type system. Therefore, maintaining an internally consistent and semantically expressive label set may be difficult.

To address aforementioned limitations, the embodiments disclosed herein may use NGO for generating semantic representations. NGO may comprise a graph ontology with several different types of semantic units, such as actions and objects, that are strongly typed. Constraints and definitions may be defined over the semantic units. These constraints may help with prediction and validation of NLU output, back off when either an agent doesn't support a particular feature or the utterance is ambiguous to have multiple possible interpretations (e.g. "Halo" can be a game or a music title), and have the same entity type for knowledge graph and query modeling which helps with seamless entity recognition. The semantic units may be nodes in the graph and their connections may be edges in the graph. NGO may combine the semantic space of natural-language understanding and natural-language generation labeling systems with the concepts from knowledge graph, concept graph, and multi-modal understanding into a single, shared semantic representation. From this graph ontology, the assistant system 140 may derive a domain and modality agnostic labeling representation. The unified graph ontology of NGO may promote reusability across domains. In addition, the ontology may be hierarchically organized which inherently supports back-offs. Node-edge relationships may be exploited to capture complex queries, and a shared semantic space may allow for seamless integration of multi-modal input. Furthermore, re-usability of actions, objects, attributes may slow the trajectory of label set additions. In particular embodiments, NGO may approach a semantic representation by decomposing them into orthogonal elements, semantic units, labeling representation (e.g., NLU output), and type system (semantic constraints/definitions). NGO may have three core semantic units, i.e., action, object and attribute, and three derivative semantic units, i.e., method, enum and list. Every semantic unit may have a type. NGO may support a labeling system that is derivable from the ontology, allowing user requests to be represented as sub-graphs of the ontology. The labeling language syntax may combine actions, objects, attributes, methods, and enums in predictable ways.

Figure 5:
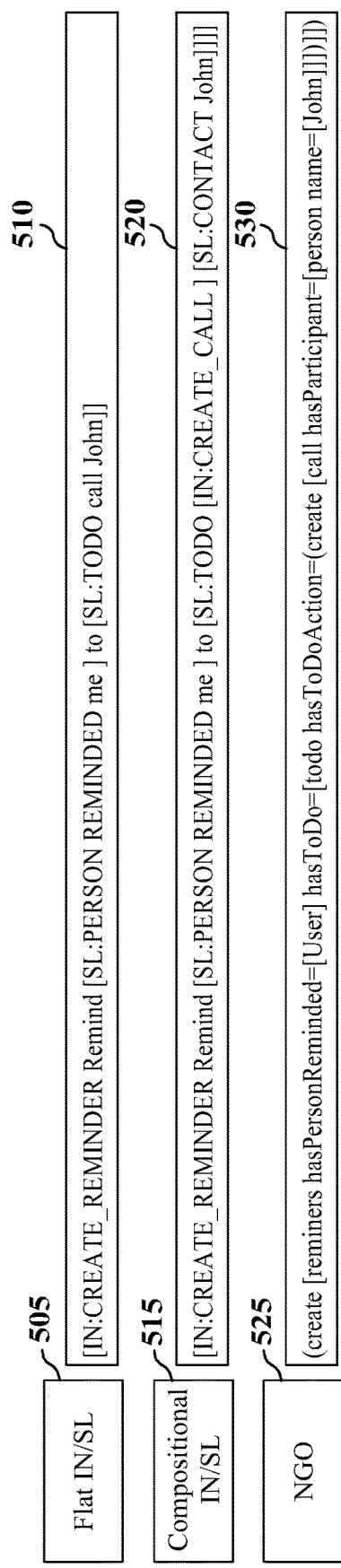
FIG. 5 illustrates an example comparison between an IN/SL representation and an NGO representation of an utterance.

FIG. 5 illustrates an example comparison between an IN/SL representation and an NGO representation of an utterance. The utterance may be "remind me to call john." As illustrated in FIG. 5, the flat IN/SL representation 505 may be [IN:CREATE_REMINDER Remind [SL:PERSON REMINDED me] to [SL:TODO call John]] 510. The compositional IN/SL representation 515 may be [IN:CREATE_REMINDER Remind [SL:PERSON REMINDED me] to [SL:TODO [IN:CREATE_CALL] [SL:CONTACT John]]]] 520. By contrast, the NGO representation 525 may be (create [reminers hasPersonReminded=[User] hasToDo= [todo hasToDoAction=(create [call hasParticipant=[person name=[John]]])]]) 530.

Figure 6:
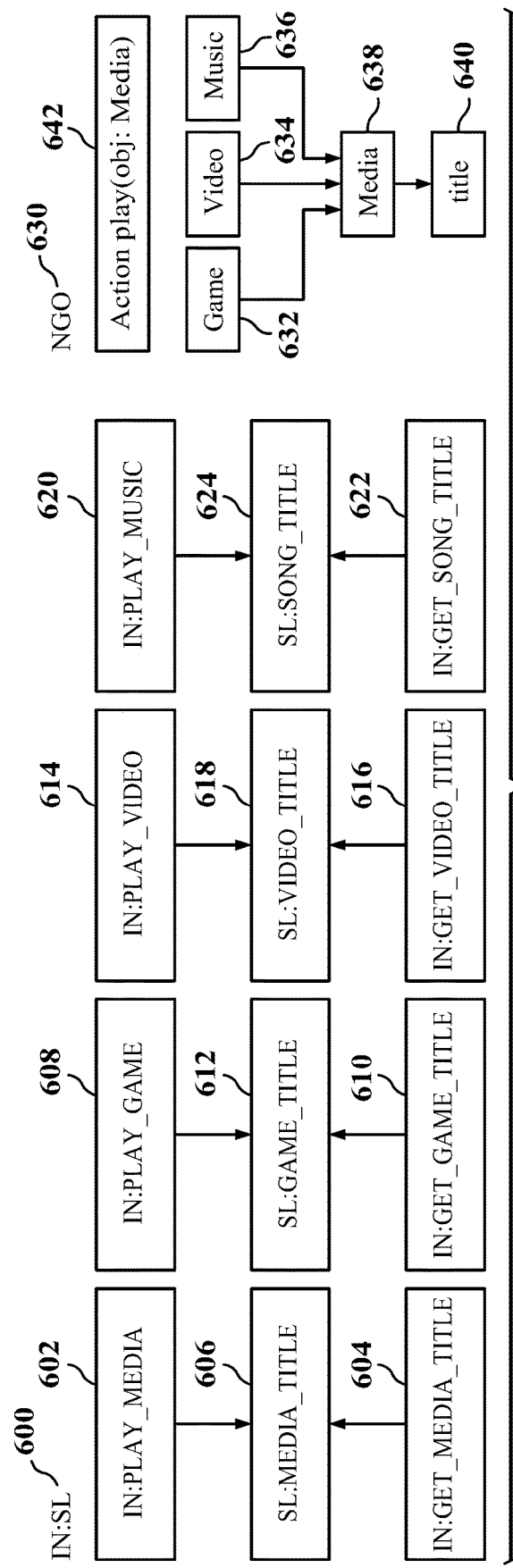
FIG. 6 illustrates an example comparison between media domains represented by the IN/SL paradigm and those represented by NGO structure.

FIG. 6 illustrates an example comparison between media domains represented by the IN/SL paradigm and those represented by NGO structure. The left grouping (IN/SL 600) shows a simplistic view of how various media domains are represented in a traditional asynchronously stood up intent/slot based assistant. As illustrated, both intent IN:PLAY_MEDIA 602 and intent IN:GET_MEDIA_TITLE 604 may require a slot SL:MEDIA_TITLE 606; IN:PLAY_GAME 608 and IN:GET_GAME_TITLE 610 may require SL:GAME_TITLE 612; IN:PLAY_VIDEO 614 and IN:GET_VIDEO_TITLE 616 may require SL:VIDEO_TITLE 618; IN:PLAY_MUSIC 620 and IN:GET_SONG_TITLE 622 may require SL:SONG_TITLE 624. The right grouping (NGO 630) shows how NGO may represent the same domain in the proposed structure. As illustrated, game 632, music 634, and video 636 may be all covered by media 638, which may be referred by a title 640. The corresponding NGO representation may be the same for game 632, music 634, and video 636, which may be "action play(obj: Media)" 642.

In particular embodiments, actions may represent actions the assistant system 140 may take. The structural ontology may define that each of the plurality of actions operates on one or more of the plurality of objects. As an example and not by way of limitation, an action may comprise one or more of "create", "get", "update", "play", or "delete". Actions may be strongly typed with a static lifetime that can operate on strongly typed objects. All actions in NGO may begin and end with parentheses. As an example and not by way of limitation, for action "play" without arguments the NGO parse may be (play). In particular embodiments, the at least one action may have one or more arguments. Each argument may specify a constraint for an object to satisfy such that the at least one action can act upon the object. At least one of the arguments may specify a constraint that the at least one object satisfies. As an example and not by way of limitation, an action may have positional arguments, e.g., (action [obj1]), such as "create" (action) a "call" (object). An action may also have named arguments such as an attribute, e.g., (action [obj1, attribute=obj2]), such as "create" a "call" with participant "John". An action may additionally have a type signature with required return value. Void return values for an action may be not allowed. Actions may exclude information about specific entity types. As an example and not by way of limitation, (play_music) may be an incorrect action. Instead, objects may be used to describe the target entity type. In other words, (play [music]) may be a correct form. This may make actions, like all entities, reusable across domains and scenarios. As an example and not by way of limitation, both "get me a song" and "get me their availability" may correspond to the "get" action. Although this disclosure describes particular actions in a particular manner, this disclosure contemplates any suitable action in any suitable manner.

In particular embodiments, objects may record types that contain strongly typed attributes and methods. The structural ontology may define that each of the plurality of objects comprises one or more of the plurality of attributes. An object may be operated on by an action or may be linked via an attribute. All objects may begin and end with square brackets with the object name coming directly after the left square bracket. Objects may have sub-type objects or super-type objects. They may contain other typed objects (attributes) and methods. Objects may be not used to enumerate specific properties, e.g., the action (get [track_title]) may be incorrect. Instead, attributes may be used for specific properties, e.g., (get [track].title) may be the correct form of the action. This may facilitate inheritance between objects, provide structure, and increase reusability. Consider media and the sub-domains music, game, and video as an example. Each Domain may introduce repetitive intents and slots using the IN/SL paradigm, prone to inconsistency and error. By contrast, NGO may a technical advantage of reduced duplication of effort as NGO may allow for automatic generation of a semantic space through re-usability, remove domain distinctions, and support type hierarchies, which may create re-useable labeling elements and reduce duplication of effort. Although this disclosure describes particular objects in a particular manner, this disclosure contemplates any suitable object in any suitable manner.

In particular embodiments, attributes may be used to enumerate specific properties of actions and objects and specify the nature of the relationship between two entities. The structural ontology may define that each of the plurality of attributes declares a restriction on an action or object. Typed objects may be tied to other objects via attributes, which may be a strict and unique relationship. As an example and not by way of limitation, name may be an attribute of a "person" object, which is of type string. As another example and not by way of limitation, "hasParticipant" may be an attribute of a "call" object that is of type participant. Taking a user request "play a Beyoncé song" as an example, such request may be represented as (play [track hasPerformer=[person name=[Beyonce]]]), in which "play" is an action, "track" and "person" are objects, and "hasPerformer" and "name" are attributes. In particular embodiments, attributes may be used to express a directed triple linking some entity to another by a unidirectional semantic role, i.e., (Entity_1, Attribute, Entity_2) such as (Bill, fatherOf, Brian). Syntactically, attributes may appear in two locations of a parse. Attributes may appear as named arguments to specify the features of some specific referent, e.g., "play the song hello goodbye"=(play [track title=[hello goodbye]]). Attributes may also appear as dot-attributes to specify the attribute of an object as the target of the action, e.g., "what's the title of this song"=(get [track].title). Attributes may be similar in syntax and function to class-member variables. Although this disclosure describes particular attributes in a particular manner, this disclosure contemplates any suitable attribute in any suitable manner.

In particular embodiments, the structural ontology NGO may define that the semantic units further comprise a plurality of methods and enums. Each of the plurality of methods may comprise an action with its lifetime tied to an object. In particular embodiments, a method may own an object. A method may also have the same characteristics as actions, that is, have method name with a namespace, have positional arguments, and have named arguments. Methods may be introduced by a "." operator and may be suffixed with parentheses. They may act on attribute values, and appear in the following form:

```
(fb/<action_name>[fb/<object_name>].<attributeName>.<methodName>([fb/<object_name>])))
(fb/<action_name> [fb/<object_name> ].<attributeName>.<methodName>([ ])))
```

Both object types and data types may be acted upon by methods. As an example and not by way of limitation, there may be three methods. The "add" method may update an attribute by adding to it. The "remove" method may update an attribute by removing from it. The "set" method may set the value of an attribute. Methods may be an additional feature of NGO that trade additional label-type complexity for a reduction in parse complexity, e.g., by reducing the level of nesting by one. As an example and not by way of limitation, a method may be adding a recipient to a call as (update [call].hasRecipient.addaperson name=[John]]). As another example and not by way of limitation, a method may be setting an APP to be default (update [music_app name=[spotify]].setDefault( )). Methods may be inheritable. Although this disclosure describes particular methods in a particular manner, this disclosure contemplates any suitable method in any suitable manner.

In particular embodiments, each of the plurality of enums may comprise an object representing one out of a plurality of objects. Enums may be string tagged union types. Enums may be a specific label-type which leverage the NLU module 210/218 to reduce the need to interpret raw strings downstream. Enums may be the arguments to attributes anywhere where a finite set of inputs are expected. In particular embodiments, enums may be useful when there's variability in substring form with equivalent semantics. The source string may be preserved to afford dialog the ability to inspect the sub-span if desired. In particular embodiments, the semantic units may additionally comprise lists which may be objects that represent lists with a homogeneous type. In particular embodiments, every semantic representation may have a namespace. As an example and not by way of limitation, a namespace may be "fb/". Although this disclosure describes particular enums and lists in a particular manner, this disclosure contemplates any suitable enum and list in any suitable manner.

In particular embodiments, the assistant system 140 may construct NGO as follows. The construction may begin with the sub-graph. In particular embodiments, the structural ontology may further define a graph structure comprising one or more core sub-graphs and one or more generic sub-graphs. The one or more core sub-graphs may be not accessible by third-party agents, and the one or more generic sub-graphs may be accessible by the third-party agents. Actions and objects may be modeled as nodes on the graph whereas attributes may be expressed as edges between nodes. In particular embodiments, the basic structure may be: Node (object)→hasAttribute (attribute)→Node (object). As an example and not by way of limitation, a basic structure may be Track→hasGenre→Music Genre, rendered as [track hasGenre [genre=[some Music Genre]]]. As another example and not by way of limitation, a basic structure may be Movie→hasGenre→Narrative Genre, rendered as [movie hasGenre [genre=[some Narrative Genre]]]. In particular embodiments, all semantic units in NGO may be reusable. The construction of NGO may mainly comprise creating new semantic units (e.g., new actions, new objects, new attributes) and making new connections between existing nodes to express new meaning and behavior. Defining core sub-graphs and generic sub-graphs may be an effective solution for addressing the technical challenge of providing third-party users flexibility for designing their own semantic units while keeping the structural ontology intact as the core sub-graphs and generic sub-graphs are functionally separated and the fundamental structure of the ontology are maintained by the core sub-graphs which are only viewable to the third-party users. Although this disclosure describes constructing particular ontology by particular systems in a particular manner, this disclosure contemplates constructing any suitable ontology by any suitable system in any suitable manner.

Figure 7:
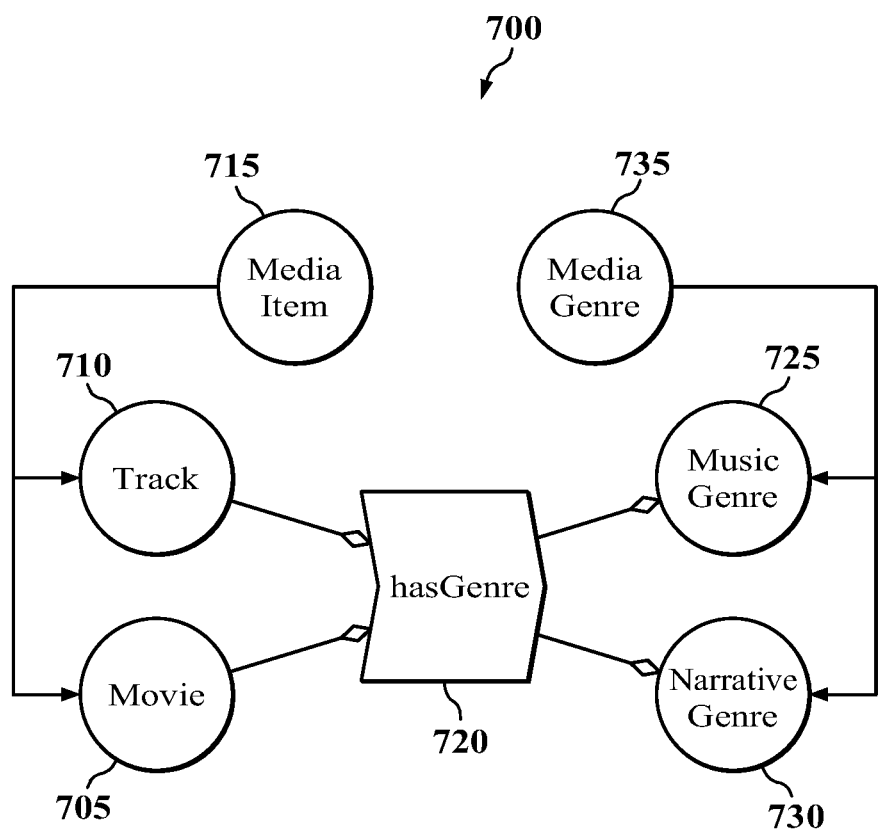
FIG. 7 illustrates an example structure of an NGO sub-graph.

FIG. 7 illustrates an example structure of an NGO sub-graph 700. In particular embodiments, the structural ontology may define that the plurality of objects are hierarchically organized into a plurality of super-types and sub-types. Each sub-type may inherit one or more attributes of its associated super-type. As illustrated in FIG. 7, nodes may be placed in hierarchies, allowing implicit back-offs. As an example and not by way of limitation, FIG. 7 shows that "movie" 705 and "track" 710 may back-off to "media item" 715. The same edge (e.g., hasGenre 720) may be used to link "track" 710 with "music genre" 725 and "movie" 705 to "narrative genre" 730. "music genre" 725 and "narrative genre" 730 may back-off to "media genre" 735. In particular embodiments, valid attributes may be baked into the objects so it becomes impossible to make invalid linking despite reusability. NGO may have a technical advantage of hierarchy aware back-off as NGO may encode automatic and systematic back-offs for ambiguous or incorrectly tagged utterances and avoid hard coded rules for back-offs that may increase as domains increase. Although this disclosure describes particular structures of a particular ontology in a particular manner, this disclosure contemplates any suitable structure of any suitable ontology in any suitable manner.

Figure 8A:
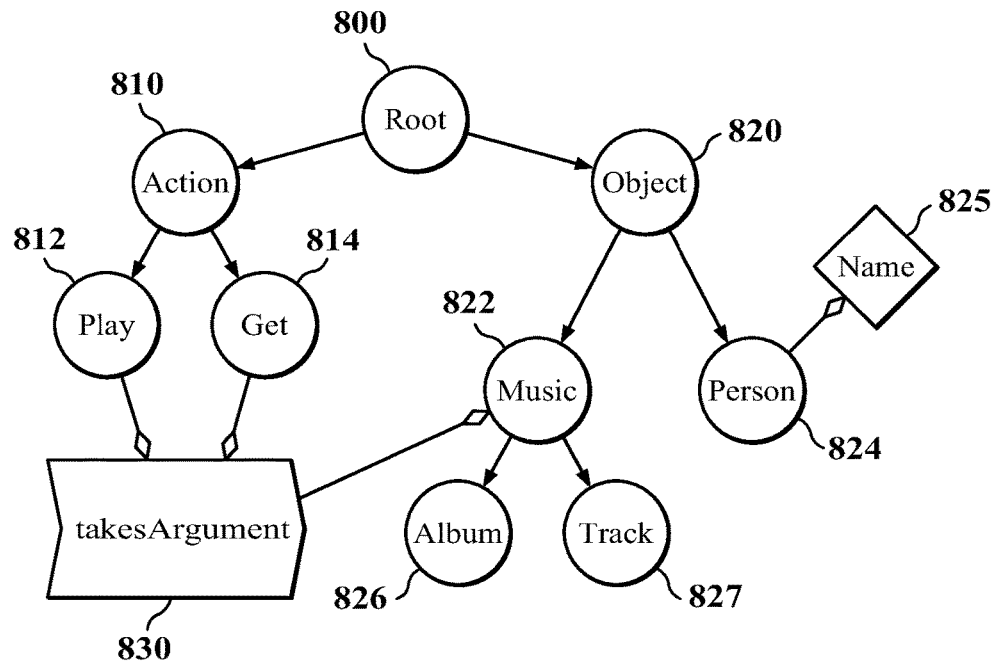
FIG. 8A illustrates an example sub-domain selection.

FIG. 8A illustrates an example sub-domain selection. As an example and not by way of limitation, the sub-domain selection may be for supporting playing music by performer. As FIG. 8A illustrates, there may be a node of "root" 800, which may connect to "action" 810 and "object" 820. One may select the sub-graph that includes the action "play" 812, the object "music" 822 and its sub-types, and the object "person" 824. "person" 824 may be associated with "name" 825. One may exclude the action "get" 814 from the sub-graph. Both "play" 812 and "get" 814 may be associated with "takesArgument" 830 attribute, which may be further linked to "music" 822. The sub-types of "music" 822 may comprise "album" 826 and "track" 827. In addition, there is not a way to link "music" 812 to "person" 822 and all the necessary sub-types of "music" 812, e.g., "playlist" may be missing, as indicated in FIG. 8A.

Figure 8B:
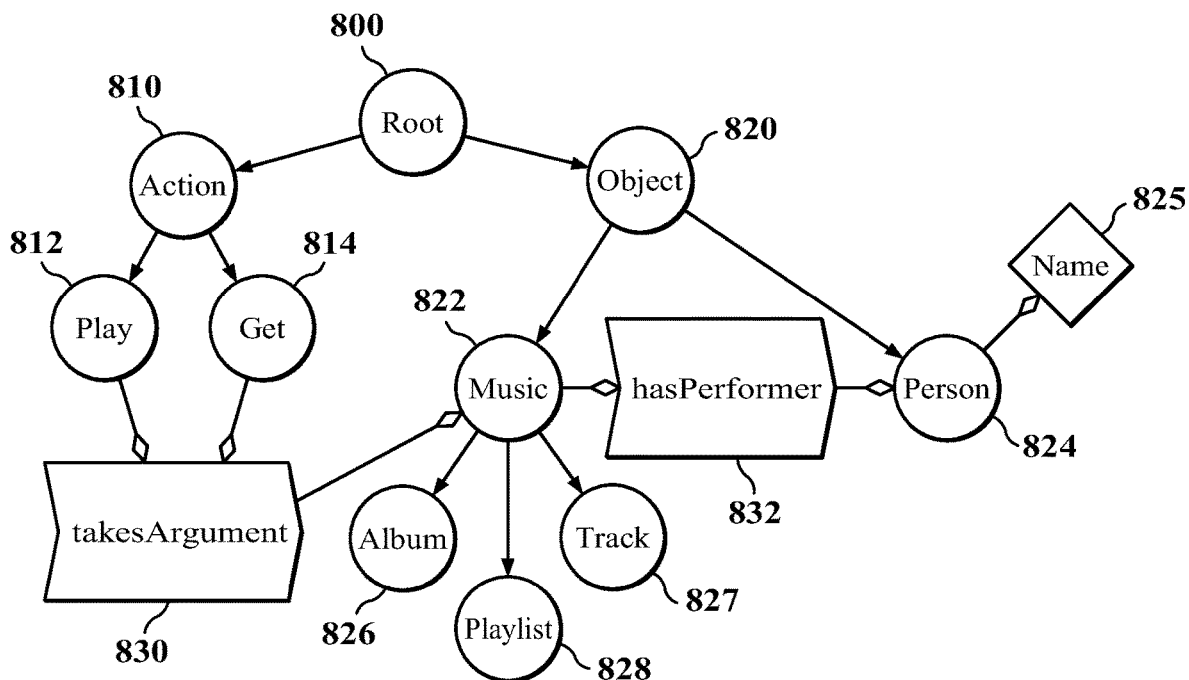
FIG. 8B illustrates an example continuation of sub-domain selection.

FIG. 8B illustrates an example continuation of sub-domain selection. One may add "playlist" 828 as a sub-type of "music" 822 and then connect "music" 822 to "person" 824 via the "hasPerformer" 832 attribute. The "hasPerformer" 832 attribute may be inherited by all sub-types of "music" 822. To this end, the constructed subgraph in FIG. 8B may support playing music by performer, e.g., "play Beyonce", "play a song by Beyonce", "play my Beyonce playlist", and "play a Beyonce album". Although this disclosure describes particular sub-domain selections in a particular manner, this disclosure contemplates any suitable sub-domain selection in any suitable manner.

Figure 9:
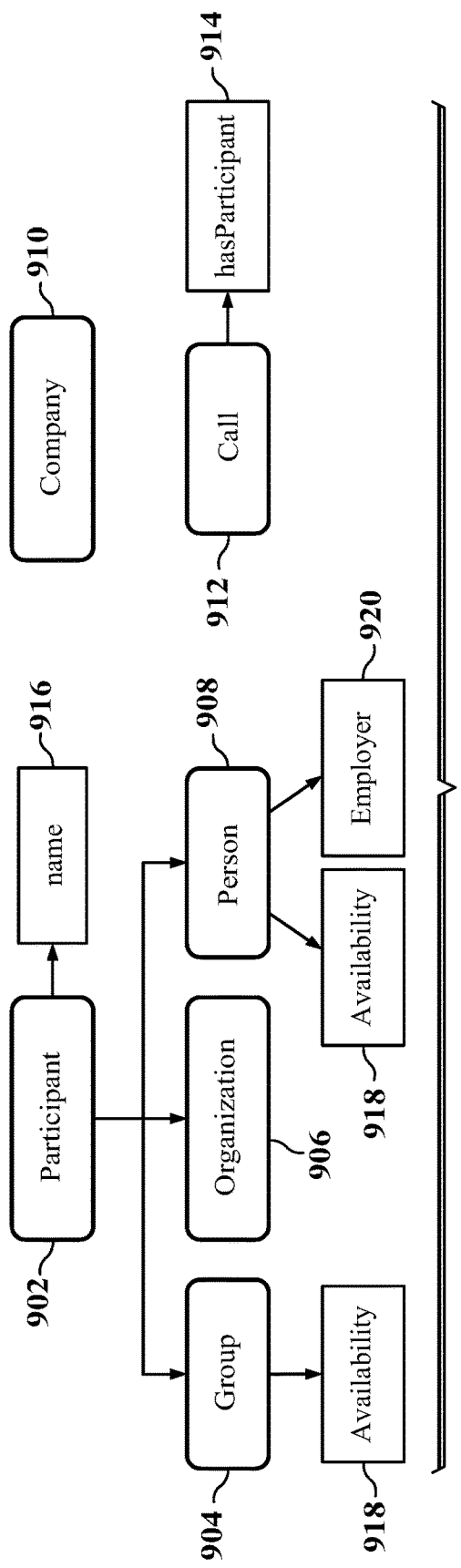
FIG. 9 illustrates an example inheritance in NGO.

FIG. 9 illustrates an example inheritance in NGO. In particular embodiments, NGO objects may allow for single inheritance and trait-based implementation. Object inheritance may be used as the main medium through which label reuse happens. In particular embodiments, NGO may use the same semantics of object inheritance as most traditional object-oriented programming languages. That is to say, parent attributes and methods may be carried over to child objects and redefining existing attributes and methods may be disallowed. Furthermore, NGO may enforce strict single inheritance to further promote scalability. In particular embodiments, objects may be initiated optionally with named arguments. As an example and not by way of limitation, initiating a person object with a name John based on NGO may look like [person name=[John]]. As illustrated in FIG. 9, there may be a few objects comprising "participant" 902, "group" 904, "organization" 906, "person" 908, "company" 910, and "call" 912. The "call" 912 object may have a single named argument, "hasParticipant" 914, which is of "type" person, e.g., (fb/call hasParticipant=[fb/person name=[Morgan]]). The "person" 908 object type may inherit the "name" 916 attribute from "participant" 902, and the type contract needed for participant may be fulfilled by the inheritance chain from "person" 908 to "participant" 902. "group" 904 and "organization" 906 may similarly inherit the "name" 916 attribute from "participant" 902. "group" 904 and "person" 908 may have a typed attribute "availability" 918. "person" 908 may additionally have a typed attribute "employer" 920 which may be associated with "company" 910. Within this example ontology, the assistant system 140 may reject the following parse: (fb/call hasParticipant=[fb/organization]). Inheritance here may behave the same way as in virtually all object-oriented programming languages, with the exception that the embodiments disclosed herein may only allow single inheritance. All attributes in an object may be initialized (e.g. "name" 916). Inversely all attributes may be looked up from an object. As an example and not by way of limitation, "get Liz's availability" may be defined as (fb/get [fb/person name=[Liz]]. Availability). Although this disclosure describes particular inheritance in a particular manner, this disclosure contemplates any suitable inheritance in any suitable manner.

In particular embodiments, single inheritance may carry a limitation in the formation of union types. To alleviate this pressure, NGO may use traits. A trait may be a named abstract type that may only define method signatures. Objects may implement any number of traits providing a lack of conflict. As an example and not by way of limitation, NGO may have a "creatable" trait, that both reminder and timer may implement. Therefore, they may both be used as arguments in an "create" action, whose type signature uses the "creatable" trait. NGO may employ traits as a mechanism to formally express to the type-checker which entity types are acceptable as arguments to others. Traits may allow for static checking of semantic parses where multiple types are licit while avoiding the pitfalls of multiple inheritance. Traits may be seen as a way to group entities that don't belong in the same inheritance chain for type-checking. Although this disclosure describes particular traits in a particular manner, this disclosure contemplates any suitable trait in any suitable manner.

In particular embodiments, user requests may involve acting on an object, which may be parsed by embedding an object within an action. They take the following general form, always starting with a (', e.g., (fb/<action_name>[fb/<object_name>]). Actions may only embed objects that satisfy argument constraints. As an example and not by way of limitation, the "create" action's first argument may only operate on objects that are "creatable" (e.g., call, video_call, reminder, etc.). Examples may include (fb/create [fb/reminder]), (fb/play [fb/music]), (fb/end [fb/call]).

In particular embodiments, user requests may involve acting on an object's attribute. These requests may be parsed by embedding an object within an action and declaring an attribute of the embedded object to be acted upon. To get a specific attribute from an object, NGO may use standard dot-notation from programming languages. As an example and not by way of limitation, if one wants to see if John is available, in NGO this may map to the following: (person name=[John]].availability). In particular embodiments, a semantic representation may then take the following form: (fb/<action_name>[fb/<object_name>].<attributeName>). Examples may include (fb/create [fb/reminder].startTime), (fb/get [fb/music].hasPerformer), (fb/add [fb/call].hasRecipient). In particular embodiments, the labeling system may permit attribute chaining, i.e., it is possible to act on the attribute of an attribute of an object. This may be represented as (fb/<action_name>[fb/<object_name>].<attributeName>.<attributeName>). Note that the return type of actions may be also statically defined. It may be also possible to define statically generics over functions illustrated by the following example:

>Signature~fb/create<T>(T t)→T;
>Invocation~(fb/create [fb/call hasParticipant=[fb/person name=[Morgan]]])
>Invocation Type~fb/call In particular embodiments, all attributes may be typed. There may be three possible families of types: 1) attributes may point from one object to another; 2) attributes may point from one object to a primitive data type, such as string or datetime; and 3) attributes may have a restricted set of enumerated possible values. Which family a given attribute belongs to may further affect its form in object specification (a.k.a. entity restriction) cases introduced below. If an attribute points to another node, the type of that node may be made explicit. The attribute name may be followed by an equal sign and then the type declaration, i.e., (fb/<action_name>[fb/<object_name><attributeName>=[fb/<object>]]). Note that actions may be nested like this: (fb/<action_name>[fb/<object_name><attributeName>=(fb/<action>)]). If an attribute points to a core data property/type (i.e., string) the type may be not made explicit. The attribute name may be followed by an equal sign but no type declaration, i.e., (fb/<action_name>[fb/<object_name><attributeName>=[ ]]). If the attribute is valued by an enum, the specific value in the enum may be declared inside the type declaration: (fb/<action_name>[fb/<object_name><attributeName>=[::enum_value]]). This may not mean that type is not there or dynamic but purely syntactic sugar over the representation. Although this disclosure describes particular attribute types in a particular manner, this disclosure contemplates any suitable attribute type in any suitable manner.

In particular embodiments, list objects may be represented by using angle bracket < >. Lists may be useful when representing semantics over collections. As an example and not by way of limitation, the utterance "call John and Erika" may be mapped to (create [call hasParticipant=<[person name=[John]],[person name=[Erika]]>]). Attributes may have more than one value. This may be captured by list notation. It may be assumed that all attributes that do not point to enum values are lists, frequently with only one member. As an example and not by way of limitation, the utterance "start a video call with granddaughter and uncles" may be mapped to (fb/create [fb/video_call hasParticipant= [fb/person granddaughterOf=[fb/user]], [fb/person uncleOf=[fb/user]]>]). Note that semantics across lists may be still verified, therefore placing a "company" object within this list may result in a semantically incorrect parse. Lists may be declared by the following syntax:

(fb/<action_name> [fb/<object_name> <attributeName>=<[fb/<object> ... ] , [fb/<object> ... ]>])
(fb/<action_name> [fb/<object_name> <attributeName>=<[ ... ] , [ ... ]>])

As with non-lists attributes, the attribute name may be followed by an equal sign '='. The list may be then introduced by an opening angled bracket '<' and closed with a closing angled bracket '>'. Within the list each member may be typed, either as an object or primitive data type, and members may be separated from one another by commas ','. Although this disclosure describes particular lists in a particular manner, this disclosure contemplates any suitable list in any suitable manner.

In particular embodiments, methods may be similar to actions but may be tied to a specific object. As an example and not by way of limitation, in NGO all attributes may have setters which are methods with the same name as the attribute. For the utterance "make me unavailable," the NGO parse may be [user].availability([::unavailable(unavailable)]). As another example and not by way of limitation, the canonical examples may be the add/remove methods of list types. For example, the utterance "can you take my grandmother Lisa off the call?" may be mapped to [fb/call] .hasParticipant.remove ([fb/person grandmotherOf=[fb/user] name=[Lisa]]). Here the "remove" method may be invoked with an argument of the person one wants to remove from the call, acting upon the "hasParticipant" object.

Figure 10:
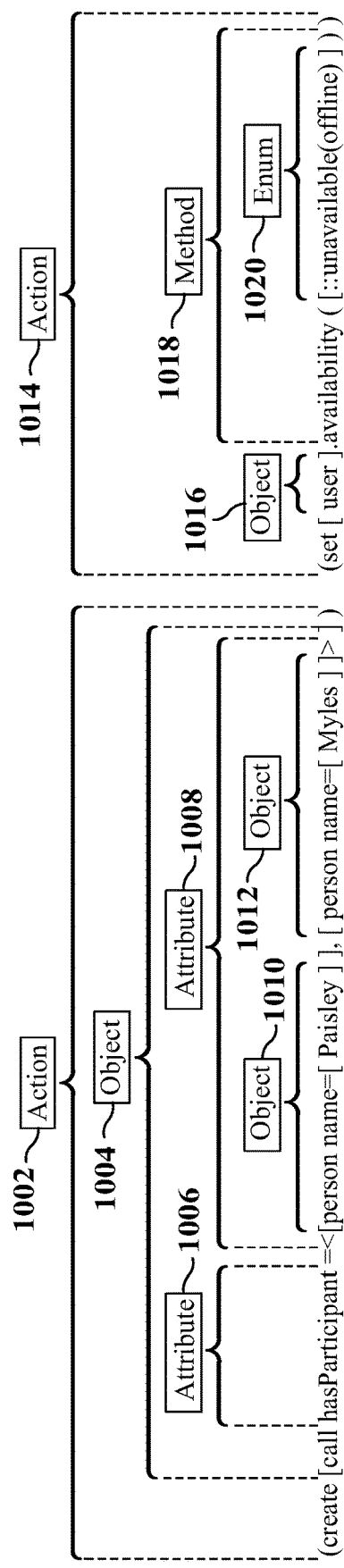
FIG. 10 illustrates an example semantic parses with composition.

In particular embodiments, NGO may allow for any level of nesting as long as the type signature of all individual components is met. FIG. 10 illustrates an example semantic parses with composition. The compositional breakdown of the syntactic representation of NGO may be for the queries:

please call Paisley and Myles (corresponding to the left part of FIG. 10) and make me offline (corresponding to the right part of FIG. 10). As illustrated in FIG. 10, for the query please call Paisley and Myles, the syntactic representation may be (create [call hasParticipant=<[person name=[Paisley]], [person name=[Myles]]>]). "create" may be the action 1002 and the "[ ]" after "create" may be the created "call" object 1004. The "call" object 1004 may comprise an "hasParticipant" attribute 1006. The "hasParticipant" attribute 1006 may be defined by the attribute 1008 of "<[person name=[Paisley]], [person name=[Myles]]>". The attribute 1008 may comprise an object 1010 of "[person name=[Paisley]]" and an object 1012 of [person name=[Myles]]". For the query make me offline, the syntactic representation may be (set [user].availability ([::unavailable(offline)])). "set" may be the action 1014 acting upon a "user" object 1016. The action 1014 may further comprise a method ".availability" 1018 embedding an enum 1020 that lists a number of unavailable time. Although this disclosure describes particular semantic parses in a particular manner, this disclosure contemplates any suitable semantic parse in any suitable manner.

In particular embodiments, enums may represent 1 out of n variants. As an example and not by way of limitation, there may be only a fixed amount of phone types that may be supported (cell/mobile/home, etc.). An utterance "call my mom on the cell" may be mapped to (fb/create [fb/call hasParticipant=[fb/person motherOf=[fb/user]] numberCalled=[fb/phone_number phoneType=[::cell_phone ("cell")]]]). Here the "phoneType" may be tagged as being a "cell_phone" type that is invoked by the "cell" token in the utterance. In particular embodiments, the availability attribute may be typed as an availability enum which has two variants, i.e., available and unavailable. Whenever the assistant system 140 instantiates an enum object in NGO, the assistant system 140 may also tag the original string used to resolve the variant. The purpose of maintaining the original string may be to allow further resolving or backtracking of the variants in downstream modules of the assistant system 140.

In particular embodiments, NGO may have certain properties comprising object specification via attributes and type-shifting (e.g., in compositional scenarios). In addition to returning values, attributes may also be used to restrict entities. In particular embodiments, NGO may limit the kinds of objects that an action can be performed on or the kinds of actions that can be done on an object. Restrictive attributes may appear inside of the brackets or parentheses that introduce the entity to be restricted. Attributes may also restrict an object. In this case they may appear within the square brackets of the object, e.g., (fb/<action_name>[fb/<object_name><attributeName>=<attributeInitialization>]). In this case, an action may operate on an object and that object may be restricted by some attribute. Licit attributes may be declared in the ontology. In the above case the attribute may be an attribute of the embedding object. Attributes may also restrict the action. In this case they may be nested inside of the parentheses that introduce the action. Named attributes may always follow positional attributes, e.g., (fb/<action_name>[fb/<object_name>] <attributeName>=<attributeInitialization>). Again, licit attributes may be declared in the ontology. In the above case the attribute may be an attribute of the embedding action. Finally, attributes may restrict attribute types. In these cases, the attribute restriction may be introduced as follows: (fb/ <action_name>[fb/<object_name>].<attributeName>([fb/ attribute_type<attributeName>])). Again, licit attributes may be declared in the ontology. In the above case the restricting attribute may be an attribute of the attribute type. Note that the above examples may be incomplete. They may only indicate where attributes may be placed. In order to fully realize the form of an attribute label, typing may be also required. Although this disclosure describes restricting particular entities by particular attributes in a particular manner, this disclosure contemplates restricting any suitable entity by any suitable attribute in any suitable manner.

In particular embodiments, type-shifting may represent a complex instance of attribute restriction. In some cases, the value of one attribute may be determined by identifying the value of another object's attribute. Consider the utterance "get directions to the game." This may be understood as a request to return directions whose destination is a location, and this location is the very same location as the venue of a sporting event. This behavior may be called type-shifting. Type-shifting may be achieved by nesting an object inside of an attribute and declaring which of that object's attributes values the embedding attribute, e.g., (fb/action_name [fb/ object_name <attributeName>=[fb/object_name [fb/object_ name].<attributeName>]]). As an example and not by way of limitation, a potential annotation for "get directions to the game" may be (fb/get [fb/directions destination=[fb/location location_name=(fb/get [fb/event name="the game"]).venueLocation]]). In particular embodiments, the type of the embedding attribute and the type of the embedded attribute type may be identical for this to be licit. Type-shifting may also be combined with attribute chaining to yield labels of the following form: (fb/action_name [fb/ object_name<attributeName>=[fb/object_name [fb/object_ name].<attributeName>.<attributeName>]]). Type-shifting may be an effective solution for addressing the technical challenge of representing a complex instance of attribute restriction as type-shifting may nest an object inside of an attribute and declare which of that object's attributes values the embedding attribute, thereby representing the complex instance with a clearer structure with improved interpretability. Although this disclosure describes particular type-shifting in a particular manner, this disclosure contemplates any suitable type-shifting in any suitable manner.

In particular embodiments, the semantic representation based on NGO may be universal across the stack of the assistant system 140. The semantic representation may be executable by each module associated with the assistant xbot configured to process the user input. In particular embodiments, a value associated with each of the at least one action, the at least one object, and the at least one attribute may be determined by each module executing the semantic representation. Because every object, action, or attribute has a type, NGO may have formal and consistent contract for semantic parses throughout all the assistant stack, which may result in a technical advantage of consistent ontology and type checking. Errors that previously would need deep integration and unit-tests in the IN/SL paradigm may be replaced by a constant complexity static analysis. Automatic validation of parses during annotation and live traffic and the validation code may not need to be written for every specific use case. In particular embodiments, NGO may block annotators from creating semantically incorrect parses and provide consistent semantics to models. No domain distinctions may allow for zero-cost cross-domain scenarios. Execution may become consistent as types and type relations are already explicitly defined.

In particular embodiments, based on NGO the NLU module 210/218 may generate its output and pass it to the entity resolution module 330. As an example and not by way of limitation, the NLU output for "call my mom" may be (create [call hasParticipant=[person motherOf=[user]]]). As another example and not by way of limitation, the NLU output for "call Jerry's office" may be (create [call hasParticipant=[person name=[Jerry]] numberCalled= [phone_number contactType=[::work(office)]]]). As another example and not by way of limitation, the NLU output for "will it rain tomorrow?" may be (get [fb/forecast duration= [date_time tomorrow]].precipType). As another example and not by way of limitation, the NLU output for "ten day forecast in San Diego" may be (get [fb/forecast duration= [date_time ten day] forecastLocation=[location San Diego]]]). As another example and not by way of limitation, the NLU output for "open my photos" may be (get [photo hasCreator=[user my]]). As yet another example and not by way of limitation, the NLU output for "show me photos of Andrew and me" may be (get [photo hasPersonSubject=< [person name=[Andrew]], [user me]>]). Although this disclosure describes particular NLU outputs in a particular manner, this disclosure contemplates any suitable NLU output in any suitable manner.

In particular embodiments, the assistant system 140 may resolve, by a reasoning module 214/222 associated with the assistant xbot, one or more entities associated with the at least one object based on the at least one attribute of the semantic representation. In particular embodiments, the entity resolution module 330 of the reasoning module 214/222 may be the specific component for resolving entities. The entity resolution module 330 may not need to have any type of mapping layer to map the output from the NLU module 210/218 to a knowledge graph because it uses exactly the same type of semantic representation. As an example and not by way of limitation, an output from the NLU module 210/218 may be (play [track hasPerformer= [person name=[Beyonce]]]), in which hasPerformer points to a "person" object. This output may be the same as the knowledge graph schema for performers/artists. The "person" object may be mapped to the knowledge graph directly. As another example and not by way of limitation, an output from the NLU module 210/218 may be (fb/create [fb/call hasRecipient=[fb/person name=[Andy]]]). The entity resolution module 335 may take in fb/person name=[Andy], with a type and return PersonEntity (name=Andy, ID=123, gender=male). As yet another example and not by way of limitation, an output from the NLU module 210/218 may be (fb/create [fb/call hasRecipient=[fb/person motherOf=[fb/ user]]]). The entity resolution module 335 may take [fb/ person motherOf=[fb/user]] and resolve leaf object "fb/ user". The entity resolution module 335 may also output the text "my" for homophone matches. "motherOf" may be resolved to concept entity to get the Spanish relation names, i.e., madre. "motherOf+fb/user+fb/person" may need to be mapped to an agent with a function to get contact information. In particular embodiments, the entity resolution module 330 may revise the NLU output if needed. Because semantic role and type information are carried in annotation, the work of entity resolution module 335 may begin in the NLU module 210/218. Types and Attributes may be consistent across modality, for which multi-modal input may be represented in the same ontology. As an example and not by way of limitation, the X-Ray concept for "person" and the NLU concept for "person" may be the same. NGO may deliver uniform behavior whether type information is gathered via voice or vision and support multi-modal co-reference. As a result, NGO may have a technical advantage of shared semantic space as NGO may directly connect the concepts and their lexicalizations to annotations without a need for a mapping between the two. Although this disclosure describes particular entity resolution in a particular manner, this disclosure contemplates any suitable entity resolution in any suitable manner.

In particular embodiments, the output from the entity resolution module 330 generated based on NGO may be then passed to the dialog manager 335. The dialog manager 335 may consult dialog policies 345 and form a task. The task may be triggered by a combination of NGO action, object and optionally attribute and method. In particular embodiments, NGO may have a number of human-readable surface forms. A text form may be primarily used for annotation whereas a graphical form may represent an execution graph over the parse. The two forms may be semantically equivalent, which is guaranteed by the NGO parser. For the purposes of implementation, a tree-like form, equivalent to the graphical form, may be provided as input to the dialog manager 335. The tree-like form may promote the actionable parts of the parse, e.g., "create action+object" or "action+method", towards the top of the graph (the tree trunk), and consistently have the arguments to the creation action or methods as trailing branches. Although this disclosure describes particular NGO forms in a particular manner, this disclosure contemplates any suitable NGO form in any suitable manner.

Figure 11A:
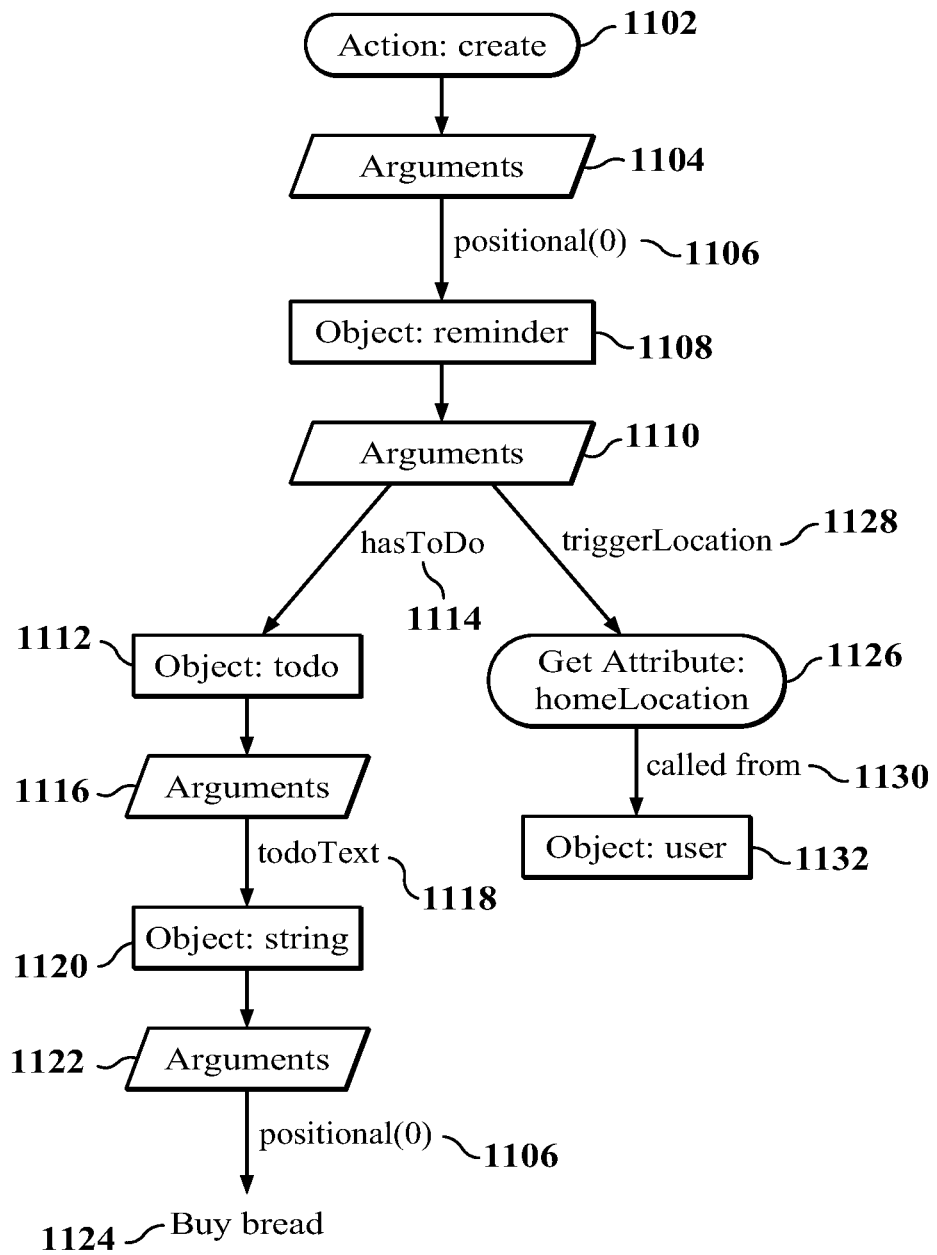
FIG. 11A illustrates an example tree-like NGO form for an example dialog.
Figure 11B:
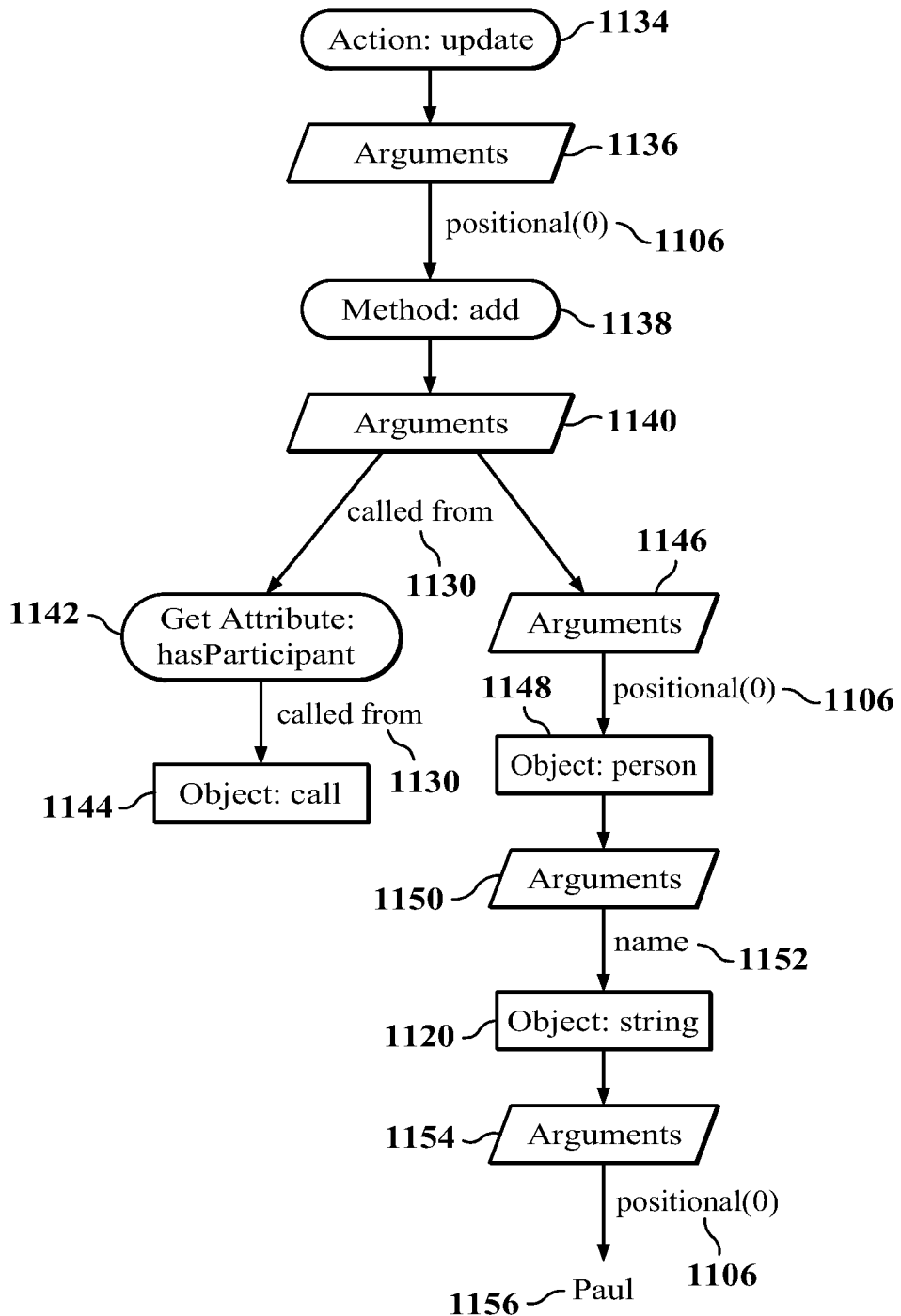
FIG. 11B illustrates another example tree-like NGO form for another example dialog.

FIGS. 11A-11B illustrate example tree-like NGO forms for example dialogs. FIG. 11A illustrates an example tree-like NGO form for an example dialog. The example dialog may be "remind me to buy bread when I get home." For the dialog, the text form of NGO representation may be (fb/ create [fb/reminder hasTodo=[fb/todo todoText=[buy bread]] triggerLocation=[fb/user].homeLocation]). The NGO representation may start with "action: create" 1102, which has arguments 1104 of "positional (0)" 1106. The created "object: reminder" 1108 may have arguments 1110. The arguments 1110 may be linked to "object: todo" 1112 by "hasToDo" 1114. "object: todo" 1112 may have arguments 1116 of "todoNext" 1118, which may be linked to "object: string" 1120. "object: string" 1120 may have arguments 1122 of "positional(0)" 1106, which may be linked to "buy bread" 1124. The arguments 1110 may be also linked to "get attribute: homeLocation" 1126 by "triggerLocation" 1128. "triggerLocation" 1128 may have an attribute "called from" 1130, which may be linked to "object: user" 1132.

FIG. 11B illustrates another example tree-like NGO form for another example dialog. The example dialog may be "add Paul to the call." For the dialog the text form of NGO representation may be (fb/update [fb/call].hasParticipant.add([fb/person name=[Paul]])). The NGO representation may start with "action: update" 1134, which has arguments 1136 of "positional (0)" 1106. The updated "method: add" 1138 may have arguments 1140. The arguments 1140 may be linked to "get attribute: hasParticipant" 1142 by "called from" 1130. "get attribute: hasParticipant" 1142 may be linked to "object:call" 1144 by "called from" 1130. The arguments 1140 may embed additional arguments 1146 of "positional (0)" 1106, which may be linked to "object: person" 1148. "object: person" 1148 may have arguments 1150 of "name" 1152, which may be linked to "object: string" 1120. "object: string" 1120 may be have arguments 1154 of "positional (0)" 1106, which may be linked to "Paul" 1156.

In particular embodiments, the dialog manager 335 may track the task state, where the task state is a subset of the information tracked in the dialog state. Task state may be different from the NUJ data structures but may be derived from the NUJ module 210/218. Dialog state tracking may operate using an NGO-like graph structure as part of the dialog state. Such a structure may be decorated with additional information such as entities, confidence scores and flags indicating status of actions, objects, argument values and entities. In particular embodiments, state tracking may track independent marginals over each of actions, objects and arguments. These may be then combined using NGO to rule out invalid combinations. The choice of exactly how to implement the internal dialog state may be a tradeoff between features, engineering cost, ease of domain developer standup, agent and task requirements, etc. Dialog manager 335 may be at the center of handling the complexity of the parsing and managing the task state, the latter being closely tied to agent API specification. For NGO, the assistant system 140 may treat each NGO parse as an undivided hypothesis, and rank N-best NUJ hypotheses given the device context, user preferences, etc. The provision of a "placeholder" variable may provide a mechanism for extending the range of alternative hypotheses that may be considered in such a setting. Placeholders may also allow for NUJ output to express implied missing values, e.g., "add to the call" may result in (fb/update [fb/call].hasParticipant.add( )) which captures sufficient signal that the user wants to "add" to the call even though they didn't say who. Although this disclosure describes tracking particular task states in a particular manner, this disclosure contemplates tracking any suitable task state in any suitable manner.

In particular embodiments, the dialog manager 335 may encode meta follow-up turns in a way that results in a syntax that expresses an update to a previously created object. Assuming that the NGO-based structures are stored in the dialog state, then these NGO parses may be translated directly into operators. As an example and not by way of limitation, "add Samay" may be translated into (fb/update [fb/prev_obj].personAttribute.add([fb/person name=[Samay]])). As another example and not by way of limitation, "buy a movie ticket" may be translated into (fb/update [fb/prev_obj].todo.add([buy a movie ticket])). As another example and not by way of limitation, "here" may be translated into (fb/update [fb/prev_obj].locationAttribute.add[fb/location here])). As an example and not by way of limitation, "remove Trenton and add Kamryn" may be translated into (fb/update [fb/prev_obj].personAttribute.remove([fb/person name=[Trenton].add([fb/person name=[Kamryn]])). As yet another example and not by way of limitation "first one" may be translated into (fb/get [fb/prev_obj ordinal=[first]]D. Although this disclosure describes encoding particular follow-up turns in a particular manner, this disclosure contemplates encoding any suitable follow-up turn in any suitable manner.

Figure 12:
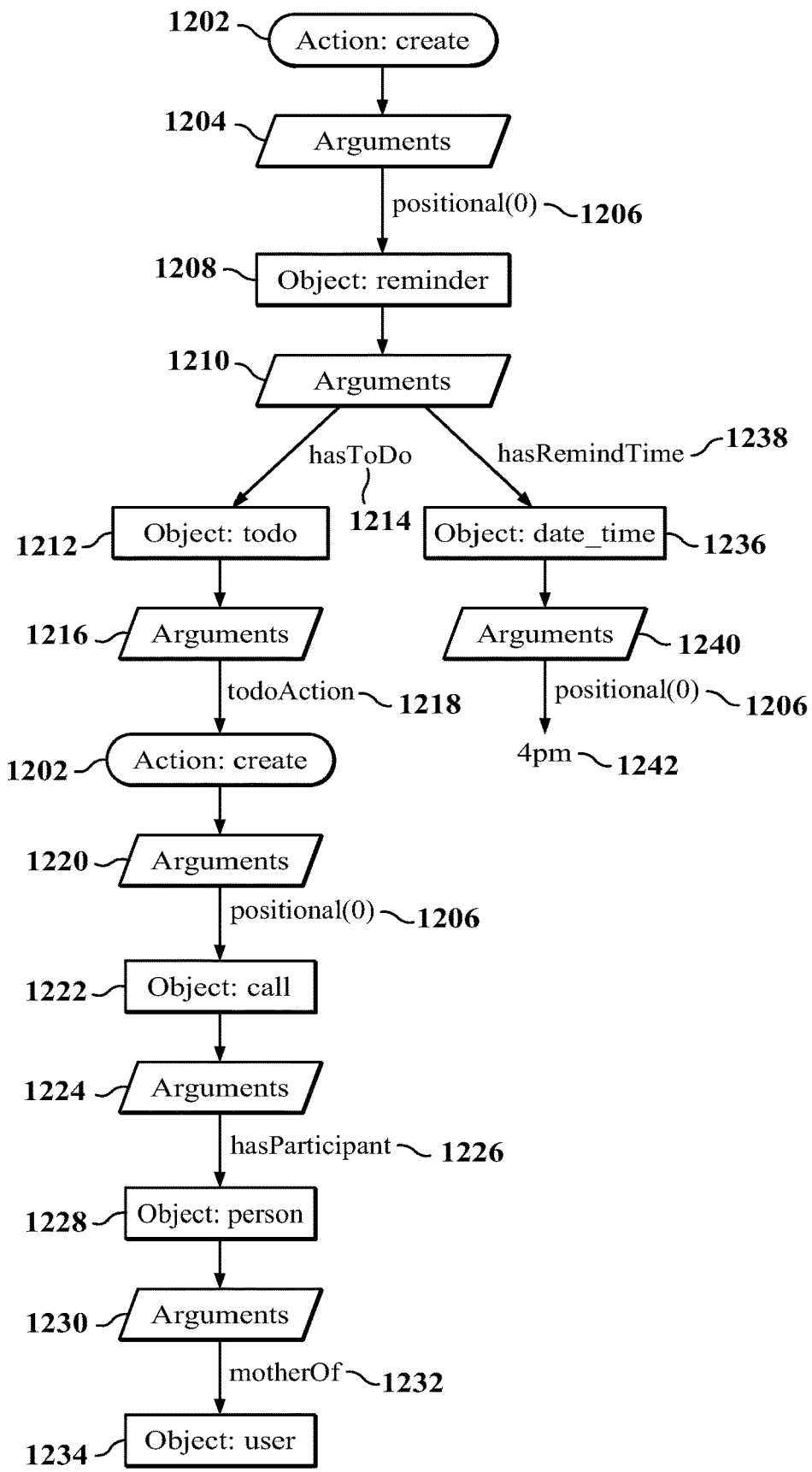
FIG. 12 illustrates an example NGO parse based on a plan-tree.

In particular embodiments, the dialog policies 345 may be divided between two levels, i.e., general policy 346 and task policies 347. For task policies 347, plan-trees used to define each task may be retrieved based on the combination of NGO action, object, attribute and method. Then assuming the dialog state comprises NGO-like graph structures, plan trees may then use predicates to test for missing arguments, and check status flags such as "confirmed" against objects, actions and arguments, etc. In particular embodiments, the assistant system 140 may pass all top-level arguments associated with a user request to the entity resolution module 330 and have it process the embedded actions. In alternative embodiments, the assistant system 140 may have the action selector 345 or the dialog manager 335 traverse the NGO parse tree processing leaf actions first until it reaches the top action. FIG. 12 illustrates an example NGO parse based on a plan-tree. The NGO representation may start with "action: create" 1202, which has arguments 1204 of "positional (0)" 1206. The created "object: reminder" 1208 may have arguments 1210. The arguments 1210 may be linked to "object: todo" 1212 by "hasToDo" 1214. "object: todo" 1212 may have arguments 1216 of "todoAction" 1218, which may be linked to "action: create" 1202. "action: create" 1202 may have arguments 1220 of "positional(0)" 1206, which may be linked to "object: call" 1222. "object: call" 1222 may further comprise arguments 1224 of "hasParticipant" 1226, which may be linked to "object: person" 1228. "object: person" 1228 may have arguments 1230 of "motherOf" 1232, which may be linked to "object: user" 1234. The arguments 1210 may be also linked to "object: date_time" 1236 by "hasRemindTime" 1238. "object: date_time" 1236 may have arguments 1240 of "positional (0)" 1206, which may be linked to "4 pm" 1242. Although this disclosure describes particular NGO parses in a particular manner, this disclosure contemplates any suitable NGO parse in any suitable manner.

Figure 13A:
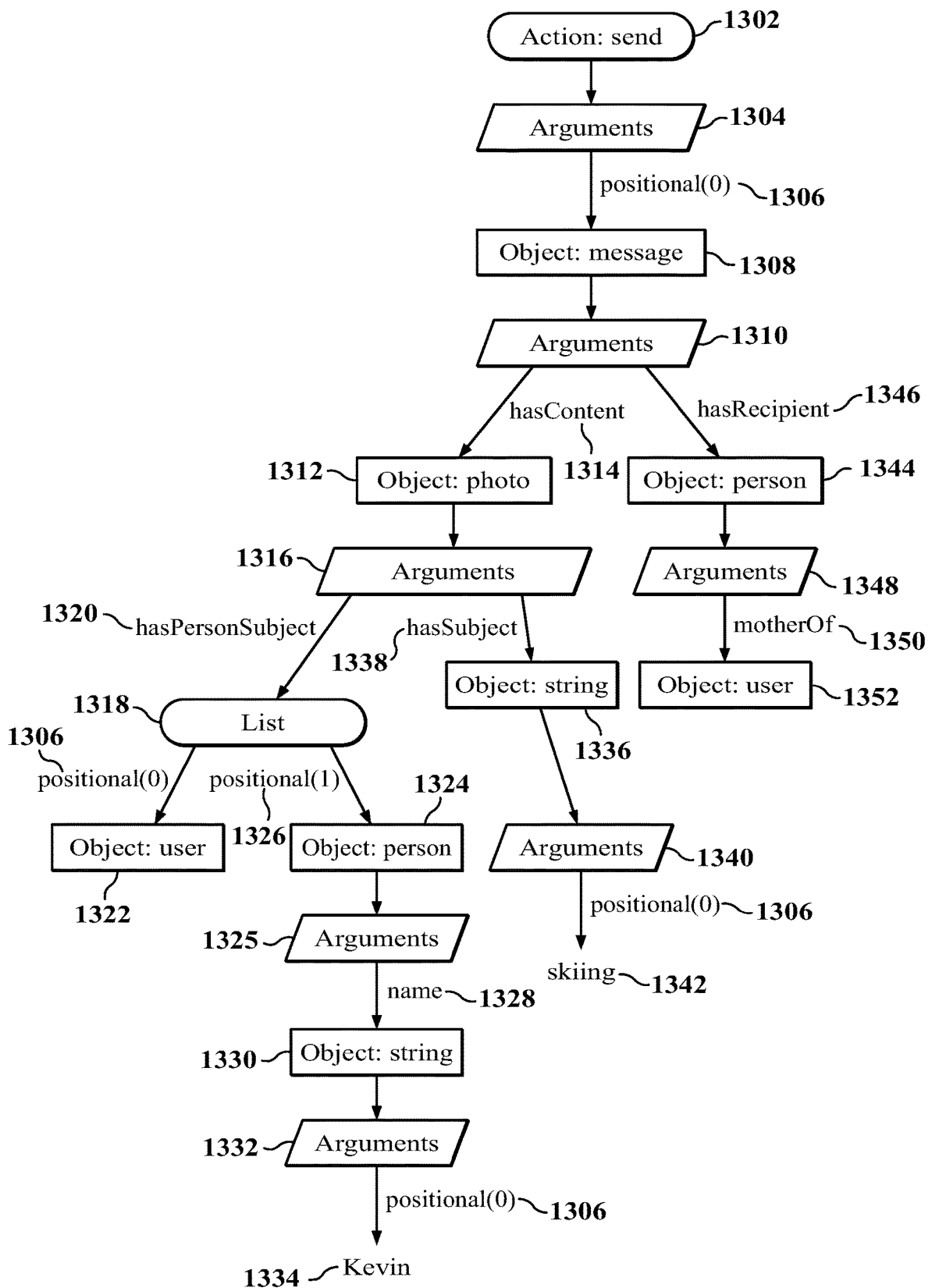
FIG. 13A illustrates an example execution graph for an utterance.

In particular embodiments, the assistant system 140 may use execution graphs as one approach for developing more complex dialog plans that automatically piece together small tasks into larger tasks. NGO parses may generate execution graphs based on user utterances. The benefit of such an approach may be the ability to handle the long-tail of multi-action requests by being able to piece together large tasks out of smaller ones. FIG. 13A illustrates an example execution graph for an utterance. As an example and not by way of limitation, the utterance may be "share the pictures of me and Kevin skiing with my Mom," which may be represented as (fb/send [fb/message hasContent=[fb/photo hasPersonSubject=<[fb/user], [fb/person name=[Kevin]]> hasSubject=[skiing]] hasRecipient=[fb/person motherOf= [fb/user]]]). The execution graph may comprise "action: send" 1302, which has arguments 1304 of "positional (0)" 1306. The acted upon "object: message" 1308 may have arguments 1310. The arguments 1310 may be linked to "object: photo" 1312 by "hasContent" 1314. "object: photo" 1312 may have arguments 1316. The arguments 1316 may be linked to "list" 1318 by "hasPersonSubject" 1320. "list" 1318 may be linked to "object: user" 1322 via "positional (0)" 1306 and "object: person" 1324 via "positional (1)" 1326, respectively. "object: person" 1324 may have arguments 1325 of "name" 1328, which may be linked to "object: string" 1330. "object: string" 1330 may further comprise arguments 1332 of "positional (0)" 1306, which may be linked to "Kevin" 1334. The arguments 1316 may be also linked to "object: string" 1336 by "hasSubject" 1338. "object: string" 1336 may have arguments 1340 of "positional (0)" 1306, which may be linked to "skiing" 1342. The arguments 1310 may be additionally linked to "object: person" 1344 by "hasRecipient" 1346. "object: person" 1344 may have arguments 1348 of "motherOf" 1350, which may be linked to "object: user" 1352.

Figure 13B:
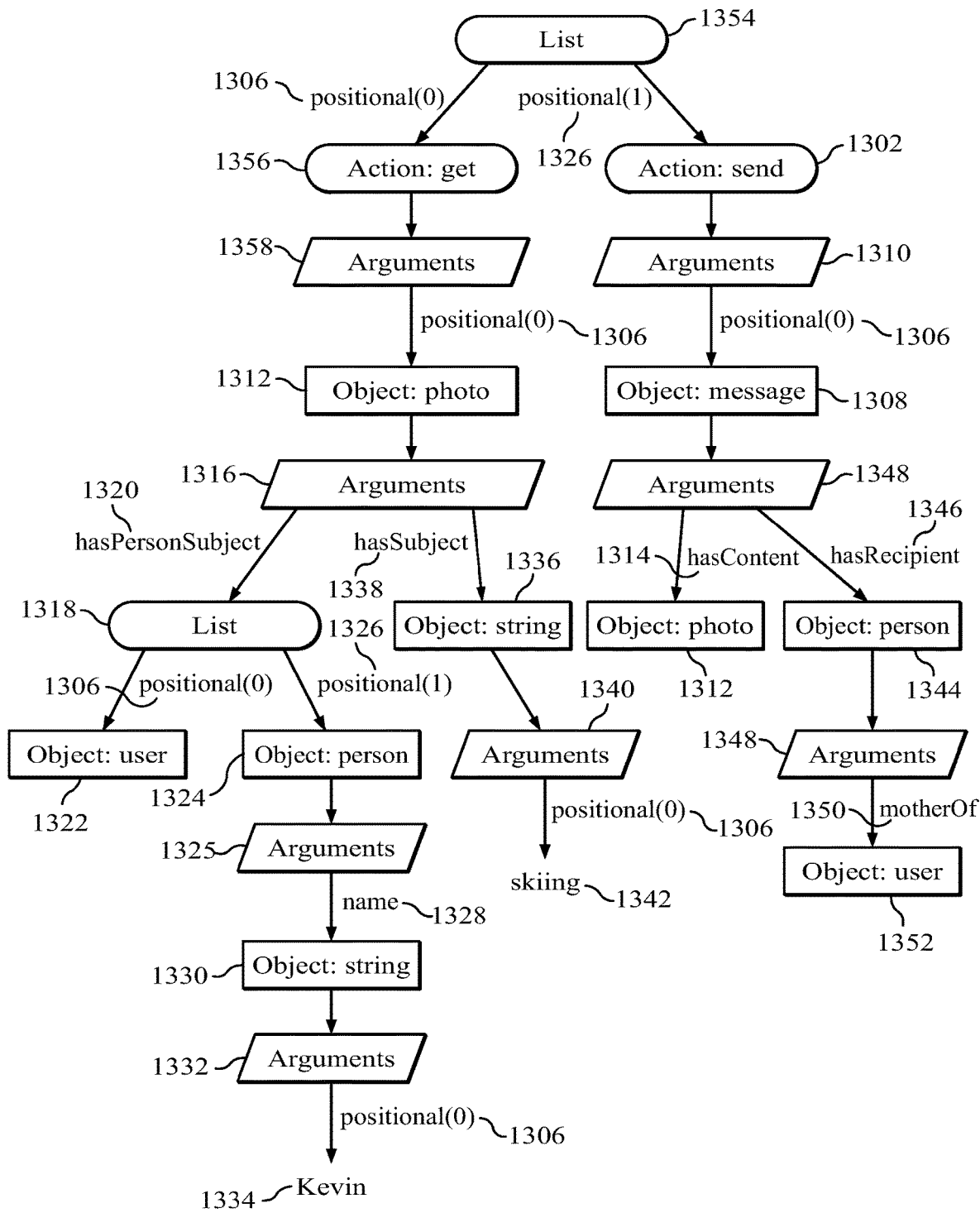
FIG. 13B illustrates an example execution graph of two sub-tasks corresponding to the utterance in FIG. HA.

FIG. 13B illustrates an example execution graph of two sub-tasks corresponding to the utterance in FIG. 13A. The representation (fb/send [fb/message hasContent=[fb/photo hasPersonSubject=<[fb/user], [fb/person name=[Kevin]]> hasSubject=[skiing]] hasRecipient=[fb/person motherOf= [fb/user]]]) may be generated based on decomposing the utterance into two sub-tasks as <(fb/get [fb/photo hasPersonSubject=fb/user], [fb/person name=[Kevin]]>hasSubject=[skiing]]) and (fb/send [fb/message hasContent= [fb/photo] hasRecipient=[fb/person motherOf=[fb/user]]])>. The two sub-tasks may be illustrated in FIG. 13B, with dialog policy sequentially executing the "get" and "send" tasks to achieve the user's desired outcome. As illustrated in FIG. 13B, "list" 1354 may be linked "action: get" 1356 via "positional (0)" 1306 and "action: send" 1302 via "positional (1)" 1326, respectively. As can be seen, the execution graph below "action: get" 1356 may be the same as the execution graph below "action: send" 1302 in FIG. 13A. The execution graph below "action: send" 1302 may be mostly the same as the execution graph below "action: send" 1302 in FIG. 13A except that there is no subsequent execution below "object: photo" 1312. Although this disclosure describes particular executing graphs in a particular manner, this disclosure contemplates any suitable executing graph in any suitable manner.

In particular embodiments, the dialog manager 335 may further select an agent for executing the task. Sending the request to the agent and receiving the execution results from the agent may be both via an application programming interface (API). The API may define a mapping from the one or more customized semantic units to the structure determined by the structural ontology. In particular embodiments, the request sent to the agent may comprise the semantic representation as modified by a dialog manager 335 associated with the assistant xbot. The execution results may comprise the semantic representation as modified by the agent and the request and the execution results may use the labeling syntax of the structural ontology. The execution result may be then sent back to the dialog manager 335, which may be responsible for mapping it back to a common semantic representation defined by NGO. In alternative embodiments, the agent may send back its results using the NGO semantic representations (which may be defined by the API used by the assistant system 140 to interface with the agent), such that the dialog manager 335 may not need to rewrite/map the output of the agent. In particular embodiments, the agent may be a first-party agent associated with the assistant xbot. In alternative embodiments, the agent may be a third-party agent associated with an external computing system and the structure of the execution results may comprise one or more customized semantic units. Although this disclosure describes interacting with particular agents in a particular manner, this disclosure contemplates interacting with any suitable agent in any suitable manner.

In particular embodiments, NGO may provide an easy way for enabling third-party agents to be supported by the assistant system 140. In particular embodiments, for each agent's API there may be agreement between the agent developer and NGO on the naming and types of input arguments in order to minimize the amount of remapping required at the dialog task level. NGO may have a core namespace for its ontology which is only visible to the modules in the assistant system 140. To enable third-party agent developers to develop agents that are compatible with the assistant system 140, sub-graphs of NGO may be made visible to them, e.g., some actions, objects, and attributes. These sub-graphs may be about generic things, i.e., not those actions, objects, and attributes from the core namespace. As an example and not by way of limitation, a sub-graph related to generic functionalities may be accessible to third-party developers, such as datetime or named entities, but the sub-graph related to sensitive content may not be shared with third-party developers, such as social-networking data. A third-party agent developer may create a custom namespace which has customized objects, actions, and attributes. The custom namespace may be viewed as an extension to NGO. As an example and not by way of limitation, a user request may be "get Bitcoin price". The core namespace may have the action "get", but "Bitcoin price" may not exist in the core namespace as an object type. From a third-party perspective, a new custom namespace may be created which has a new Bitcoin object and a function of getting the Bitcoin price. The custom namespace may have mappings to the core namespace. This way, NGO may enable the third-party agent developers to create customized semantic units and also have the ability to reuse existing semantic units from the core namespace. It may also facilitate the communication of the assistant system 140 between different agents. Although this disclosure describes particular third-party supports in a particular manner, this disclosure contemplates any suitable third-party support in any suitable manner.

Figure 14:
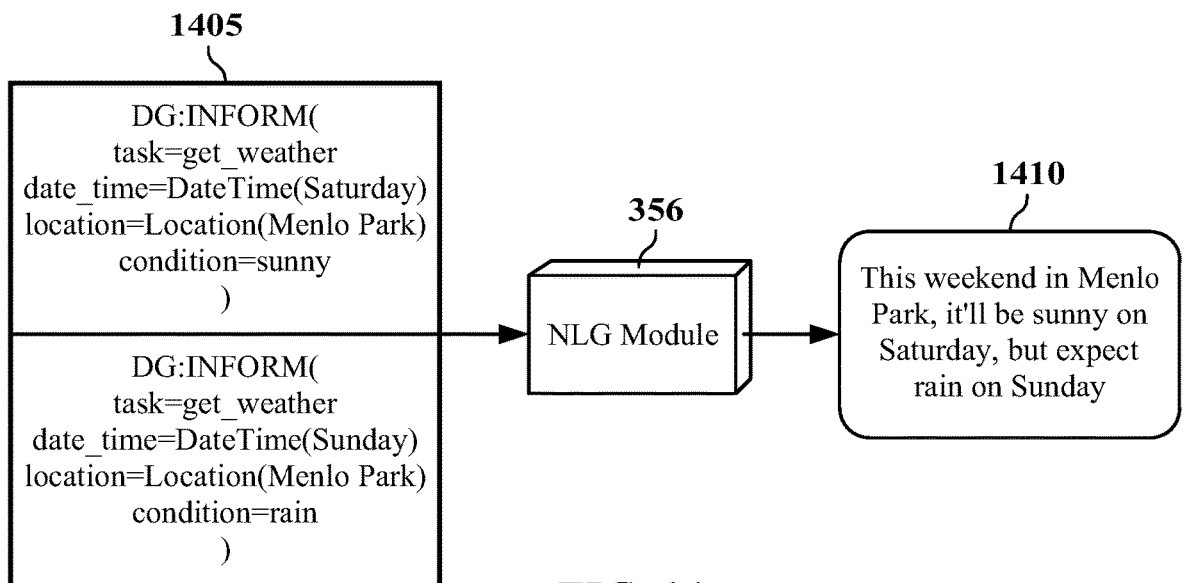
FIG. 14 illustrates an example response generation based on NGO.

In particular embodiments, the dialog manager 335 may create semantic parts for the NLG module 356 based on the output of the agent and pass them to the NLG module 356. The NLG module 356 may further generate a response for a user based on these semantic parts using the same type of NGO semantic representation. FIG. 14 illustrates an example response generation based on NGO. In particular embodiments, the assistant system 140 may generate, by a natural-language generation module 356 associated with the assistant xbot, the response based on the structural ontology and the results of the executed task. As illustrated in FIG. 14, the NLG module 356 may generate the response based on dialog acts 1405 comprising NLG tasks and argument. The dialog acts 1405 may be stored as sub-graphs in NGO-like actions. The NLG tasks may be determined by a dialog plan. The arguments may comprise the attributes in NGO such as temperature, visibility, forecast, Precipitation, etc. In particular embodiments, complex arguments may comprise objects and their attributes in NGO. In FIG. 14, the generated response 1410 may be "this weekend in Menlo Park, it'll be sunny on Saturday, but expect rain on Sunday." Although this disclosure describes generating particular responses in a particular manner, this disclosure contemplates generating any suitable response in any suitable manner.

The following are examples of semantic parts for the NLG module 356 and their corresponding responses. When the user asks "what's the weather like in Seattle?", the semantic parts may be (fb/inform [fb/location In city=[Seattle]], it's [fb/temperature 72] and [fb/cloudCover sunny]). The NLG module 356 may accordingly generate a response "in Seattle, it's 72 and sunny." As another example, when the user asks "change my availability to busy," the semantic parts may be (fb/ack Ok, availability changed to [::available(busy)]). The NLG module 356 may accordingly generate a response "OK, availability changed to busy." As another example, when the user asks "delete the message," the semantic parts may be (fb/confirm Are you sure you want to delete the message?). The NLG module 356 may accordingly generate a response "are you sure you want to delete the message?" As another example, when the user asks "remove the angry emoji," the semantic parts may be (fb/ack OK, here is your message) and (fb/prompt Ready to send it?). The NLG module 356 may accordingly generate a response "OK, here is your message. Ready to send it?" As another example, when the user asks "how's the weather in Tokyo, Montana?" the semantic parts may be (fb/error I couldn't find that [fb/bad arg location]). The NLG module 356 may accordingly generate a response "I couldn't find that location." As another example, when the user asks "send a message," the semantic parts may be (fb/request Who would you like to message?). The NLG module 356 may accordingly generate a response "who would you like to message?"

To compare the performance of NGO to IN/SL paradigm, the embodiments disclosed herein compare the representations in two scenarios: 1) given all data how does NGO compare to IN/SL paradigm, and 2) given various data set splits, representing the low resource case, how does NGO compare to IN/SL paradigm. The embodiments disclosed herein may compare across NGO directly against the IN/SL representation controlling for the natural language utterances used by training and testing on aligned data.

In particular embodiments, the metric used for comparison may be exact match (EM) accuracy, where one checks if the predicted parse matches exactly against the target parse consistent with prior work in semantic parsing for compositional parses. Due to the structured nature of semantic representations, the embodiments disclosed herein also compute parse validity across each model and representations which is how often the predicted sequences are valid structures both syntactically and semantically with respect to a predefined ontology.

The embodiments disclosed herein use seq2seq based models with a pointer projection for comparison. These models leverage a pointer projection layer on top of the traditional seq2seq architecture to decide when to generate a token vs when to copy a token from the input. In particular embodiments, pointer projection is applied to a wide array of base architectures including BiLSTMs, CNNs, non-autoregressive CNNs, and BART. An equivalent number of experiments were conducted for each of the models and representations. Table 1 shows the results of comparing these models against different representation forms. Across all domains, across various model architectures, models trained to produce NGO labels consistently outperform the ones in the IN/SL paradigm. Improvements are obtained even though NGO parses encode more semantics (i.e., list types, enums) than their equivalent IN/SL parses.

TABLE 1

Results of recent seq2seq based semantic parsing models.

| Model | IN/SL | NGO |
|---|---|---|
| BiLSTM | 85.57 | 87.22 |
| CNN | 85.93 | 86.79 |
| CNN NAR | 85.67 | 86.13 |
| BART | 91.61 | 92.15 |

TABLE 2

Results for syntactic and semantic invalidity of the parses. The number in the parenthesis is the syntactic incorrectness of generated parses (shown as percent).

| Model | IN/SL | NGO |
|---|---|---|
| BiLSTM | 0.36 (0.20) | 0.16 (0.16) |
| CNN | 0.43 (0.16) | 0.18 (0.16) |
| CNN NAR | 1.76 (1.76) | 1.76 (0.79) |
| BART | 0.00 (0.00) | 0.11 (0.11) |

The embodiments disclosed herein further evaluation how hard it is to generate semantic parses that are syntactically or semantically valid. To do so, the embodiments disclosed herein calculate the percent of generated semantic parses that are not valid on the test set in Table 2. Overall across various model architectures, NGO generated parses are valid, both syntactically or semantically, the same percent of time as IN/SL parses while having a significantly stricter type system.

Figure 15:
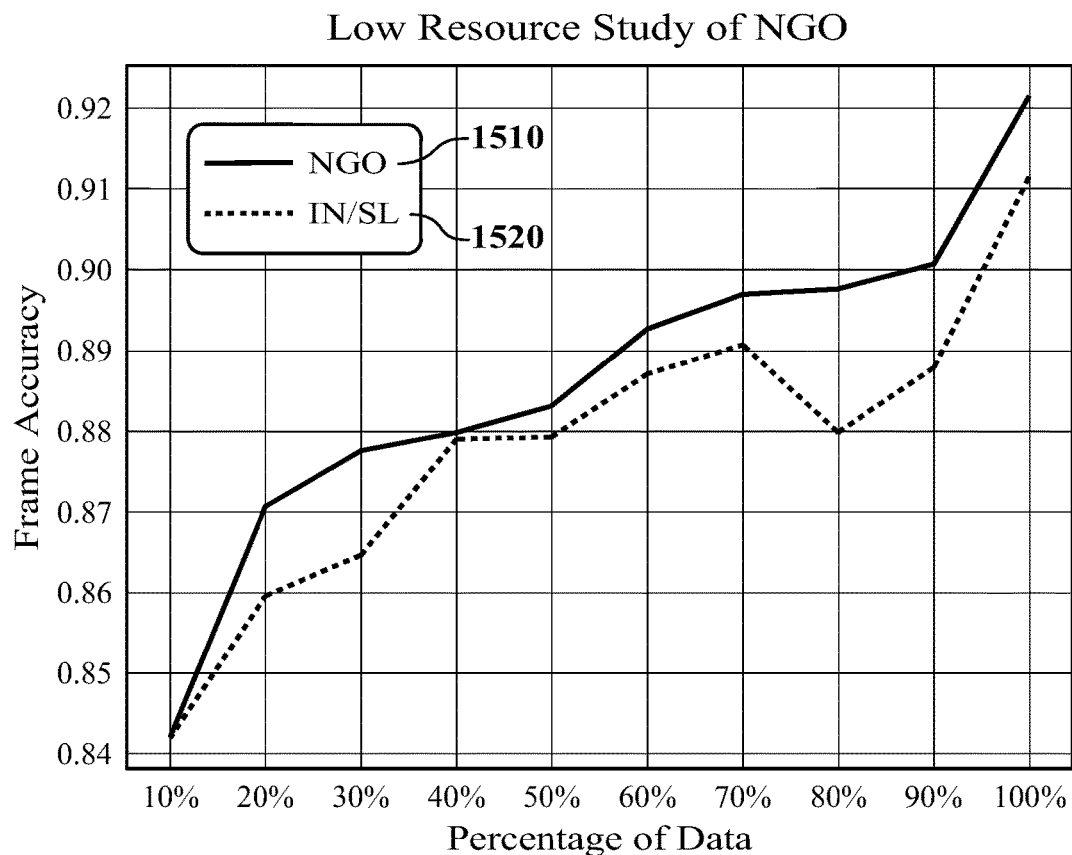
FIG. 15 illustrates example performance of a model across various percentages of the training data while keeping test set constant.

The embodiments disclosed herein evaluate how models adapt to NGO in the low-resource scenario. FIG. 15 illustrates example performance of a model across various percentages of the training data while keeping test set constant. The model is BART. NGO 1510 is strictly better than IN/SL paradigm 1520 across all sizes of training data.

Table 3 shows the performance of NGO and the IN/SL representation across various domains for the BART model. NGO has an increase in performance over the IN/SL representation in weather (+1.2%), timer (+0.64%), and music (+1.5%), while regressing the reminder domain 0.44%.

TABLE 4

Exact match accuracy of the BART model per domain for both the IN/SL labels and the NGO labels.

| Domain | Count | IN/SL | NGO |
|---|---|---|---|
| Reminder | 1367 | 88.88 | 88.44 |
| Weather | 1253 | 94.01 | 95.21 |
| Timer | 781 | 92.57 | 93.21 |
| Music | 521 | 91.55 | 93.09 |

In particular embodiments, the assistant system 140 may provide an NGO tool for developers to customize the usage of NGO such as creating a new domain, editing a domain, creating a new entity type, editing an entity type, etc. In the NGO tool, by identifying elements from the ontology or by adding elements to the ontology the labeling system may be immediately derived. A developer may construct the ontology as follows. The developer may create or update their domain in the NGO tool. The developer may also create a domain-specific sub-graph of the ontology, i.e., they may identify action and object classes and attributes of those classes for a given domain from the ontology. The developer may reuse existing classes, which may ensure semantic compatibility. However, if a class or attribute does not exist, the developer may be able to create a new class and supply the needed attributes. These classes may be kept separate from the core ontology via namespace. Licit labels may be derived directly from the sub-graph for any domain. These possibilities may be immediately generated once the classes and attributes are identified. Although this disclosure describes particular NGO tools in a particular manner, this disclosure contemplates any suitable NGO tool in any suitable manner.

The NGO parser may be used to determine if the developer's data is valid in terms of NGO syntax and domain-specific semantics. The NGO tool may automatically pre-populate all of the action, object, attribute, method combinations allowed by the sub-graph. The developer may choose to remove unneeded combinations. The developer may also indicate required attributes as well as templatic responses per NLG dialog act. The developer may create attribute-type pairs that indicate the role and type played by one object class with respect to another. These possibilities may be automatically generated by being declared in the ontology and may be immediately available to use in a new domain, once the class and attribute has been identified for re-use or created. The developer may link the attribute with the NGO type. Because the ontology is shared between the NLU module 210/218 and the knowledge graph, the work of the developer matching elements of the ontology to elements of the knowledge graph may be removed. The NGO tool may have an entity page which may be pre-populated automatically with licit role-type information. By default, it may be assumed that these roles may be licit within any type from the sub-graph, but the page may be used to manually remove some options. The developer may provide sample utterances for the domain by simply providing full annotations following NGO guidelines. Although this disclosure describes using particular NGO tools in a particular manner, this disclosure contemplates using any suitable NGO tool in any suitable manner.

Figure 16:
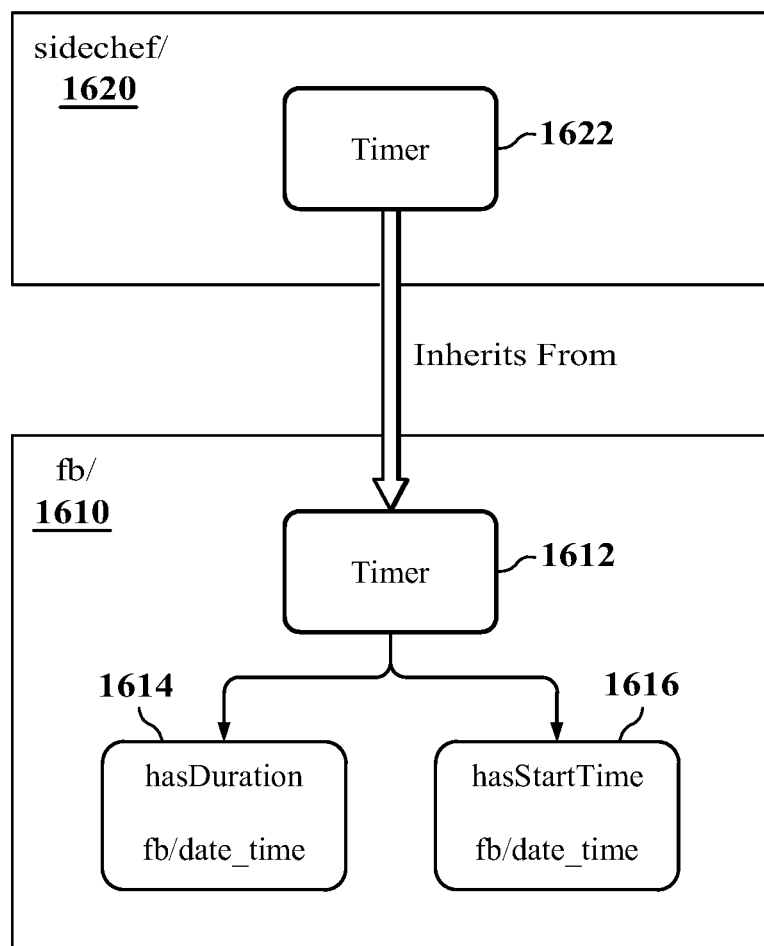
FIG. 16 illustrates an example for enabling a voice-enabled application (App) in NGO.

FIG. 16 illustrates an example for enabling a voice-enabled application (App) in NGO. In particular embodiments, the semantic units may be each associated with a default namespace defined by the computing systems. The one or more customized semantic units may be associated with a personalized namespace defined by the third-party agent. In FIG. 16, the example may be specifically for the use of a new timer, i.e., timer_app. The core ontology which lives in the core namespace 1610, e.g., fb/, may already define a timer object 1612 with two attributes, "hasDuration" 1614 and "hasStartTime" 1616. This may allow one to parse utterances such as "set a timer at 5 pm" as (fb/set [fb/timer hasStartTime=[fb/date_time 5 pm]]). For the App, a developer may create a new namespace 1620 which contains a new timer object 1622 (i.e., app/timer) which inherits from the core timer object (i.e. fb/timer). Now given the following utterance "set a timer at 5 pm with app," the assistant system 140 may annotate it with (fb/set [app/timer hasStartTime=[fb/date_time 5 pm]] based on NGO. Notice that a lot of reuse may occur due to inheritance of fb/timer.

In particular embodiments, entity resolution may depend on entity type and entity union definition. Entity union definition may be independent of the NLU module 210/218. The developer may define the entity type in the ontology using the NGO tool. As an example and not by way of limitation, to resolve NGO leaf object fb/person name= [Andy], fb/person name should have a field entity type defined, that may be assigned by the developer in the NGO tool. In particular embodiments, fb/person may be already an entity type. As a result, NGO may directly output the entity type that is integrated with the NGO tool.

In particular embodiments, the assistant system 140 may have some concept of a plan (per task) that the assistant system 140 executes. The plans may allow the assistant system 140 to project ahead to a desired outcome, know what steps need to be executed, in what order, and what information needs to be captured and resolved. In particular embodiments, there may be "task triggering" which may be thought of as plan retrieval, i.e., given the current dialog state and inputs what plan(s) should the assistant system 140 select for execution. In particular embodiments, to conceptually simplify the plan-retrieval mechanism for a developer, they may be presented with an interface in the NGO tool that captures under what conditions their task triggers. Task names for NGO may comprise independently specified task names.

In particular embodiments, for NGO the task trigger may be made explicit using a combination of action, object and optionally the presence of an attribute and/or method. In particular embodiments, the developer may need to specify a minimum of 2, and maximum of 4 pieces of information about when their task should trigger. As an example and not by way of limitation, "fb/create" and "fb/call" may be sufficient to describe the trigger for TASK:CREATE_CALL. As another example and not by way of limitation, "fb/ update", "fb/call", with attribute "callType" may be sufficient to describe the task TASK:UPDATE_METHOD_ CALL. As another example and not by way of limitation, "fb/update", "fb/timer", attribute "duration", and method "add" may be sufficient to describe the task TASK:ADD_ TIME_TIMER (e.g., "add 5 minutes to my timer"). Expected attributes and methods may take the special value of "none" which may constrain triggering to specific occasions when an object and an action are mentioned but no attribute or methods. The presence of an attribute or a method in an NGO annotation may indicate that the user's utterance addressed that attribute or method. A requirement on NGO to allow sufficiently fine-grained mapping to dialog plans may be that attributes and methods should be included in the annotation when they are implied by the user's utterance, even if no values are given. To simplify the contract or user interface (UI) of the NGO tool, the values captured by attributes or methods may be not used. Although this disclosure describes particular task triggers in a particular manner, this disclosure contemplates any suitable task trigger in any suitable manner.

In particular embodiments, the developer may be provided with two abstractions to represent general dialog plans. These two abstractions may have different expressivity and power; (i) frame-based (a.k.a. "configurator-based") abstraction—for "argument filling", (ii) dialog policy API— for tasks where explicit control of the dialogue flow is required. The two abstractions may each impose limitations on the complexity of tasks that may be described. This may simplify the information that the developer has to provide. To a certain extent this may also restrict the complexity of NGO parses that may be interpreted and acted on. For "no-code" frame-based abstraction, the NGO ontology may guide what type of input arguments the developer may add in the NGO tool. Although this disclosure describes particular abstractions of particular dialog plans in a particular manner, this disclosure contemplates any suitable abstraction of any suitable dialog plan in any suitable manner.

FIGS. 17A-17B illustrate an example UI of the NGO tool. FIG. 17A illustrates an example UI of the NGO tool with a "create" trigger action. Where the trigger action is "fb/ create", a set of named arguments that are related to the object to be created may be specified in an "Input Argument" section. Each input argument may have a type and argument name which may be automatically filled from the NGO ontology. The developer may mark whether each argument is required and provide related prompts. Note that a "fb/ create" plan trigger may imply no attribute or method reference as part of the triggering specification. As illustrated in FIG. 17A, the task may be indicated as "TASK: CREATE_CALL" 1702. The UI may also show some description 1704. The trigger section 1706 may comprise information associated with action, object, etc. The UI may additionally show an alias section 1708, an agent goal 1710, policy note 1712, and input arguments 1714.

FIG. 17B illustrates an example UI of the NGO tool with a "update" trigger action. Where the trigger action is other than "fb/create" and either attribute or method references are provided as part of the triggering action, either none or exactly one input argument may be allowed. This single argument, if specified, may take the name and type associated with the attribute mentioned in the trigger. The developer may mark whether the argument is required and provide related prompts. As illustrated in FIG. 17B, the task may be indicated as "TASK: UPDATE_METHOD_CALL" 1716. The UI may also show some description 1704. The trigger section 1706 may comprise information associated with action, object, etc. The UI may additionally show an alias section 1708, an agent goal 1710, policy note 1712, and input arguments 1714. The NGO tool may be an effective solution for addressing the technical challenge of enabling developers to conveniently use the structural ontology without extensive knowledge about the ontology as the NGO tool may enable the developers to customize the usage of the structural ontology with different functions using an advanced user interface, within which the system may also automatically fill in contents to facilitate the usage of such tool.

In particular embodiments, the dialog plan API may allow the developer to specify an expected dialog flow using a combination of a graphical UI and object-oriented programming language. The flow may be then turned into an executable plan-tree. Plans constructed this way may allow for branching and looping. At each decision point the developer may use pre-existing "predicates" to test for common conditions or construct their own customized code. The NGO parser may also allow for predicates to be defined. If dialog state is represented using an NGO-like structure, the expectation may be that the developer may construct predicate. Additionally, for common tests, a set of predefined predicates may be provided. Such predefined predicates may also underpin the generation of dialog plans for the "no-code" frame-based abstraction above.

Figure 18:
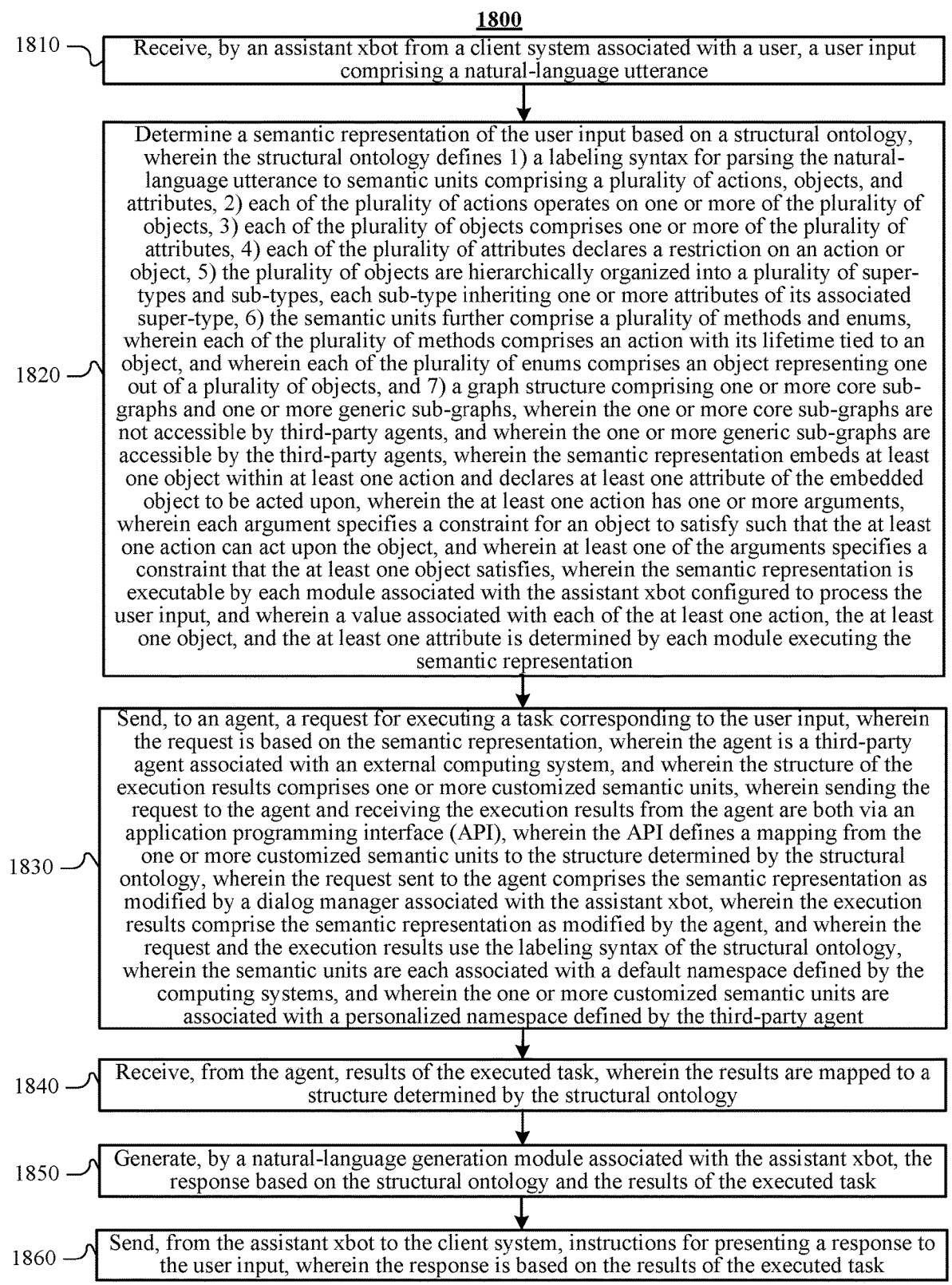
FIG. 18 illustrates an example method for improving consistency of semantic representation.

FIG. 18 illustrates an example method 1800 for improving consistency of semantic representations. The method may begin at step 1810, where the assistant system 140 may receive, by an assistant xbot from a client system 130 associated with a user, a user input comprising a natural-language utterance. At step 1820, the assistant system 140 may determine a semantic representation of the user input based on a structural ontology, wherein the structural ontology defines 1) a labeling syntax for parsing the natural-language utterance to semantic units comprising a plurality of actions, objects, and attributes, 2) each of the plurality of actions operates on one or more of the plurality of objects, 3) each of the plurality of objects comprises one or more of the plurality of attributes, 4) each of the plurality of attributes declares a restriction on an action or object, 5) the plurality of objects are hierarchically organized into a plurality of super-types and sub-types, each sub-type inheriting one or more attributes of its associated super-type, 6) the semantic units further comprise a plurality of methods and enums, wherein each of the plurality of methods comprises an action with its lifetime tied to an object, and wherein each of the plurality of enums comprises an object representing one out of a plurality of objects, and 7) a graph structure comprising one or more core sub-graphs and one or more generic sub-graphs, wherein the one or more core sub-graphs are not accessible by third-party agents, and wherein the one or more generic sub-graphs are accessible by the third-party agents, wherein the semantic representation embeds at least one object within at least one action and declares at least one attribute of the embedded object to be acted upon, wherein the at least one action has one or more arguments, wherein each argument specifies a constraint for an object to satisfy such that the at least one action can act upon the object, and wherein at least one of the arguments specifies a constraint that the at least one object satisfies, wherein the semantic representation is executable by each module associated with the assistant xbot configured to process the user input, and wherein a value associated with each of the at least one action, the at least one object, and the at least one attribute is determined by each module executing the semantic representation. At step 1830, the assistant system 140 may send, to an agent, a request for executing a task corresponding to the user input, wherein the request is based on the semantic representation, wherein the agent is a third-party agent associated with an external computing system, and wherein the structure of the execution results comprises one or more customized semantic units, wherein sending the request to the agent and receiving the execution results from the agent are both via an application programming interface (API), wherein the API defines a mapping from the one or more customized semantic units to the structure determined by the structural ontology, wherein the request sent to the agent comprises the semantic representation as modified by a dialog manager associated with the assistant xbot, wherein the execution results comprise the semantic representation as modified by the agent, and wherein the request and the execution results use the labeling syntax of the structural ontology, wherein the semantic units are each associated with a default namespace defined by the computing systems, and wherein the one or more customized semantic units are associated with a personalized namespace defined by the third-party agent. At step 1840, the assistant system 140 may receive, from the agent, results of the executed task, wherein the results are mapped to a structure determined by the structural ontology. At step 1850, the assistant system 140 may generate, by a natural-language generation module 356 associated with the assistant xbot, the response based on the structural ontology and the results of the executed task. At step 1850, the assistant system 140 may send, from the assistant xbot to the client system 130, instructions for presenting a response to the user input, wherein the response is based on the results of the executed task. Particular embodiments may repeat one or more steps of the method of FIG. 18, where appropriate. Although this disclosure describes and illustrates particular steps of the method of FIG. 18 as occurring in a particular order, this disclosure contemplates any suitable steps of the method of FIG. 18 occurring in any suitable order. Moreover, although this disclosure describes and illustrates an example method for improving consistency of semantic representations including the particular steps of the method of FIG. 18, this disclosure contemplates any suitable method for improving consistency of semantic representations including any suitable steps, which may include all, some, or none of the steps of the method of FIG. 18, where appropriate. Furthermore, although this disclosure describes and illustrates particular components, devices, or systems carrying out particular steps of the method of FIG. 18, this disclosure contemplates any suitable combination of any suitable components, devices, or systems carrying out any suitable steps of the method of FIG. 18.

Social Graphs

Figure 19:
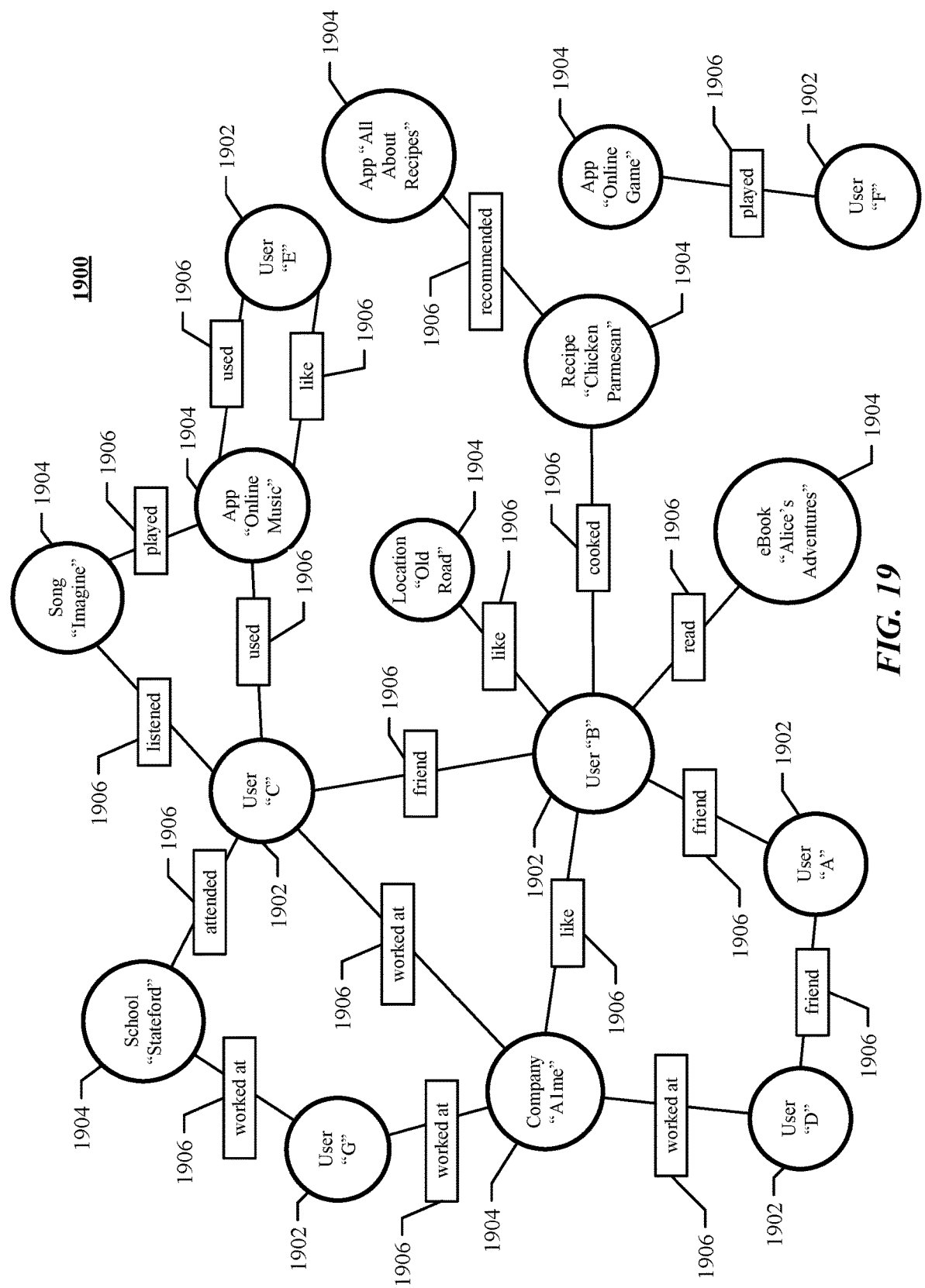
FIG. 19 illustrates an example social graph.

FIG. 19 illustrates an example social graph 1900. In particular embodiments, the social-networking system 160 may store one or more social graphs 1900 in one or more data stores. In particular embodiments, the social graph 1900 may include multiple nodes—which may include multiple user nodes 1902 or multiple concept nodes 1904—and multiple edges 1906 connecting the nodes. Each node may be associated with a unique entity (i.e., user or concept), each of which may have a unique identifier (ID), such as a unique number or username. The example social graph 1900 illustrated in FIG. 19 is shown, for didactic purposes, in a two-dimensional visual map representation. In particular embodiments, a social-networking system 160, a client system 130, an assistant system 140, or a third-party system 170 may access the social graph 1900 and related social-graph information for suitable applications. The nodes and edges of the social graph 1900 may be stored as data objects, for example, in a data store (such as a social-graph database). Such a data store may include one or more searchable or queryable indexes of nodes or edges of the social graph 1900.

In particular embodiments, a user node 1902 may correspond to a user of the social-networking system 160 or the assistant system 140. As an example and not by way of limitation, a user may be an individual (human user), an entity (e.g., an enterprise, business, or third-party application), or a group (e.g., of individuals or entities) that interacts or communicates with or over the social-networking system 160 or the assistant system 140. In particular embodiments, when a user registers for an account with the social-networking system 160, the social-networking system 160 may create a user node 1902 corresponding to the user, and store the user node 1902 in one or more data stores. Users and user nodes 1902 described herein may, where appropriate, refer to registered users and user nodes 1902 associated with registered users. In addition or as an alternative, users and user nodes 1902 described herein may, where appropriate, refer to users that have not registered with the social-networking system 160. In particular embodiments, a user node 1902 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 1902 may be associated with one or more data objects corresponding to information associated with a user. In particular embodiments, a user node 1902 may correspond to one or more web interfaces.

In particular embodiments, a concept node 1904 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1904 may be associated with information of a concept provided by a user or information gathered by various systems, including the social-networking system 160 and the assistant system 140. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1904 may be associated with one or more data objects corresponding to information associated with concept node 1904. In particular embodiments, a concept node 1904 may correspond to one or more web interfaces.

In particular embodiments, a node in the social graph 1900 may represent or be represented by a web interface (which may be referred to as a "profile interface"). Profile interfaces may be hosted by or accessible to the social-networking system 160 or the assistant system 140. Profile interfaces may also be hosted on third-party websites associated with a third-party system 170. As an example and not by way of limitation, a profile interface corresponding to a particular external web interface may be the particular external web interface and the profile interface may correspond to a particular concept node 1904. Profile interfaces may be viewable by all or a selected subset of other users. As an example and not by way of limitation, a user node 1902 may have a corresponding user-profile interface in which the corresponding user may add content, make declarations, or otherwise express himself or herself. As another example and not by way of limitation, a concept node 1904 may have a corresponding concept-profile interface in which one or more users may add content, make declarations, or express themselves, particularly in relation to the concept corresponding to concept node 1904.

In particular embodiments, a concept node 1904 may represent a third-party web interface or resource hosted by a third-party system 170. The third-party web interface or resource may include, among other elements, content, a selectable or other icon, or other inter-actable object representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 1902 corresponding to the user and a concept node 1904 corresponding to the third-party web interface or resource and store edge 1906 in one or more data stores.

In particular embodiments, a pair of nodes in the social graph 1900 may be connected to each other by one or more edges 1906. An edge 1906 connecting a pair of nodes may represent a relationship between the pair of nodes. In particular embodiments, an edge 1906 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 1906 connecting the first user's user node 1902 to the second user's user node 1902 in the social graph 1900 and store edge 1906 as social-graph information in one or more of data stores 164. In the example of FIG. 19, the social graph 1900 includes an edge 1906 indicating a friend relation between user nodes 1902 of user "A" and user "B" and an edge indicating a friend relation between user nodes 1902 of user "C" and user "B." Although this disclosure describes or illustrates particular edges 1906 with particular attributes connecting particular user nodes 1902, this disclosure contemplates any suitable edges 1906 with any suitable attributes connecting user nodes 1902. As an example and not by way of limitation, an edge 1906 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 1900 by one or more edges 1906. The degree of separation between two objects represented by two nodes, respectively, is a count of edges in a shortest path connecting the two nodes in the social graph 1900. As an example and not by way of limitation, in the social graph 1900, the user node 1902 of user "C" is connected to the user node 1902 of user "A" via multiple paths including, for example, a first path directly passing through the user node 1902 of user "B," a second path passing through the concept node 1904 of company "Alme" and the user node 1902 of user "D," and a third path passing through the user nodes 1902 and concept nodes 1904 representing school "Stateford," user "G," company "Alme," and user "D." User "C" and user "A" have a degree of separation of two because the shortest path connecting their corresponding nodes (i.e., the first path) includes two edges 1906.

In particular embodiments, an edge 1906 between a user node 1902 and a concept node 1904 may represent a particular action or activity performed by a user associated with user node 1902 toward a concept associated with a concept node 1904. As an example and not by way of limitation, as illustrated in FIG. 19, a user may "like," "attended," "played," "listened," "cooked," "worked at," or "read" a concept, each of which may correspond to an edge type or subtype. A concept-profile interface corresponding to a concept node 1904 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (a third-party online music application). In this case, the social-networking system 160 may create a "listened" edge 1906 and a "used" edge (as illustrated in FIG. 19) between user nodes 1902 corresponding to the user and concept nodes 1904 corresponding to the song and application to indicate that the user listened to the song and used the application. Moreover, the social-networking system 160 may create a "played" edge 1906 (as illustrated in FIG. 19) between concept nodes 1904 corresponding to the song and the application to indicate that the particular song was played by the particular application. In this case, "played" edge 1906 corresponds to an action performed by an external application (the third-party online music application) on an external audio file (the song "Imagine"). Although this disclosure describes particular edges 1906 with particular attributes connecting user nodes 1902 and concept nodes 1904, this disclosure contemplates any suitable edges 1906 with any suitable attributes connecting user nodes 1902 and concept nodes 1904. Moreover, although this disclosure describes edges between a user node 1902 and a concept node 1904 representing a single relationship, this disclosure contemplates edges between a user node 1902 and a concept node 1904 representing one or more relationships. As an example and not by way of limitation, an edge 1906 may represent both that a user likes and has used at a particular concept. Alternatively, another edge 1906 may represent each type of relationship (or multiples of a single relationship) between a user node 1902 and a concept node 1904 (as illustrated in FIG. 19 between user node 1902 for user "E" and concept node 1904 for "online music application").

In particular embodiments, the social-networking system 160 may create an edge 1906 between a user node 1902 and a concept node 1904 in the social graph 1900. As an example and not by way of limitation, a user viewing a concept-profile interface (such as, for example, by using a web browser or a special-purpose application hosted by the user's client system 130) may indicate that he or she likes the concept represented by the concept node 1904 by clicking or selecting a "Like" icon, which may cause the user's client system 130 to send to the social-networking system 160 a message indicating the user's liking of the concept associated with the concept-profile interface. In response to the message, the social-networking system 160 may create an edge 1906 between user node 1902 associated with the user and concept node 1904, as illustrated by "like" edge 1906 between the user and concept node 1904. In particular embodiments, the social-networking system 160 may store an edge 1906 in one or more data stores. In particular embodiments, an edge 1906 may be automatically formed by the social-networking system 160 in response to a particular user action. As an example and not by way of limitation, if a first user uploads a picture, reads a book, watches a movie, or listens to a song, an edge 1906 may be formed between user node 1902 corresponding to the first user and concept nodes 1904 corresponding to those concepts. Although this disclosure describes forming particular edges 1906 in particular manners, this disclosure contemplates forming any suitable edges 1906 in any suitable manner.

Vector Spaces and Embeddings

Figure 20:
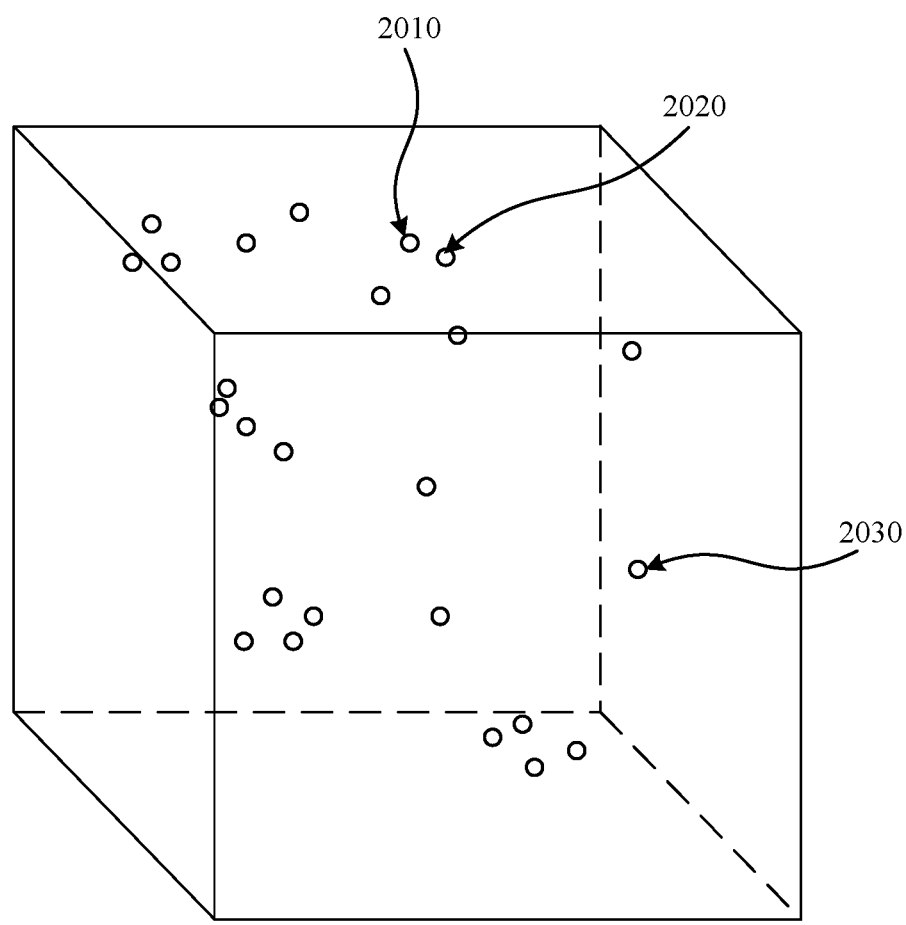
FIG. 20 illustrates an example view of an embedding space.

FIG. 20 illustrates an example view of a vector space 2000. In particular embodiments, an object or an n-gram may be represented in a d-dimensional vector space, where d denotes any suitable number of dimensions. Although the vector space 2000 is illustrated as a three-dimensional space, this is for illustrative purposes only, as the vector space 2000 may be of any suitable dimension. In particular embodiments, an n-gram may be represented in the vector space 2000 as a vector referred to as a term embedding. Each vector may comprise coordinates corresponding to a particular point in the vector space 2000 (i.e., the terminal point of the vector). As an example and not by way of limitation, vectors 2010, 2020, and 2030 may be represented as points in the vector space 2000, as illustrated in FIG. 20. An n-gram may be mapped to a respective vector representation. As an example and not by way of limitation, n-grams $t_1$ and $t_2$ may be mapped to vectors $\vec{v}_1$ and $\vec{v}_2$ in the vector space 2000, respectively, by applying a function $\vec{\pi}$ defined by a dictionary, such that $\vec{v}_1 = \vec{\pi}(t_1)$ and $\vec{v}_2 = \vec{\pi}(t_2)$. As another example and not by way of limitation, a dictionary trained to map text to a vector representation may be utilized, or such a dictionary may be itself generated via training. As another example and not by way of limitation, a word-embeddings model may be used to map an n-gram to a vector representation in the vector space 2000. In particular embodiments, an n-gram may be mapped to a vector representation in the vector space 2000 by using a machine leaning model (e.g., a neural network). The machine learning model may have been trained using a sequence of training data (e.g., a corpus of objects each comprising n-grams).

In particular embodiments, an object may be represented in the vector space 2000 as a vector referred to as a feature vector or an object embedding. As an example and not by way of limitation, objects $e_1$ and $e_2$ may be mapped to vectors $\vec{v_1}$ and $\vec{v_2}$ in the vector space 2000, respectively, by applying a function $\vec{\pi}$, such that $\vec{v_1} \vec{v_2} (e_1)$ and $\vec{v_2} = \vec{v_2} (e_2)$. In particular embodiments, an object may be mapped to a vector based on one or more properties, attributes, or features of the object, relationships of the object with other objects, or any other suitable information associated with the object. As an example and not by way of limitation, a function may map objects to vectors by feature extraction, which may start from an initial set of measured data and build derived values (e.g., features). As an example and not by way of limitation, an object comprising a video or an image may be mapped to a vector by using an algorithm to detect or isolate various desired portions or shapes of the object. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. In particular embodiments, when an object has data that is either too large to be efficiently processed or comprises redundant data, a function $\vec{v_2}$ may map the object to a vector using a transformed reduced set of features (e.g., feature selection). In particular embodiments, a function $\vec{v_2}$ may map an object e to a vector $\vec{v_2}$ (e) based on one or more n-grams associated with object e. Although this disclosure describes representing an n-gram or an object in a vector space in a particular manner, this disclosure contemplates representing an n-gram or an object in a vector space in any suitable manner.

In particular embodiments, the social-networking system 160 may calculate a similarity metric of vectors in vector space 2000. A similarity metric may be a cosine similarity, a Minkowski distance, a Mahalanobis distance, a Jaccard similarity coefficient, or any suitable similarity metric. As an example and not by way of limitation, a similarity metric of $\vec{v_1}$ and $\vec{v_2}$ may be a cosine similarity $$\frac{\vec{v_1} \cdot \vec{v_2}}{\|\vec{v_1}\| \|\vec{v_2}\|}.$$

As another example and not by way of limitation, a similarity metric of $\vec{v_1}$ and $\vec{v_2}$ may be a Euclidean distance $\|\vec{v_1} - \vec{v_2}\|$. A similarity metric of two vectors may represent how similar the two objects or n-grams corresponding to the two vectors, respectively, are to one another, as measured by the distance between the two vectors in the vector space 2000. As an example and not by way of limitation, vector 2010 and vector 2020 may correspond to objects that are more similar to one another than the objects corresponding to vector 2010 and vector 2030, based on the distance between the respective vectors. Although this disclosure describes calculating a similarity metric between vectors in a particular manner, this disclosure contemplates calculating a similarity metric between vectors in any suitable manner.

More information on vector spaces, embeddings, feature vectors, and similarity metrics may be found in U.S. patent application Ser. No. 14/949,436, filed 23 Nov. 2015, U.S. patent application Ser. No. 15/286,315, filed 5 Oct. 2016, and U.S. patent application Ser. No. 15/365,789, filed 30 Nov. 2016, each of which is incorporated by reference.

Artificial Neural Networks

Figure 21:
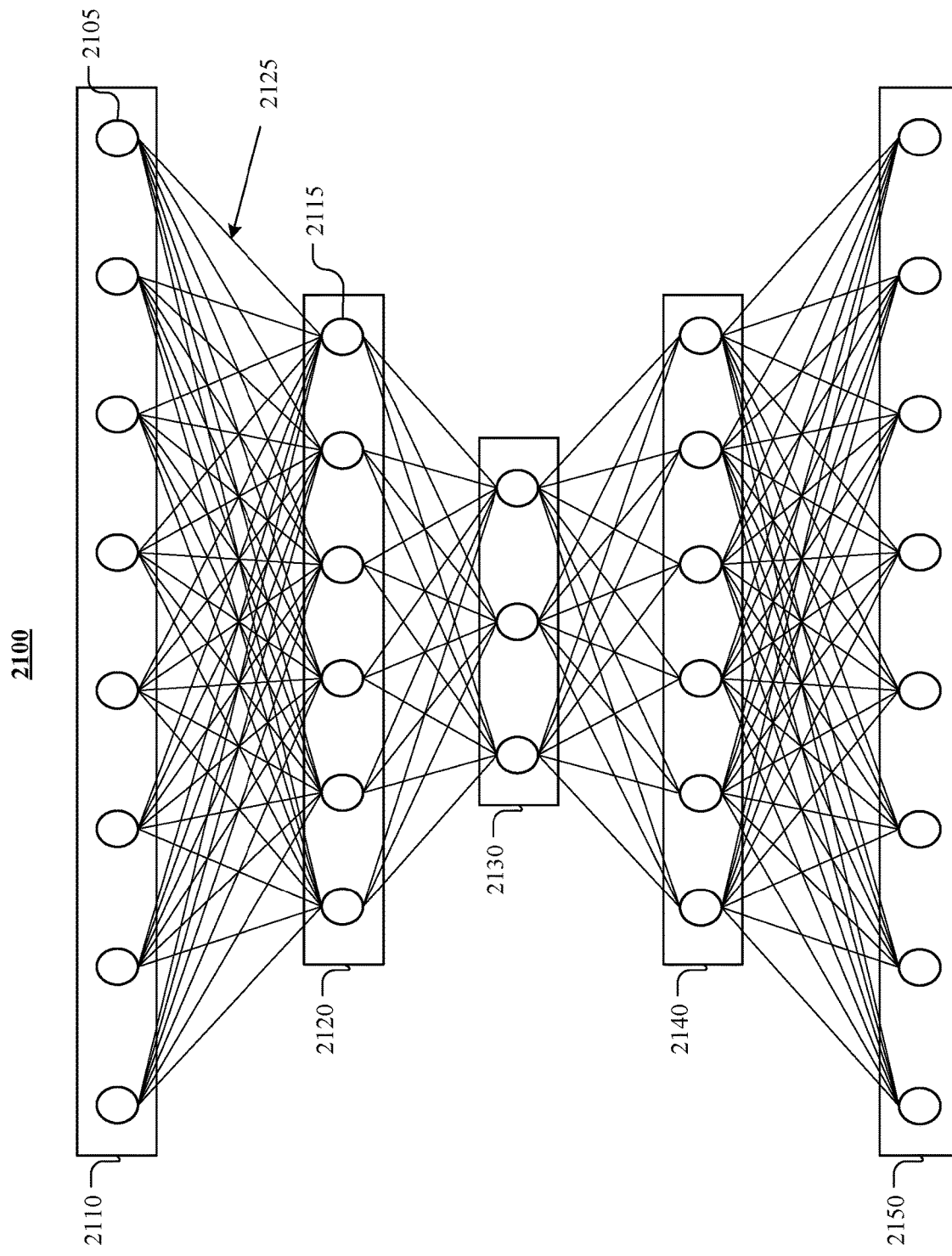
FIG. 21 illustrates an example artificial neural network.

FIG. 21 illustrates an example artificial neural network ("ANN") 2100. In particular embodiments, an ANN may refer to a computational model comprising one or more nodes. Example ANN 2100 may comprise an input layer 2110, hidden layers 2120, 2130, 2140, and an output layer 2150. Each layer of the ANN 2100 may comprise one or more nodes, such as a node 2105 or a node 2115. In particular embodiments, each node of an ANN may be connected to another node of the ANN. As an example and not by way of limitation, each node of the input layer 2110 may be connected to one of more nodes of the hidden layer 2120. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 21 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 21 depicts a connection between each node of the input layer 2110 and each node of the hidden layer 2120, one or more nodes of the input layer 2110 may not be connected to one or more nodes of the hidden layer 2120.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 2120 may comprise the output of one or more nodes of the input layer 2110. As another example and not by way of limitation, the input to each node of the output layer 2150 may comprise the output of one or more nodes of the hidden layer 2140. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1 + e^{-s_k}},$$

the hyperbolic tangent function $$F_k(s_k) = \frac{e^{s_k} - e^{-s_k}}{e^{s_k} + e^{-s_k}},$$

the rectifier $F_k(s_k)=\max(0, s_k)$, or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 2125 between the node 2105 and the node 2115 may have a weighting coefficient of 0.4, which may indicate that 0.4 multiplied by the output of the node 2105 is used as an input to the node 2115. As another example and not by way of limitation, the output $y_k$ of node k may be $y_k=F_k(S_k)$, where $F_k$ may be the activation function corresponding to node k, $s_k=\Sigma_j(w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN 2100 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Privacy

In particular embodiments, one or more objects (e.g., content or other types of objects) of a computing system may be associated with one or more privacy settings. The one or more objects may be stored on or otherwise associated with any suitable computing system or application, such as, for example, a social-networking system 160, a client system 130, an assistant system 140, a third-party system 170, a social-networking application, an assistant application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node 1904 corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system 160 or assistant system 140 or shared with other systems (e.g., a third-party system 170). Although this disclosure describes using particular privacy settings in a particular manner, this disclosure contemplates using any suitable privacy settings in any suitable manner.

In particular embodiments, privacy settings may be based on one or more nodes or edges of a social graph 1900. A privacy setting may be specified for one or more edges 1906 or edge-types of the social graph 1900, or with respect to one or more nodes 1902, 1904 or node-types of the social graph 1900. The privacy settings applied to a particular edge 1906 connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system 160. The object may be associated with a concept node 1904 connected to a user node 1902 of the first user by an edge 1906. The first user may specify privacy settings that apply to a particular edge 1906 connecting to the concept node 1904 of the object, or may specify privacy settings that apply to all edges 1906 connecting to the concept node 1904. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system 160 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system 160 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and the object may be sent only to the user (or a client system 130 of the user) if the authorization server determines that the user is authorized to access the object based on the privacy settings associated with the object. If the requesting user is not authorized to access the object, the authorization server may prevent the requested object from being retrieved from the data store 164 or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system 160, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system 160 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system 160 or assistant system 140 may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system 160 or assistant system 140 may access such information in order to provide a particular function or service to the first user, without the social-networking system 160 or assistant system 140 having access to that information for any other purposes. Before accessing, storing, or using such objects or information, the social-networking system 160 or assistant system 140 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 160 or assistant system 140.

In particular embodiments, a user may specify whether particular types of objects or information associated with the first user may be accessed, stored, or used by the social-networking system 160 or assistant system 140. As an example and not by way of limitation, the first user may specify that images sent by the first user through the social-networking system 160 or assistant system 140 may not be stored by the social-networking system 160 or assistant system 140. As another example and not by way of limitation, a first user may specify that messages sent from the first user to a particular second user may not be stored by the social-networking system 160 or assistant system 140. As yet another example and not by way of limitation, a first user may specify that all objects sent via a particular application may be saved by the social-networking system 160 or assistant system 140.

In particular embodiments, privacy settings may allow a first user to specify whether particular objects or information associated with the first user may be accessed from particular client systems 130 or third-party systems 170. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system 160 or assistant system 140 may provide default privacy settings with respect to each device, system, or application, and/or the first user may be prompted to specify a particular privacy setting for each context. As an example and not by way of limitation, the first user may utilize a location-services feature of the social-networking system 160 or assistant system 140 to provide recommendations for restaurants or other places in proximity to the user. The first user's default privacy settings may specify that the social-networking system 160 or assistant system 140 may use location information provided from a client system 130 of the first user to provide the location-based services, but that the social-networking system 160 or assistant system 140 may not store the location information of the first user or provide it to any third-party system 170. The first user may then update the privacy settings to allow location information to be used by a third-party image-sharing application in order to geo-tag photos.

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular embodiments, the social-networking system 160 or assistant system 140 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the social-networking system 160 or assistant system 140. The user's privacy settings may specify that such information may be used only for particular processes, such as authentication, and further specify that such information may not be shared with any third-party system 170 or used for other processes or applications associated with the social-networking system 160 or assistant system 140. As another example and not by way of limitation, the social-networking system 160 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system 170 or used by other processes or applications associated with the social-networking system 160. As another example and not by way of limitation, the social-networking system 160 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such image may be used only for a limited purpose (e.g., authentication, tagging the user in photos), and further specify that such image may not be shared with any third-party system 170 or used by other processes or applications associated with the social-networking system 160.

Systems and Methods

Figure 22:
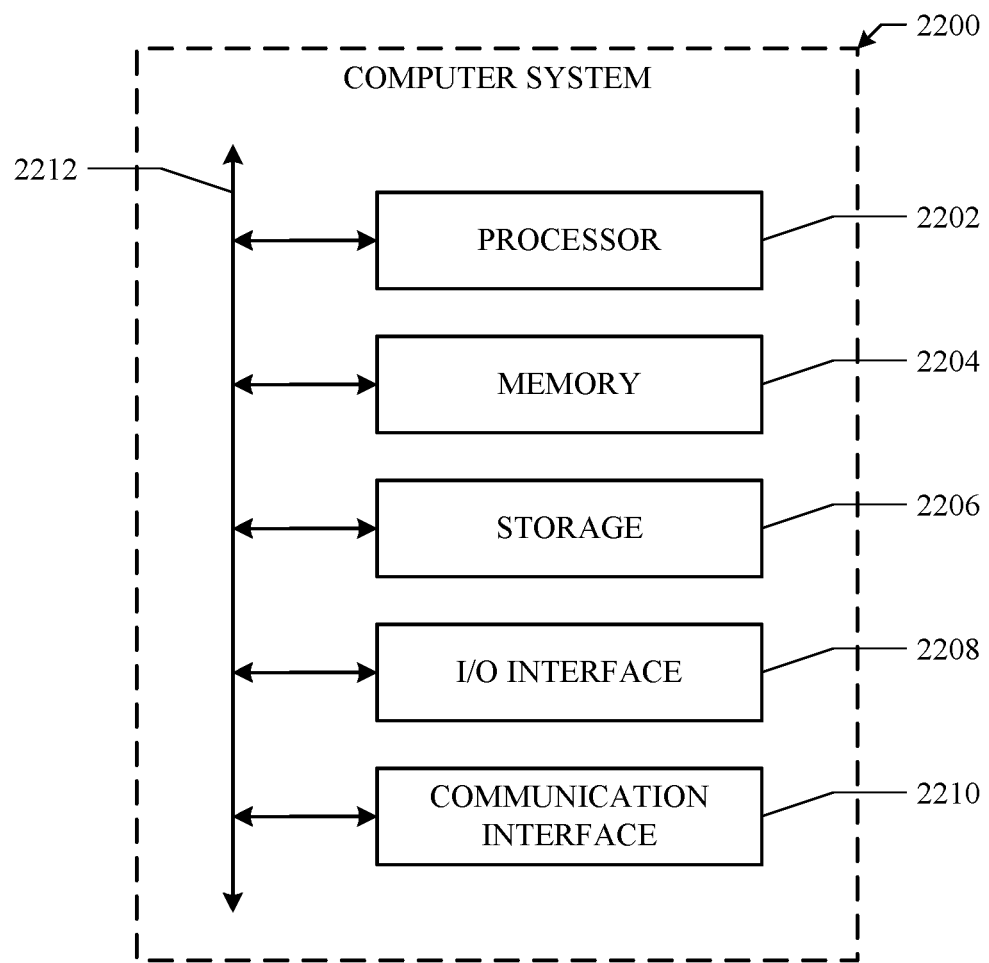
FIG. 22 illustrates an example computer system.

FIG. 22 illustrates an example computer system 2200. In particular embodiments, one or more computer systems 2200 perform one or more steps of one or more methods described or illustrated herein. In particular embodiments, one or more computer systems 2200 provide functionality described or illustrated herein. In particular embodiments, software running on one or more computer systems 2200 performs one or more steps of one or more methods described or illustrated herein or provides functionality described or illustrated herein. Particular embodiments include one or more portions of one or more computer systems 2200. Herein, reference to a computer system may encompass a computing device, and vice versa, where appropriate. Moreover, reference to a computer system may encompass one or more computer systems, where appropriate.

This disclosure contemplates any suitable number of computer systems 2200. This disclosure contemplates computer system 2200 taking any suitable physical form. As example and not by way of limitation, computer system 2200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 2200 may include one or more computer systems 2200; be unitary or distributed; span multiple locations; span multiple machines; span multiple data centers; or reside in a cloud, which may include one or more cloud components in one or more networks. Where appropriate, one or more computer systems 2200 may perform without substantial spatial or temporal limitation one or more steps of one or more methods described or illustrated herein. As an example and not by way of limitation, one or more computer systems 2200 may perform in real time or in batch mode one or more steps of one or more methods described or illustrated herein. One or more computer systems 2200 may perform at different times or at different locations one or more steps of one or more methods described or illustrated herein, where appropriate.

In particular embodiments, computer system 2200 includes a processor 2202, memory 2204, storage 2206, an input/output (I/O) interface 2208, a communication interface 2210, and a bus 2212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 2202 includes hardware for executing instructions, such as those making up a computer program. As an example and not by way of limitation, to execute instructions, processor 2202 may retrieve (or fetch) the instructions from an internal register, an internal cache, memory 2204, or storage 2206; decode and execute them; and then write one or more results to an internal register, an internal cache, memory 2204, or storage 2206. In particular embodiments, processor 2202 may include one or more internal caches for data, instructions, or addresses. This disclosure contemplates processor 2202 including any suitable number of any suitable internal caches, where appropriate. As an example and not by way of limitation, processor 2202 may include one or more instruction caches, one or more data caches, and one or more translation lookaside buffers (TLBs). Instructions in the instruction caches may be copies of instructions in memory 2204 or storage 2206, and the instruction caches may speed up retrieval of those instructions by processor 2202. Data in the data caches may be copies of data in memory 2204 or storage 2206 for instructions executing at processor 2202 to operate on; the results of previous instructions executed at processor 2202 for access by subsequent instructions executing at processor 2202 or for writing to memory 2204 or storage 2206; or other suitable data. The data caches may speed up read or write operations by processor 2202. The TLBs may speed up virtual-address translation for processor 2202. In particular embodiments, processor 2202 may include one or more internal registers for data, instructions, or addresses. This disclosure contemplates processor 2202 including any suitable number of any suitable internal registers, where appropriate. Where appropriate, processor 2202 may include one or more arithmetic logic units (ALUs); be a multi-core processor; or include one or more processors 2202. Although this disclosure describes and illustrates a particular processor, this disclosure contemplates any suitable processor.

In particular embodiments, memory 2204 includes main memory for storing instructions for processor 2202 to execute or data for processor 2202 to operate on. As an example and not by way of limitation, computer system 2200 may load instructions from storage 2206 or another source (such as, for example, another computer system 2200) to memory 2204. Processor 2202 may then load the instructions from memory 2204 to an internal register or internal cache. To execute the instructions, processor 2202 may retrieve the instructions from the internal register or internal cache and decode them. During or after execution of the instructions, processor 2202 may write one or more results (which may be intermediate or final results) to the internal register or internal cache. Processor 2202 may then write one or more of those results to memory 2204. In particular embodiments, processor 2202 executes only instructions in one or more internal registers or internal caches or in memory 2204 (as opposed to storage 2206 or elsewhere) and operates only on data in one or more internal registers or internal caches or in memory 2204 (as opposed to storage 2206 or elsewhere). One or more memory buses (which may each include an address bus and a data bus) may couple processor 2202 to memory 2204. Bus 2212 may include one or more memory buses, as described below. In particular embodiments, one or more memory management units (MMUs) reside between processor 2202 and memory 2204 and facilitate accesses to memory 2204 requested by processor 2202. In particular embodiments, memory 2204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 2204 may include one or more memories 2204, where appropriate. Although this disclosure describes and illustrates particular memory, this disclosure contemplates any suitable memory.

In particular embodiments, storage 2206 includes mass storage for data or instructions. As an example and not by way of limitation, storage 2206 may include a hard disk drive (HDD), a floppy disk drive, flash memory, an optical disc, a magneto-optical disc, magnetic tape, or a Universal Serial Bus (USB) drive or a combination of two or more of these. Storage 2206 may include removable or non-removable (or fixed) media, where appropriate. Storage 2206 may be internal or external to computer system 2200, where appropriate. In particular embodiments, storage 2206 is non-volatile, solid-state memory. In particular embodiments, storage 2206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 2206 taking any suitable physical form. Storage 2206 may include one or more storage control units facilitating communication between processor 2202 and storage 2206, where appropriate. Where appropriate, storage 2206 may include one or more storages 2206. Although this disclosure describes and illustrates particular storage, this disclosure contemplates any suitable storage.

In particular embodiments, I/O interface 2208 includes hardware, software, or both, providing one or more interfaces for communication between computer system 2200 and one or more I/O devices. Computer system 2200 may include one or more of these I/O devices, where appropriate. One or more of these I/O devices may enable communication between a person and computer system 2200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 2208 for them. Where appropriate, I/O interface 2208 may include one or more device or software drivers enabling processor 2202 to drive one or more of these I/O devices. I/O interface 2208 may include one or more I/O interfaces 2208, where appropriate. Although this disclosure describes and illustrates a particular I/O interface, this disclosure contemplates any suitable I/O interface.

In particular embodiments, communication interface 2210 includes hardware, software, or both providing one or more interfaces for communication (such as, for example, packet-based communication) between computer system 2200 and one or more other computer systems 2200 or one or more networks. As an example and not by way of limitation, communication interface 2210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 2210 for it. As an example and not by way of limitation, computer system 2200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 2200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 2200 may include any suitable communication interface 2210 for any of these networks, where appropriate. Communication interface 2210 may include one or more communication interfaces 2210, where appropriate. Although this disclosure describes and illustrates a particular communication interface, this disclosure contemplates any suitable communication interface.

In particular embodiments, bus 2212 includes hardware, software, or both coupling components of computer system 2200 to each other. As an example and not by way of limitation, bus 2212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 2212 may include one or more buses 2212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
   receiving, by an assistant xbot from a client system associated with a user, a user input comprising a natural-language utterance;
   determining a semantic representation of the user input based on a structural ontology, wherein the structural ontology defines a labeling syntax for parsing the natural-language utterance to semantic units comprising a plurality of actions, objects, and attributes, and wherein the semantic representation embeds at least one object within at least one action and declares at least one attribute of the at least one embedded object to be acted upon;
   sending, to an agent, a request for executing a task corresponding to the user input, wherein the request is based on the semantic representation;
   receiving, from the agent, results generated by the agent from executing the task, wherein the results are mapped to a structure determined by the structural ontology; and
   sending, from the assistant xbot to the client system, instructions for presenting a response to the user input, wherein the response is based on the results.

2. The method of claim 1, wherein the structural ontology defines that each of the plurality of actions operates on one or more of the plurality of objects.

3. The method of claim 1, wherein the structural ontology defines that each of the plurality of objects comprises one or more of the plurality of attributes.

4. The method of claim 1, wherein the structural ontology defines that each of the plurality of attributes declares a restriction on an action or object.

5. The method of claim 1, wherein the assistant xbot is associated with a plurality of modules configured to process the user input, and wherein the semantic representation is executable by each module of the plurality of modules.

6. The method of claim 1, wherein the structural ontology defines that the plurality of objects are hierarchically organized into a plurality of super-types and a plurality of sub-types, and where the plurality of super-types are associated with the plurality of sub-types, respectively, each sub-type inheriting one or more attributes of its associated super-type.

7. The method of claim 1, wherein the assistant xbot is associated with a plurality of modules configured to execute the semantic representation, and wherein a value associated with each of the at least one action, the at least one object, and the at least one attribute is determined by each module of the plurality of modules executing the semantic representation.

8. The method of claim 1, further comprising:
   generating, by a natural-language generation module associated with the assistant xbot, the response based on the structural ontology and the results.

9. The method of claim 1, wherein the structural ontology defines that the semantic units further comprise a plurality of methods and enums, wherein each of the plurality of methods comprises an action with its lifetime tied to an object, and wherein each of the plurality of enums comprises an object representing one out of a plurality of objects.

10. The method of claim 1, wherein the structural ontology further defines a graph structure comprising one or more core sub-graphs and one or more generic sub-graphs, wherein the one or more core sub-graphs are not accessible by third-party agents, and wherein the one or more generic sub-graphs are accessible by the third-party agents.

11. The method of claim 1, further comprising:
   resolving, by a reasoning module associated with the assistant xbot, one or more entities associated with the at least one object based on the at least one attribute of the semantic representation.

12. The method of claim 1, wherein the agent is a first-party agent associated with the assistant xbot.

13. The method of claim 1, wherein the agent is a third-party agent associated with an external computing system, and wherein the structure of the results comprises one or more customized semantic units.

14. The method of claim 13, wherein sending the request to the agent and receiving the results from the agent are both via an application programming interface (API), wherein the API defines a mapping from the one or more customized semantic units to the structure determined by the structural ontology.

15. The method of claim 13, wherein the request sent to the agent comprises the semantic representation as modified by a dialog manager associated with the assistant xbot, wherein the results comprise the semantic representation as modified by the agent, and wherein the request and the results use the labeling syntax of the structural ontology.

16. The method of claim 13, wherein the semantic units are each associated with a default namespace defined by the one or more computing systems, and wherein the one or more customized semantic units are associated with a personalized namespace defined by the third-party agent.

17. The method of claim 1, wherein the at least one action has one or more arguments, wherein each argument specifies a constraint for an object to satisfy such that the at least one action can act upon the object, and wherein at least one of the one or more arguments specifies a constraint that the at least one object satisfies.

18. One or more computer-readable non-transitory storage media embodying software that comprises instructions that when executed by one or more processors, cause the one or more processors to:
   receive, by an assistant xbot from a client system associated with a user, a user input comprising a natural-language utterance;
   determine a semantic representation of the user input based on a structural ontology, wherein the structural ontology defines a labeling syntax for parsing the natural-language utterance to semantic units comprising a plurality of actions, objects, and attributes, and wherein the semantic representation embeds at least one object within at least one action and declares at least one attribute of the at least one embedded object to be acted upon;
   send, to an agent, a request for executing a task corresponding to the user input, wherein the request is based on the semantic representation;
   receive, from the agent, results generated by the agent from executing the task, wherein the results are mapped to a structure determined by the structural ontology; and send, from the assistant xbot to the client system, instructions for presenting a response to the user input, wherein the response is based on the results.

19. A system comprising: one or more processors; and a non-transitory memory coupled to the processors comprising instructions executable by the processors, the processors operable when executing the instructions to:
receive, by an assistant xbot from a client system associated with a user, a user input comprising a natural-language utterance;
determine a semantic representation of the user input based on a structural ontology, wherein the structural ontology defines a labeling syntax for parsing the natural-language utterance to semantic units comprising a plurality of actions, objects, and attributes, and wherein the semantic representation embeds at least one object within at least one action and declares at least one attribute of the at least one embedded object to be acted upon;
send, to an agent, a request for executing a task corresponding to the user input, wherein the request is based on the semantic representation;
receive, from the agent, results generated by the agent from executing the task, wherein the results are mapped to a structure determined by the structural ontology; and
send, from the assistant xbot to the client system, instructions for presenting a response to the user input, wherein the response is based on the results.

* * * * *